(12) United States Patent
Haga et al.

(10) Patent No.: US 7,663,714 B2
(45) Date of Patent: Feb. 16, 2010

(54) BACKLIGHT DEVICE AND COLOR LIQUID CRYSTAL DISPLAY APPARATUS

(75) Inventors: Shuichi Haga, Kanagawa (JP); Koichiro Kakinuma, Tokyo (JP); Takehiro Nakatsue, Kanagawa (JP); Tatsuhiko Matsumoto, Tokyo (JP); Yasuhiro Tagawa, Tokyo (JP); Yutaka Ota, Kanagawa (JP); Takashi Oku, Saitama (JP); Takeo Arai, Saitama (JP)

(73) Assignee: Sony Corporation, Tokyo (JP)

( * ) Notice: Subject to any disclaimer, the term of this patent is extended or adjusted under 35 U.S.C. 154(b) by 375 days.

(21) Appl. No.: 11/573,375

(22) PCT Filed: Aug. 9, 2005

(86) PCT No.: PCT/JP2005/014599
§ 371 (c)(1),
(2), (4) Date: Feb. 7, 2007

(87) PCT Pub. No.: WO2006/019016
PCT Pub. Date: Feb. 23, 2006

(65) Prior Publication Data
US 2007/0182887 A1    Aug. 9, 2007

(30) Foreign Application Priority Data
Aug. 18, 2004 (JP) .............................. 2004-238787
Aug. 18, 2004 (JP) .............................. 2004-238789
Mar. 16, 2005 (JP) .............................. 2005-075500

(51) Int. Cl.
*G02F 1/1335* (2006.01)
(52) U.S. Cl. ....................................................... 349/69
(58) Field of Classification Search ........................ None
See application file for complete search history.

(56) References Cited

U.S. PATENT DOCUMENTS

| 2003/0063062 A1 | 4/2003 | Tsumura |
| 2004/0042234 A1 | 3/2004 | Otake |

FOREIGN PATENT DOCUMENTS

| JP | 2003-207770 | 7/2003 |
| JP | 2004-093761 | 3/2004 |
| JP | 2004-118133 | 4/2004 |
| WO | 01/84227 | 11/2001 |

OTHER PUBLICATIONS

International Search Report dated Nov. 1, 2005.
European Search Report issued on Jan. 29, 2008 in connection with European Patent Application No. 05770536.0.

*Primary Examiner*—Sung H Pak
(74) *Attorney, Agent, or Firm*—Sonnenschein Nath & Rosenthal LLP

(57) ABSTRACT

Disclosed is a backlight device used for a color liquid crystal display (LCD) apparatus. The red light, green light and blue light, generated by a light source, made up by a red light emitting diode (21R), a green light emitting diode (21G) and a blue light emitting diode (21B), respectively, are mixed together to generate white light. The red light has a half-value width hwr such that 15 nm≦hwr≦30 nm, and the green light has a half-value width hwg such that 25 nm≦hwg≦50 nm. The blue light has a half-value width hwb such that 15 nm≦hwb≦30 nm. The white light illuminates a transmissive color liquid crystal display panel (10) from its back side. The transmissive color liquid crystal display panel includes a color filter (19) made up by a tristimulus filter for wavelength-selecting and transmitting red light, green light and blue light.

18 Claims, 35 Drawing Sheets

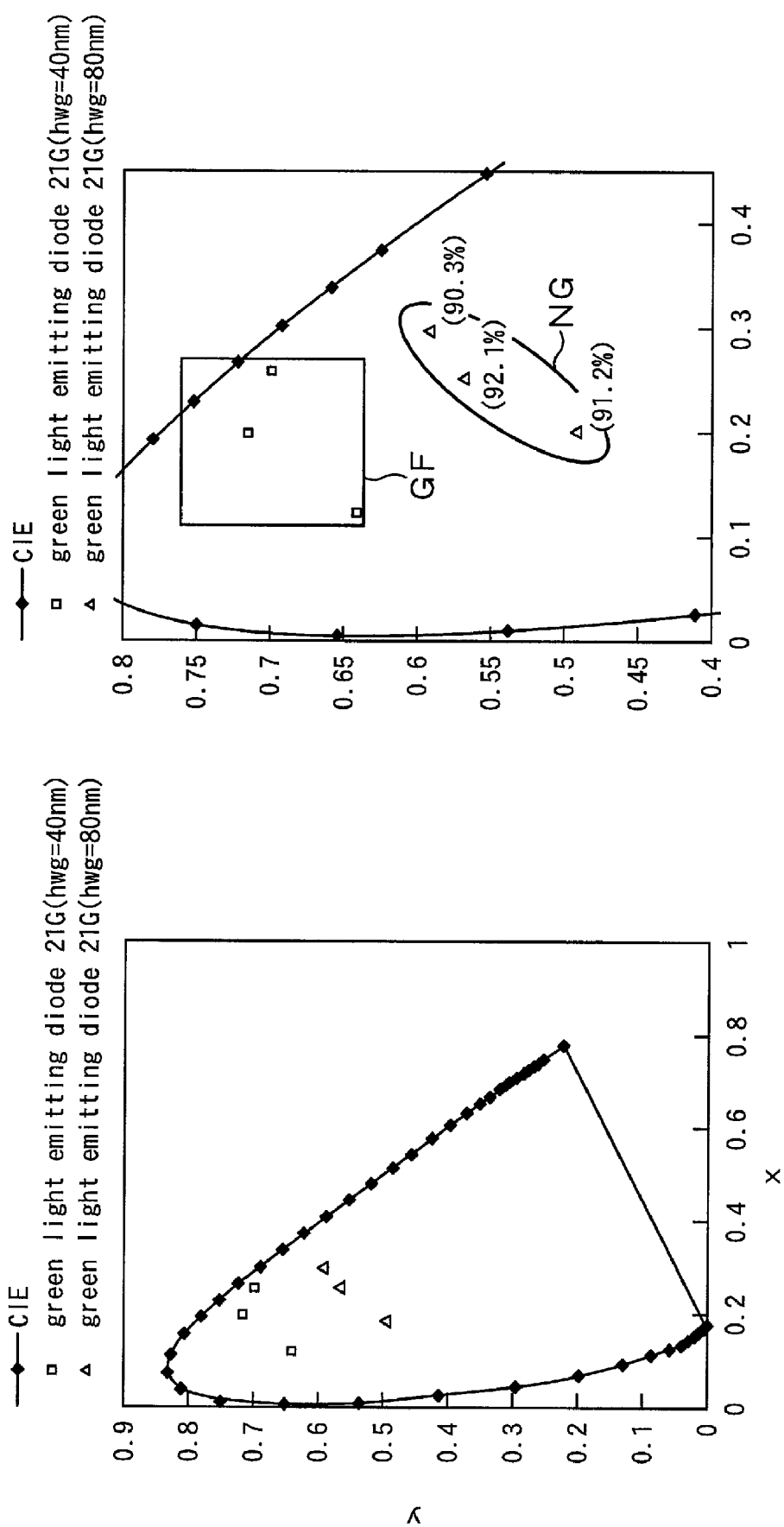

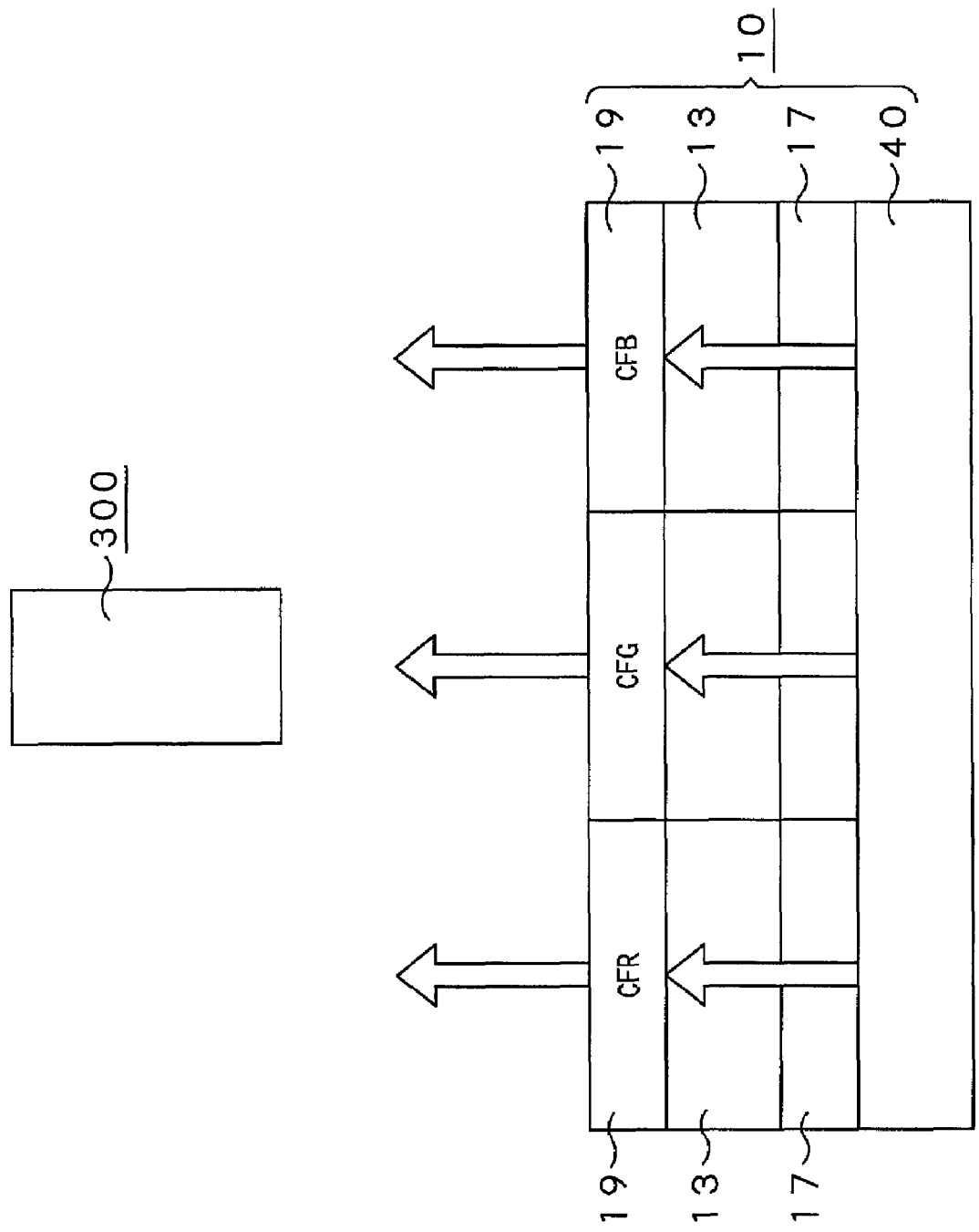

BACKLIGHT DEVICE AND COLOR LIQUID CRYSTAL DISPLAY APPARATUS

TECHNICAL FIELD

This invention relates to a color liquid crystal display (LCD) apparatus and, more particularly, to a color liquid crystal display apparatus with which the color gamut is made broader to assure more faithful color reproducing performance.

The present application claims priority rights on the basis of the Japanese Patent Applications 2004-238787, 2004-238789 and 2005-075500, filed in Japan on Aug. 18, 2004, on Aug. 18, 2004 and on Mar. 16, 2005, respectively. The contents of these Patent Applications are to be incorporated by reference in the present application.

BACKGROUND ART

A TV receiver of an extremely thin thickness, such as one employing a liquid crystal display (LCD) or a plasma display panel (PDP), has been developed and put to practical use to take the place of a TV receiver employing a cathode ray tube (CRT) which has long been used since the start of TV broadcasting. In particular, a color liquid crystal display apparatus employing a color liquid crystal display panel is expected to become popular at a high pace because it permits driving with low power consumption and the large-sized color liquid crystal display panel has become less expensive.

As for the color liquid crystal display apparatus, the backlight system, in which a transmissive color liquid crystal display panel is illuminated from its backside with a backlight device to display a color picture, is in the mainstream. The light source, preferentially used for the backlight device, is a CCFL (Cold Cathode Fluorescent Lamp), emitting white light using a fluorescent tube.

In general, in a transmissive color liquid crystal display apparatus, a color filter, employing a tristimulus filter of spectral characteristics, shown for example in FIG. 1, made up of a blue filter $CFB_0$ (460 nm), a green filter $CFG_0$ (530 nm) and a red filter $CFR_0$ (685 nm), where the numbers entered in parentheses denote the peak transmission wavelength of each filter, is provided from one pixel of the color liquid crystal display panel to another.

On the other hand, the white light, emitted by a three-wavelength CCFL, used as a light source for a backlight device of the color liquid crystal display apparatus, has a spectrum shown in FIG. 2. That is, the white light emitted by the CCFL contains light of different intensities in a variety of wavelengths.

Hence, the color reproduced by the combination of the backlight device, having such CCFL, emitting the light of three wavelength ranges, as light source, and the color liquid crystal display panel, having the color filter, described above, is rather poor in color purity.

FIG. 3 shows the color reproducing range of the color liquid crystal display apparatus, including the backlight device, having the above-described tristimulus CCFL as a light source. Specifically, FIG. 3 depicts an xy chromaticity diagram of the XYZ color system, as prescribed by the Commission Internationale de l'Eclairage (CIE).

As may be seen from FIG. 3, the color reproducing range of the color liquid crystal display apparatus, having the backlight device, employing the CCFL as light source, is narrower than the color reproducing range provided for by the standard of the NTSC (National Television System Committee) system accepted as the color television broadcasting system. That is, the first-stated color reproducing range may not be said to cope sufficiently with the current television broadcasting.

On the other hand, there is a fear that the CCFL, containing mercury in the phosphorescent tube, may have an ill effect on the environment. Hence, a demand is raised for a light source which may be used in substitution for the CCFL as a light source of the backlight device. With the development of the blue light emitting diode, the light emitting diodes, emitting light of three prime colors, namely red light, green light and blue light, are now in order. Thus, with the use of the light emitting diodes as light source for the backlight device, the color light obtained by the color liquid crystal display panel may be improved in color purity, and hence it may be expected that the color reproducing range may be made as broad as or even broader than the color reproducing range provided for by the NTSC system.

However, there is a problem that the color reproducing range of the color liquid crystal display apparatus, employing light emitting diodes as light source, is not as yet broad enough to satisfy the color reproducing range provided by the NTSC system.

DISCLOSURE OF THE INVENTION

Problems to be Solved by the Invention

In view of the above problem, it is an object of the present invention to provide a backlight device which enables a broad color gamut of the liquid crystal display apparatus of the backlight system, and a liquid crystal display apparatus employing this backlight device.

A backlight device according to the present invention illuminates a transmissive color liquid crystal display panel, having a color filter, from its backside with white light. The color filter is constituted by a tristimulus filter for wavelength-selecting and transmitting red light, green light and blue light. The backlight device includes a light source, made up by a red light emitting diode emitting red light with a half-value width hwr such that $15\ \text{nm} \leq hwr \leq 30\ \text{nm}$, a green light emitting diode emitting green light with a half-value width hwg such that $25\ \text{nm} \leq hwg \leq 50\ \text{nm}$ and a blue light emitting diode emitting blue light with a half-value width hwb such that $15\ \text{nm} \leq hwb \leq 30\ \text{nm}$, and color mixing means for mixing the red light, green light and blue light emitted by the light source to generate the white light.

A color liquid crystal display apparatus according to the present invention comprises a transmissive color liquid crystal display panel, including a color filter constituted by a tristimulus filter for wavelength-selecting and transmitting red light, green light and blue light, and a backlight device for illuminating the color liquid crystal display panel with white light from its backside. The backlight device includes a light source, made up by a red light emitting diode emitting red light with a half-value width hwr such that $15\ \text{nm} \leq hwr \leq 30\ \text{nm}$, a green light emitting diode emitting green light with a half-value width hwg such that $25\ \text{nm} \leq hwg \leq 50\ \text{nm}$ and a blue light emitting diode emitting blue light with a half-value width hwb such that $15\ \text{nm} \leq hwb \leq 30\ \text{nm}$, and color mixing means for mixing the red light, green light and blue light emitted by the light source to generate the white light.

The backlight device according to the present invention generates white light and illuminates the transmissive color liquid crystal display panel from its backside with this white light. The color filter includes a tristimulus filter for wavelength-selecting and transmitting green light, red light and blue light. By so doing, the red light, green light and blue light, emitted by the green red light emitting diode, green light emitting diode and by the blue light emitting diode, as the light source, may be improved in color purity to provide for a broad color gamut of the white light generated on color mixing. It is possible to achieve a color reproducing range which will give the NTSC (National Television System Committee) which is not lower than 100%.

Another backlight device illuminates a transmissive color liquid crystal display panel from its backside with white light. The color liquid crystal display panel includes a color filter constituted by a tristimulus filter for wavelength-selecting and transmitting red light, green light and blue light. The backlight device includes a light source made up by a red light emitting diode, a green light emitting diode and a blue light emitting diode. The red light emitting diode emits red light having a chromaticity point in an xy chromaticity diagram in the XYZ color system as prescribed by the Commission Internationale de l'Eclairage (CIE) such that $0.65 \leq x \leq 0.75$ and $0.27 \leq y \leq 0.33$. The green light emitting diode emits green light having a chromaticity point in the xy chromaticity diagram such that $0.12 \leq x \leq 0.28$ and $0.64 \leq y \leq 0.76$ and the blue light emitting diode emits blue light having a chromaticity point in the xy chromaticity diagram such that $0.14 \leq x \leq 0.17$ and $0.01 \leq y \leq 0.06$. The backlight device also includes color mixing means for mixing the red light, green light and blue light emitted by the light source to generate the white light.

Another color liquid crystal display apparatus according to the present invention includes a transmissive color liquid crystal display panel, and a backlight device for illuminating the color liquid crystal display panel with white light from its backside. The transmissive color liquid crystal display panel includes a color filter constituted by a tristimulus filter for wavelength-selecting and transmitting red light, green light and blue light. The backlight device includes a light source made up by a red light emitting diode, a green light emitting diode and a blue light emitting diode. The red light emitting diode emits red light having a chromaticity point in an xy chromaticity diagram in the XYZ color system as prescribed by the Commission Internationale de l'Eclairage (CIE) such that $0.65 \leq x \leq 0.75$ and $0.27 \leq y \leq 0.33$. The green light emitting diode emits green light having a chromaticity point in the xy chromaticity diagram such that $0.12 \leq x \leq 0.28$ and $0.64 \leq y \leq 0.76$ and the blue light emitting diode emits blue light having a chromaticity point in the xy chromaticity diagram such that $0.14 \leq x \leq 0.17$ and $0.01 \leq y \leq 0.06$. The backlight device also includes color mixing means for mixing the red light, green light and blue light emitted by the light source to generate the white light.

This backlight device generates white light and illuminates a transmissive color liquid crystal display panel with this white light from its back side. The display panel includes a color filter formed by a tristimulus filter for wavelength-selecting and transmitting red light, green light and blue light. By so doing, it is possible to improve color purity of red light, green light and blue light emitted by the red light emitting diode, green light emitting diode and the blue light emitting diode, respectively, in order to provide for a broad color gamut of the white light obtained on color mixing. Hence, it is possible to achieve a color reproducing range corresponding to not less than 100% of the NTSC ratio. It is noted that, in optimizing the color gamut of the color liquid crystal display apparatus, having the light emitting diodes as the light source, the range of chromaticity point of each color light, emitted by the red light emitting diode, green light emitting diode or the blue light emitting diode, is determined. Consequently, the optimum color gamut may be reproduced more correctly than in case only the wavelength of each light emitting diode is determined for optimizing the color gamut.

Another color liquid crystal display apparatus according to the present invention includes a transmissive color liquid crystal display panel, having a color filter, and a backlight light source for illuminating the color liquid crystal display panel from its backside. The backlight light source is made up by a red light emitting diode, a green light emitting diode and a blue light emitting diode. The color liquid crystal display apparatus also includes color mixing means for mixing the red light, green light and blue light emitted by the backlight light source. A half-value width of light emission spectrum of the green light emitting diode ranges between 30 nm and 40 nm.

With this color liquid crystal display apparatus, in which the backlight light source is made up by a red light emitting diode, a green light emitting diode and a blue light emitting diode, it is possible to provide for a broader color reproducing range of the color liquid crystal display apparatus than in the case of employing a phosphorescent tube, such as CCFL, as backlight light source.

Moreover, the half-value width of the light emission spectrum of the green light emitting diode is 30 to 40 nm, which is narrower than in a conventional apparatus, and hence it is possible to suppress color mixing of green color with other colors, especially blue color. In this manner, the color reproducing range of the color liquid crystal display apparatus may be made broader in the green color region than in the conventional system with the broader half-value width.

These objects and other objects, features and advantages of the present invention will become more apparent from the following detailed description of the preferred embodiments of the present invention.

BRIEF DESCRIPTION OF THE DRAWINGS

FIG. 30A is a graph showing chromaticity points of a green light emitting diode with a redoubled half-value width, plotted in a xy chromaticity diagram of an XYZ color system.

FIG. 30B is a graph showing the vicinity of the plots to an enlarged scale.

FIG. 32 is a schematic view showing an arrangement of a color luminance meter for measuring spectral characteristics.

BEST MODE FOR CARRYING OUT THE INVENTION

Figure 1:
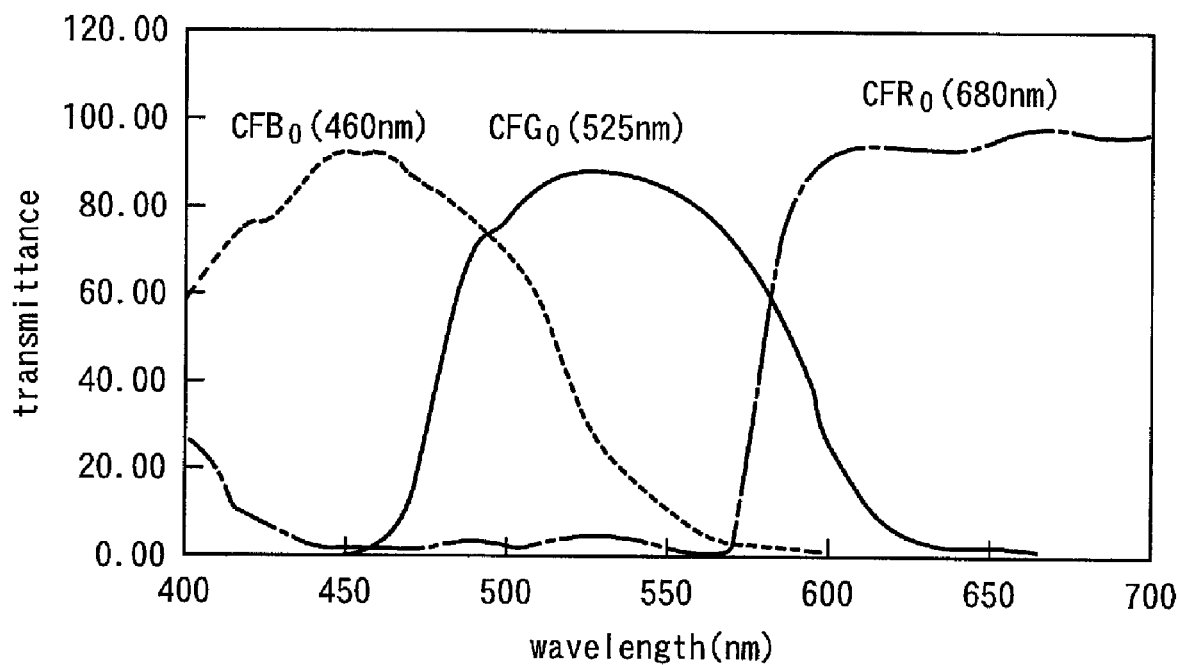
FIG. 1 is a graph showing spectral characteristics of a color filter of a color liquid crystal display panel provided on a conventional color liquid crystal display apparatus.
Figure 2:
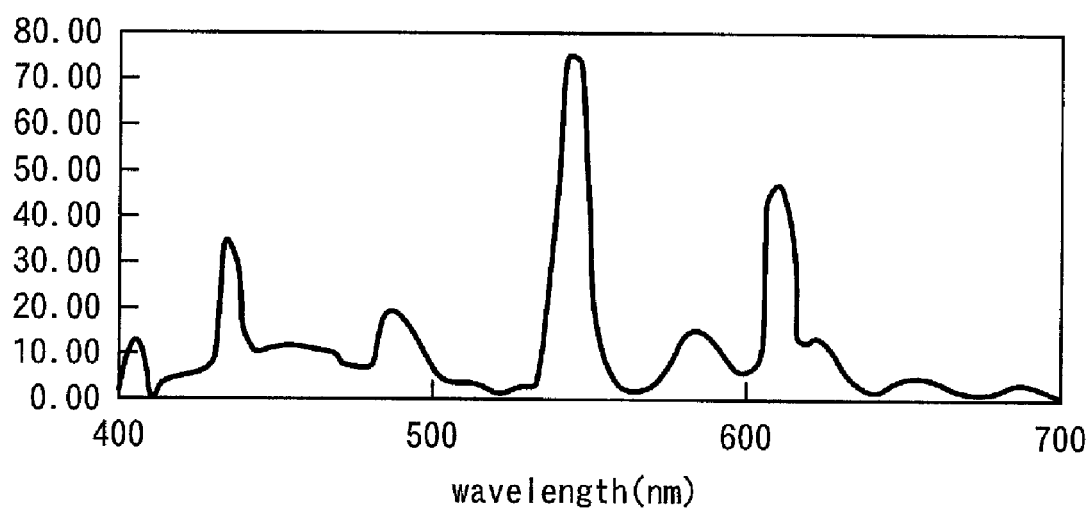
FIG. 2 is a graph showing the spectrum of a light source (CCFL) of the backlight device provided in the color liquid crystal display apparatus.
Figure 3:
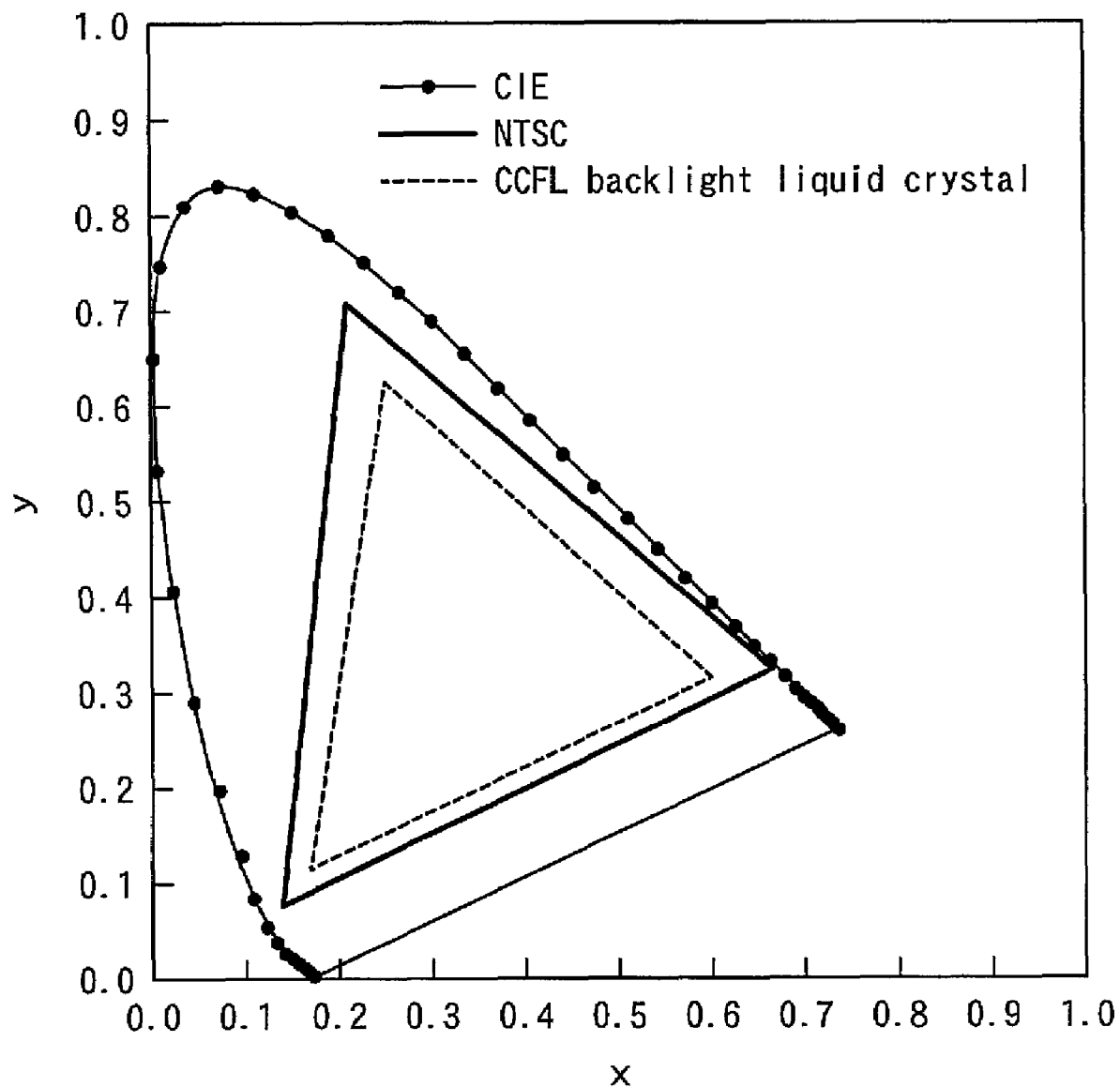
FIG. 3 is a graph showing an xy chromaticity diagram of the XYZ color system, in which there is additionally shown the color reproducing range of the conventional color liquid crystal display apparatus, employing the CCFL as light source for the backlight device.

Referring to the drawings, preferred embodiments of the present invention will be described in detail. It should be noted that the present invention is not to be limited to the embodiments now explained and may optionally be modified without departing from the scope of the invention.

Figure 4:
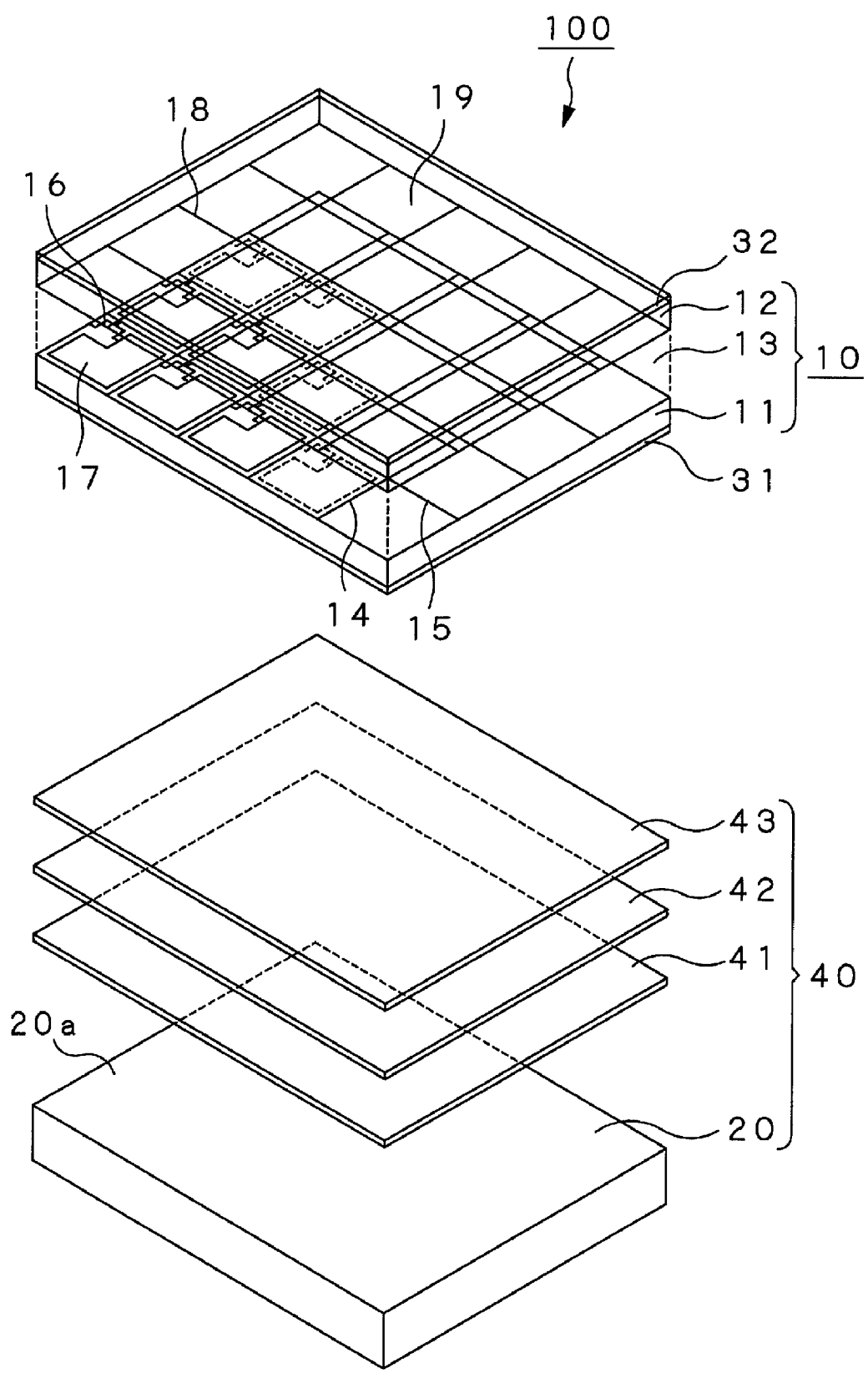
FIG. 4 is an exploded perspective view showing a color liquid crystal display apparatus embodying the present invention.

The present invention is applied to, for example, a color liquid crystal display apparatus 100 configured as shown in FIG. 4.

In this figure, the transmissive color liquid crystal display apparatus 100 is made up of a transmissive color liquid crystal display panel 10, and a backlight unit 40, provided on the backside of this color liquid crystal display panel 10. This transmissive color liquid crystal display apparatus 100 may be provided with receiving units, such as an analog tuner or a digital tuner, not shown, for receiving the ground wave or the satellite wave, a picture signal processing unit or an audio signal processing unit, not shown, for processing picture signals or audio signals, received by these receiving units, and an audio signal outputting unit, such as loudspeaker, not shown, for outputting audio signals processed by the audio signal processing unit.

The transmissive color liquid crystal display panel 10 is made up of two transparent substrates, formed by glass or the like (a TFT substrate 11 and a counter-electrode substrate 12), facing each other, and a liquid crystal layer 13 of, for example twisted nematic (TN) liquid crystal, enclosed in a space between the two substrates. On the TFT substrate 11, there are formed signal lines 14 and scanning lines 15, arranged in a matrix configuration, as well as thin-film transistors 16, as switching elements, and pixel electrodes 17, arranged at the points of intersection of the signal lines 14 and the scanning lines 15. The thin-film transistors 16 are sequentially selected by the scanning lines 15 to write picture signals, supplied from the signal lines 14, in associated ones of the pixel electrodes 17. On the inner surface of the counter-electrode substrate 12, there are formed counter electrodes 18 and a color filter 19.

Figure 5:
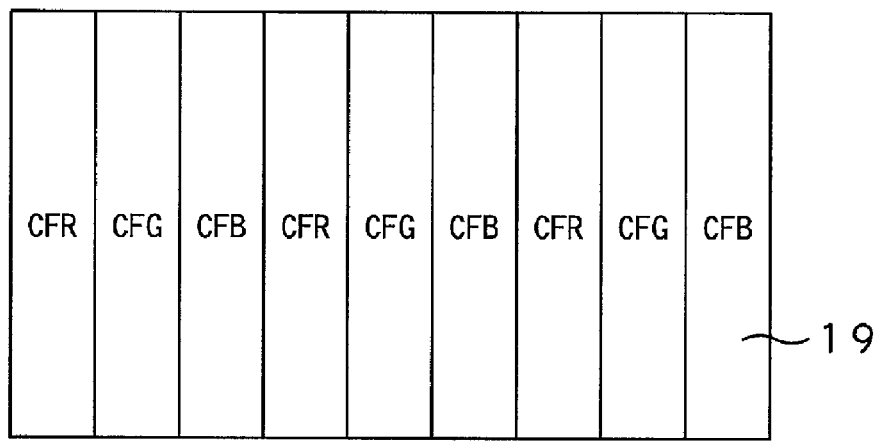
FIG. 5 is a plan view showing a color filter of a color liquid crystal display panel constituting the color liquid crystal display apparatus.

The color filter 19 will now be described. The color filter 19 is divided into a plural number of segments, each associated with a pixel. For example, the color filter is divided into three segments, associated with three prime colors, that is, a red filter CFR, a green filter CFG and a blue filter CFB, as shown in FIG. 5. The arraying pattern for the color filter may be exemplified by a delta array or a square array, not shown, in addition to the striped array shown in FIG. 5. The color filter 19 will be described in detail subsequently.

With the transmissive color liquid crystal display apparatus 100, the transmissive color liquid crystal display panel 10 is sandwiched between a pair of polarizing plates 31, 32, and driven in accordance with an active matrix system, as white light is illuminated from its backside by the backlight unit 40, such as to display a desired full-color picture.

The backlight unit 40 illuminates the color liquid crystal display panel 10 from its backside. Referring to FIG. 4, the backlight device for color liquid crystal display 40 includes a backlight device 20, and a set of optical sheets, stacked on a light radiating surface 20a of the backlight device 20, such as a light diffusing sheet 41, a prism sheet 42 and a polarized light transforming sheet 43. The backlight device 20 mixes the light from light sources to generate white light which is radiated by surface light emission from the light radiating surface 20a.

The set of optical sheets is made up of a plural number of sheets having the functions of resolving the incident light into mutually perpendicular polarized components, compensating the phase difference of a light wave to assure a broad angle of visibility, preventing coloration, diffusing the incident light and improving the luminance. The set of optical sheets is provided for transforming the light, radiated by surface light emission from the backlight device 20, into illuminating light having optimum optical characteristics for illuminating the color liquid crystal display panel 10. Consequently, the set of optical sheets may include not only the light diffusing plate 41, prism sheet 42 or polarized light transforming sheet 43, but a variety of other optical sheets having other optical functions.

Figure 6:
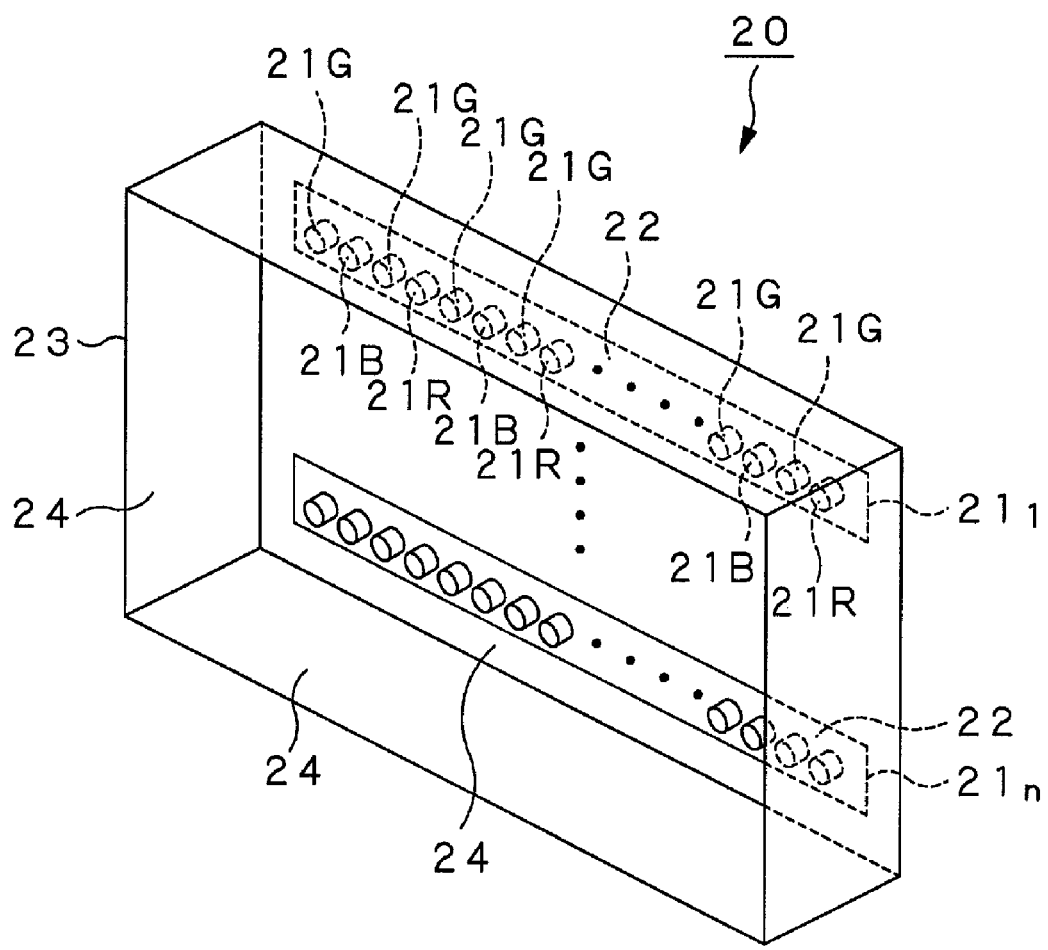
FIG. 6 is a perspective view showing a backlight device constituting a color liquid crystal display apparatus.

FIG. 6 depicts the configuration of the backlight device 20 in a schematic perspective view. Referring to FIG. 6, the backlight device 20 uses, as light sources, a red light emitting diode 21R, radiating red light, a green light emitting diode 21G, radiating green light, and a blue light emitting diode 21B, radiating blue light. In the following description, in case the red light emitting diode 21R, green light emitting diode 21G and the blue light emitting diode 21B are referred to generically, each light emitting diode is simply referred to as light emitting diode 21.

Referring to FIG. 6, a plural number of light emitting diodes 21 are arrayed on a substrate 22 in a line in a desired sequence to form a light emitting diode unit 21$n$, where n is a natural number. The sequence of arraying the light emitting diodes on the substrate 22 is such that plural green light emitting diodes 21G are arrayed at an equal distance from one another and plural red light emitting diodes 21R and blue light emitting diodes 21B are alternately arrayed in the interstices between the neighboring green light emitting diodes 21G, as shown in FIG. 6.

A plural number of rows of the light emitting diode 21$n$ are arrayed in a backlight housing 23, which is to be a backlight enclosure of the backlight device 20, depending on the size of the color liquid crystal display panel 10 adapted to be illuminated by the backlight unit 40.

The light emitting diode units 21$n$ may be arrayed in the backlight housing 23 so that the longitudinal direction of the light emitting diode units 21$n$ will be the horizontal direction, as shown in FIG. 6. Alternatively, the light emitting diode units 21$n$ may be arrayed so that the longitudinal direction of the light emitting diode units 21$n$ will be the vertical direction, in a manner not shown, or so that the longitudinal direction of the light emitting diode units 21$n$ will be partly the horizontal direction and partly the vertical direction.

The technique of arraying the light emitting diode units 21$n$ so that the longitudinal direction thereof will be the horizontal direction or the vertical direction is equivalent to that of arraying the fluorescent tubes so far used preferentially as light sources of the backlight device. Thus, the accumulated designing know-how may be used to reduce the cost or manufacture time.

The light beams, radiated from the red light emitting diode 21R, green light emitting diode 21G and the blue light emitting diode 21B, are mixed together in the backlight housing 23 to form white light. It should be noted that a lens, a prism or a reflective mirror, for example, is to be provided for each light emitting diode 21 so that the red light, green light and blue light, radiated from each light emitting diode 21, will be evenly mixed together in the backlight housing 23 to form radiated light of wide directivity.

Within the backlight housing 23, there are provided a diverter plate, not shown, having the color mixing function of mixing the light of the respective colors, radiated from the light emitting diodes 21, as light source, to form white light plagued with only little color unevenness, and a diffusing plate for internal light diffusion for surface emission of white light radiated from the diverter plate.

The white light, generated on color mixing by the backlight housing 20, is illuminated to the color liquid crystal display panel 10 from its backside via the set of optical sheets described above.

Figure 7:
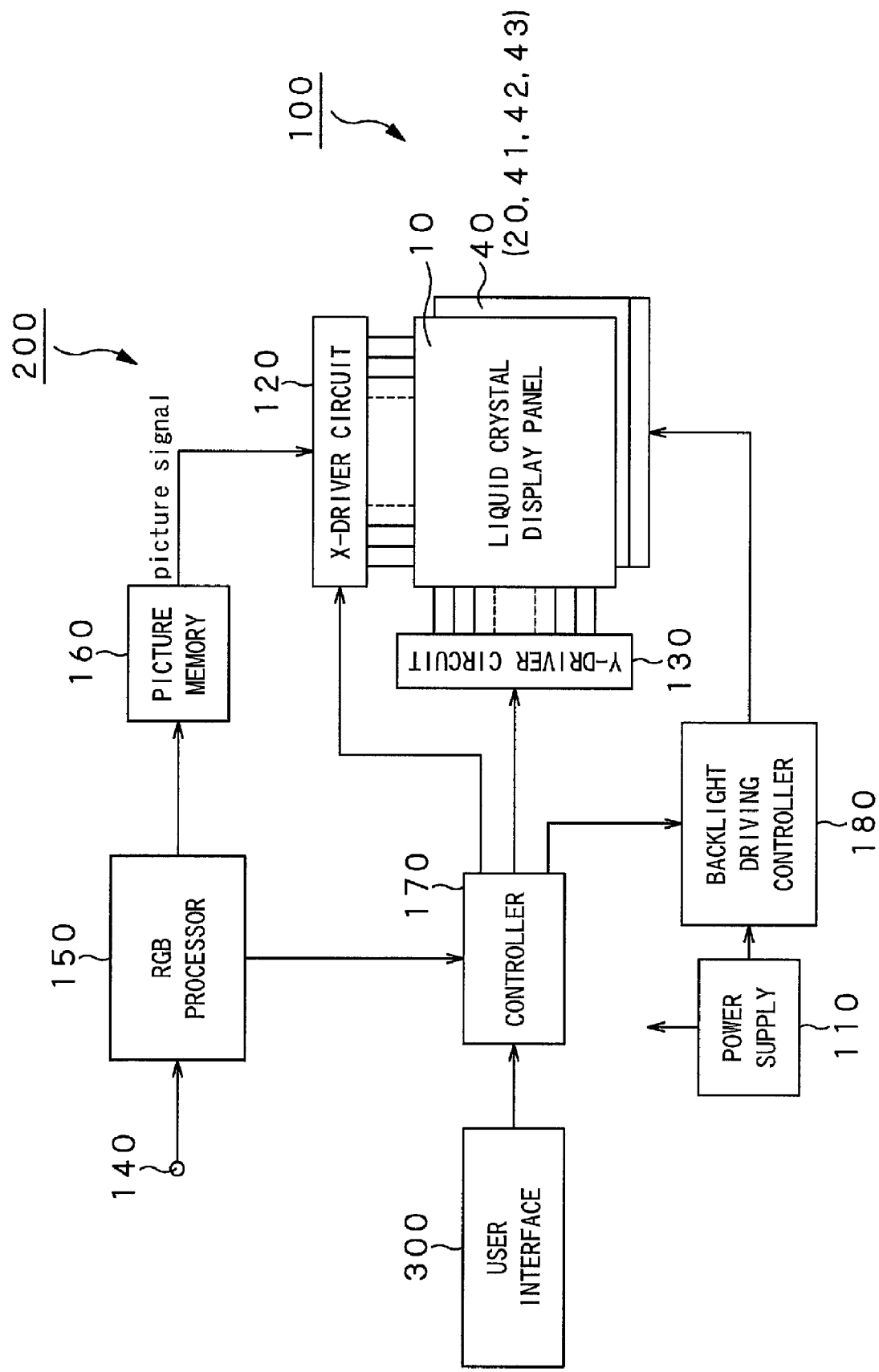
FIG. 7 is a block circuit diagram showing a driving circuit for driving the color liquid crystal display apparatus.

The color liquid crystal display apparatus 100 is driven by a driving circuit 200 shown for example in FIG. 7.

This driving circuit 200 includes a power supply unit 110 for supplying driving supply power for e.g. the color liquid crystal display panel 10 and the backlight device 20, and an X-driver circuit 120 as well as a Y-driver circuit 130 for driving the color liquid crystal display panel 10. The driving circuit also includes an RGB processor 150, supplied via an input terminal 140 with picture signals from outside or with picture signals received by a receiver, not shown, of the color liquid crystal display apparatus 100, and which are processed by a picture signal processor. The driving circuit also includes a picture memory 160 and a controller 170, both connected to the RGB processor 150, and a backlight driving controller 180 for driving controlling the backlight device 20 of the backlight unit 40.

In this driving circuit 200, the picture signals, transmitted as input via input terminal 140, are subjected to e.g. chroma processing, by the RGB processor 150, and converted from the composite signals into RGB separate signals, for convenience in driving the color liquid crystal display panel 10. The resulting signals are transmitted to the controller 170, while being transmitted via picture memory 160 to the X-driver circuit 120.

The controller 170 controls the X-driver circuit 120 and the Y-driver circuit 130, at a preset timing, as matched to the RGB separate signals, in order to drive the color liquid crystal display panel 10 by RGB separate signals, supplied via picture memory 160 to the X-driver circuit 120, so as to display a picture corresponding to the RGB separate signals.

The backlight driving controller 180 generates a pulse-width modulated signal (PWM signal) from the voltage supplied from the power supply unit 110 to drive respective light emitting diodes 21 operating as light sources for the backlight device 20. In general, the color temperature of a light emitting diode depends on the operating current. Thus, if desired to faithfully reproduce the color (to render the color temperature constant) as desired luminance is procured, it is necessary to drive the light emitting diode 21, using the PWM signal, to suppress variations in color.

A user interface 300 is an interface for selecting a channel received by the aforementioned receiving unit, not shown, adjusting the volume of audio output from an audio output unit, not shown, and for adjusting the white balance or the luminance of white light from the backlight device 20 adapted for illuminating the color liquid crystal display panel 10.

For example, if the user has adjusted the luminance from the user interface 300, a luminance control signal is transmitted to the backlight driving controller 180 via controller 170 of the driving circuit 200. The backlight driving controller 180 is responsive to this luminance control signal to vary the duty ratio of the PWM signal for each of the red light emitting diode 21R, green light emitting diode 21G and the blue light emitting diode 21B to effect driving control of the red light emitting diode 21R, green light emitting diode 21G and the blue light emitting diode 21B.

The color liquid crystal display apparatus 100, configured as described above, enlarges the color reproducing range of a picture displayed on the color liquid crystal display panel 10 by matching, by way of optimization, the characteristics of the red filter CFR, green filter CFG and the blue filter CFB, provided on the color liquid crystal display panel 10, to those of the light emitting diodes 21R, 21G and 21B, provided on the backlight device 20.

This color liquid crystal display apparatus 100 may include a receiving unit, such as an analog tuner or a digital tuner, not shown, for receiving the ground wave or the satellite wave, a picture signal processing unit or an audio signal processing unit for processing picture signals or audio signals, also not shown, and an audio signal outputting unit, such as loudspeaker, also not shown, for outputting audio signals processed by the audio signal processing unit.

Figure 8:
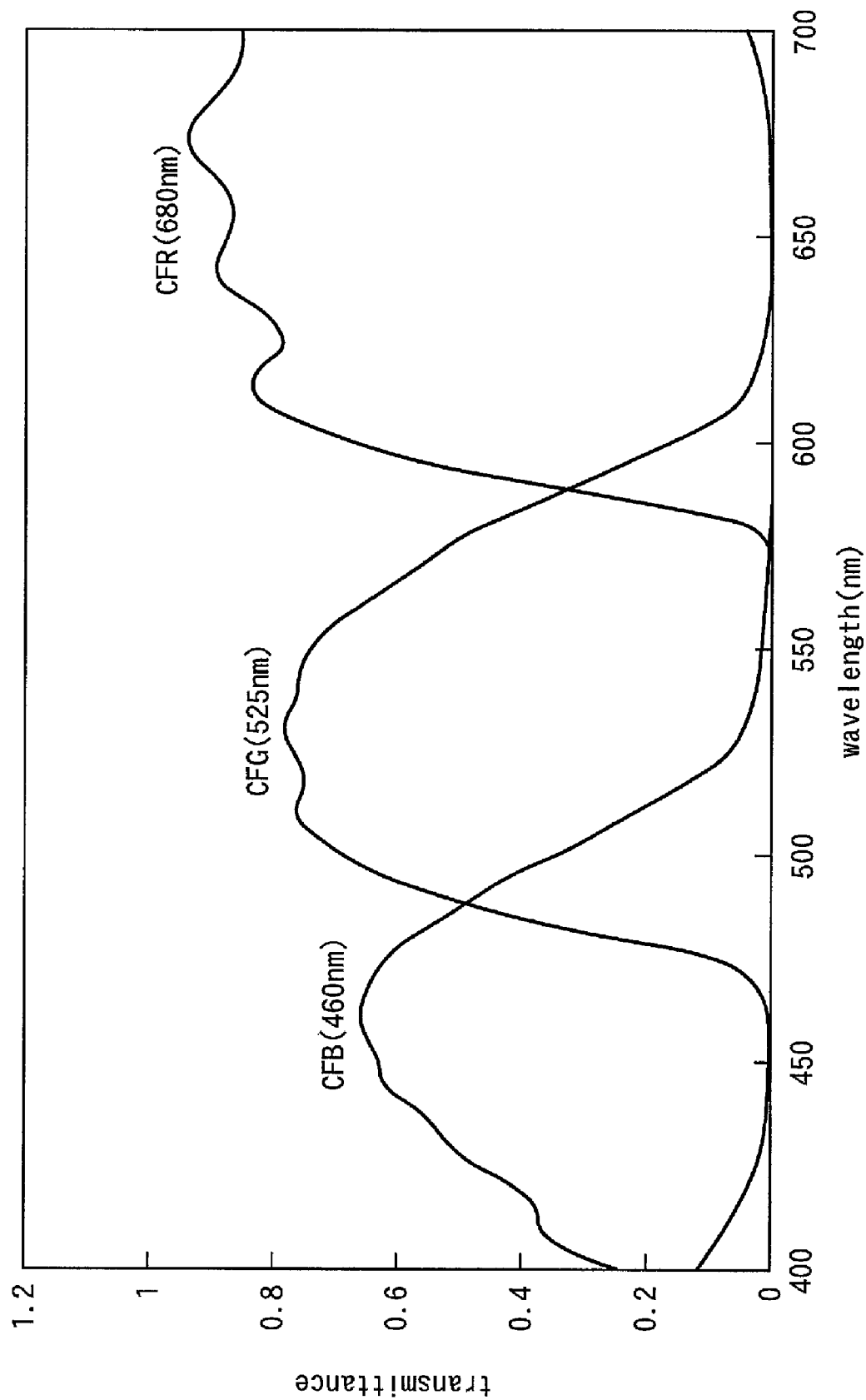
FIG. 8 is a graph showing spectral characteristics of the color filter of the color liquid crystal display panel provided on the color liquid crystal display apparatus.

In the color liquid crystal display apparatus 100, described above, the color filter 19, provided on the color liquid crystal display panel 10, is constituted by a red filter CFR (680 nm), a green filter CFG (525 nm) and a blue filter CFB (460 nm), having spectral characteristics shown in FIG. 8. Meanwhile, the numerical figures in parentheses indicate peak transmitting wavelengths of the respective color filters.

If it is desired to improve color purity of display light through the color liquid crystal display panel 10, illuminated by the backlight unit 40, or to enlarge the color gamut, it is necessary that the color filters, the transmission wavelength ranges of which are adjacent to each other, will be separated from each other as much as possible.

For example, the transmission wavelength range of the red filter CFR is shifted towards the long wavelength side so that the amount of the green light emitted by the green light emitting diode 21G and transmitted through the red filter CFR will be as small as possible. On the other hand, the transmission wavelength range of the blue filter CFB is shifted towards the short wavelength side so that the amount of the green light emitted by the green light emitting diode 21G and transmitted through the blue filter CFB will be as small as possible.

Moreover, as the transmission wavelength range of the red filter CFR is shifted towards the long wavelength side and that of the blue filter CFB is shifted towards the short wavelength side, the peak wavelength of the red light, emitted by the red light emitting diode 21R, and the peak wavelength of the blue light, emitted by the blue light emitting diode 21B, are shifted towards the long wavelength side and towards the short wavelength side, respectively. By so doing, the proportions of the blue light and the red light, transmitted through the transmission wavelength range of the green filter CFG, may be decreased to suppress color mixing, thus improving color purity and enlarging the color gamut.

That is, in order to improve color purity and to enlarge the color gamut, the transmission wavelength ranges of the red filter CFR, green filter CFG and the blue filter CFB as well as the peak wavelengths of the red light emitting diode 21R, green light emitting diode 21G and the blue light emitting diode 21B become crucial.

Figure 9:
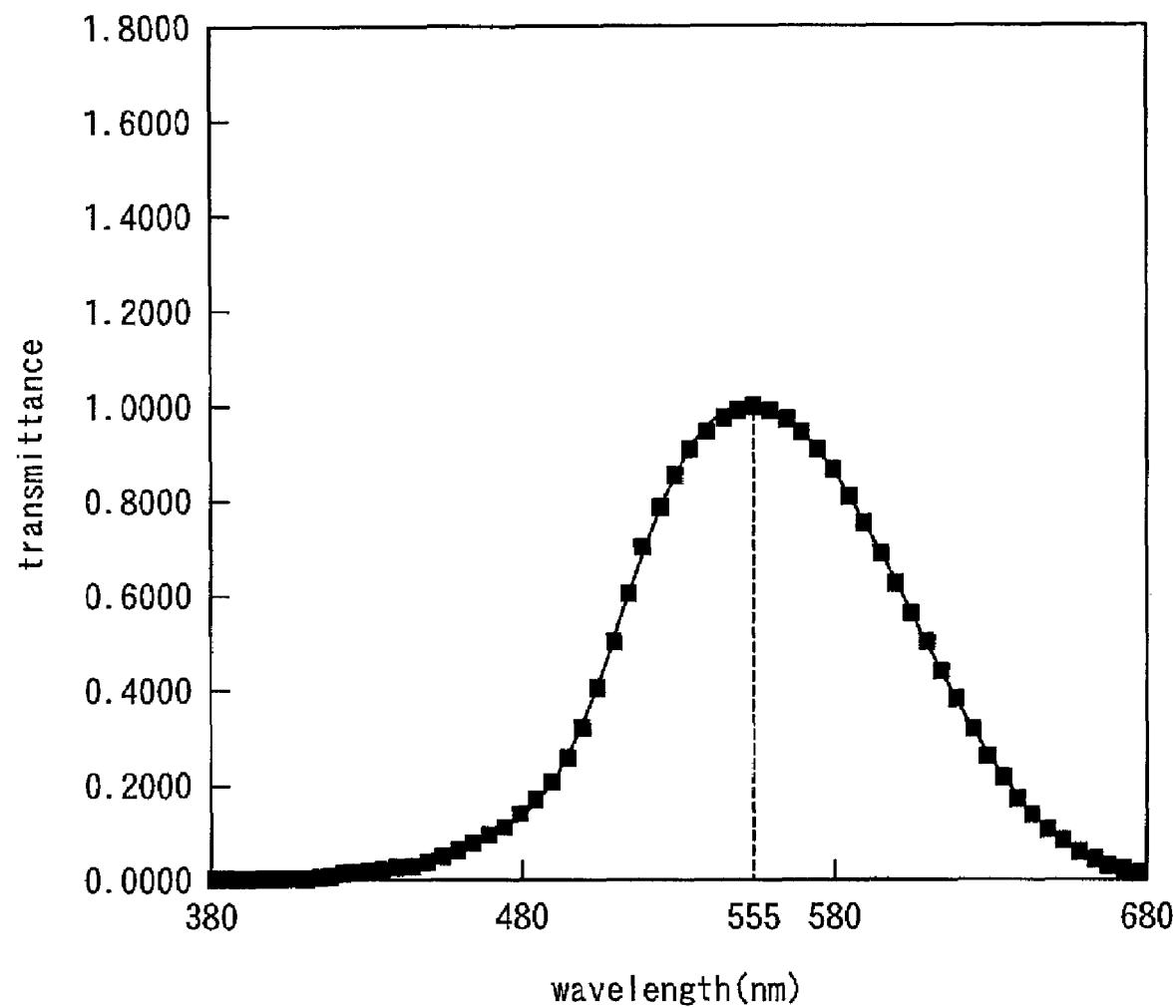
FIG. 9 is a graph for illustrating the visibility.

On the other hand, the sensitivity of the human eye to light (visibility) differs with wavelengths, such that it reaches a peak value at 555 nm, becoming lower towards the long wavelength side and towards the short wavelength side, as shown in FIG. 9. In this figure, there is shown a relative visibility curve in which the peak value of visibility at 555 nm is normalized to unity (1).

Thus, the visibility is lowered if the peak wavelength of the red color light, emitted by the red light emitting diode 21R, and the peak wavelength of the blue color light, emitted by the blue light emitting diode 21B, are shifted excessively towards the long wavelength side and towards the short wavelength side, respectively. In this case, an extremely high power would be needed to raise the visibility.

Thus, if the peak wavelength of the red color light, emitted by the red light emitting diode 21R, and the peak wavelength of the blue color light, emitted by the blue light emitting diode 21B, are shifted towards the long wavelength side and towards the short wavelength side, respectively, insofar as the power efficiency is not lowered, it is possible to improve color purity and to enlarge the color gamut.

[Half-value Width]

As regards the light emitting diode 21, as light source, not only the aforementioned peak wavelengths, but also the spectral distribution thereof represents an important factor for improving color purity and enlarging the color gamut. The spectral distribution of the light emitting diode 21 basically follows the Gaussian distribution, however, it shows variegated shapes of spectral distribution, depending on manufacturing processes or other factors. Thus, if only the peak wavelength of the light emitting diode 21 is specified, the spectral distribution is not known. In this case, the effect of the difference in the spectral distribution on the chromaticity points is disregarded, with the consequence that the correct color reproducing range cannot be prescribed.

The shape of the spectral distribution may roughly be specified by using a half-value width of the spectral distribution, termed PW (Pulse Width) 50 or FWHM (Full Width at Half Maximum). For example, if the half-value width of each color light, emitted from the light emitting diode 21 is narrowed, the spectral distribution of the color light is such that the color light is not overlapped with the transmission wavelength ranges of the neighboring color filters, with the result that the light transmitted through the color filter 19 is improved in color purity and enlarged in color gamut. However, as the half-value width is narrowed, luminance is decreased. Thus, in order to secure desired luminance, the half-value width, which is more or less broad, is required.

In particular, the visibility of the green light is extremely high, as may be seen from the curve of relative visibility shown in FIG. 9. It is therefore necessary that the half-value width of the green color light, emitted by the green light emitting diode 21G, is broader than those of the other colors. For this reason, the half-value width of the green color light is usually about twice that of the red color light or the blue color light.

In this manner, with the half-value width of each color light, it is possible to specify roughly the shape of the spectral distribution which cannot be defined if solely the peak wavelength is considered. Hence, the half-value width is a crucial parameter in determining the range of the optimum chromaticity points for improving the color purity and for enlarging the color gamut. Thus, the optimum ranges of the half-value widths of the red color light, green color and the blue color light, emitted by the red light emitting diode 21R, green light emitting diode 21G and the blue light emitting diode 21B, respectively, are found, by measurements 1 through to 4, as now explained, such as to improve color purity and to enlarge the color gamut.

[Measurement 1]

Initially, the chromaticity points are measured, using the red light emitting diode 21R (with the peak wavelength $\lambda pr=640$ m), green light emitting diode 21G (with the peak wavelength $\lambda pg=525$ m) and the blue light emitting diode 21B (with the peak wavelength $\lambda pb=450$ nm), in order to find the optimum ranges of the half-value widths. It is noted that these peak wavelengths are optimum for matching to the color filter 19 shown in FIG. 8. The NTSC (National Television System Committee) ratio is then found.

Figure 10:
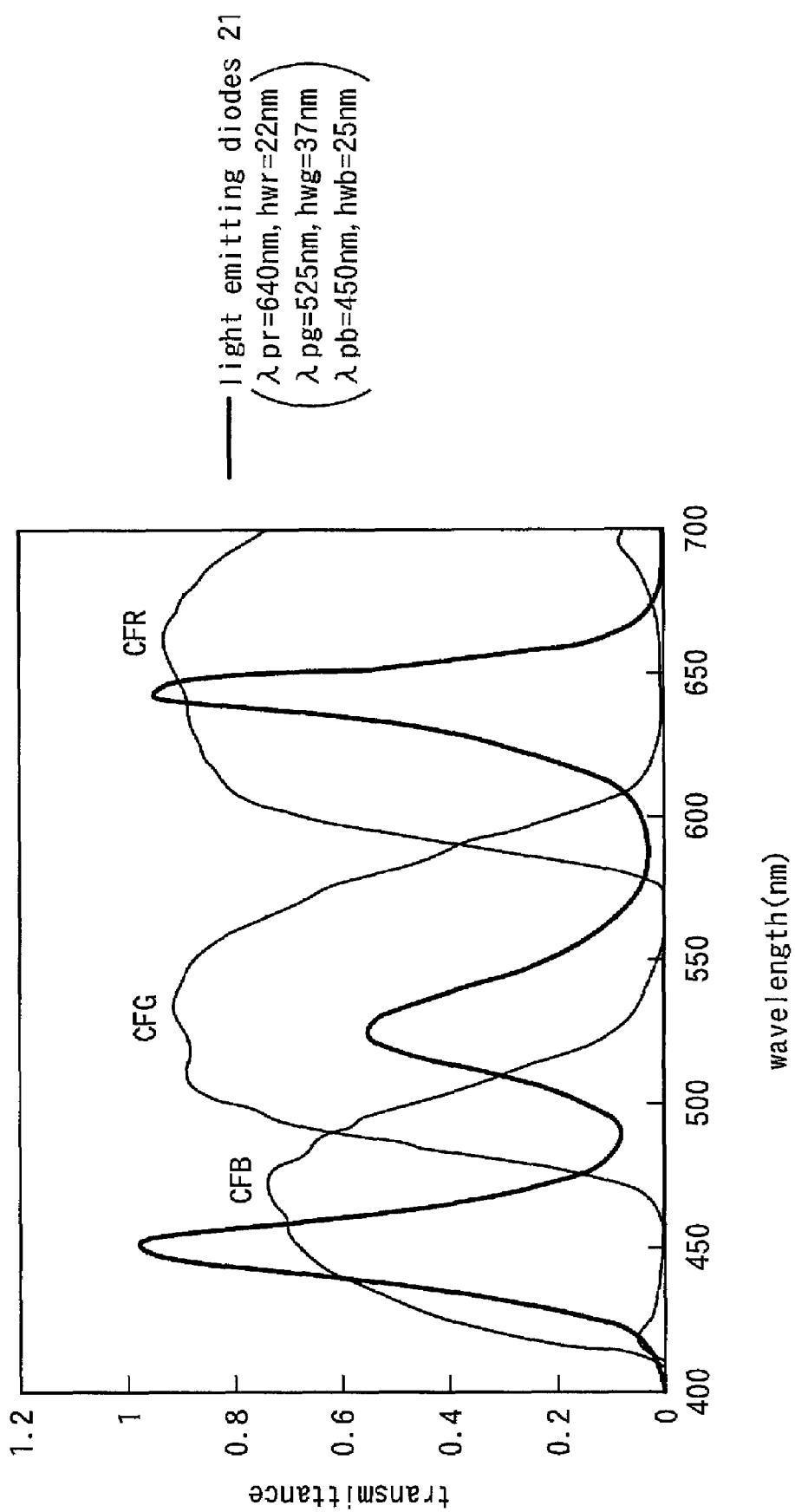
FIG. 10 is a graph for illustrating spectral characteristics of light emitting diodes and a color filter used in measurement 1.
Figure 11:
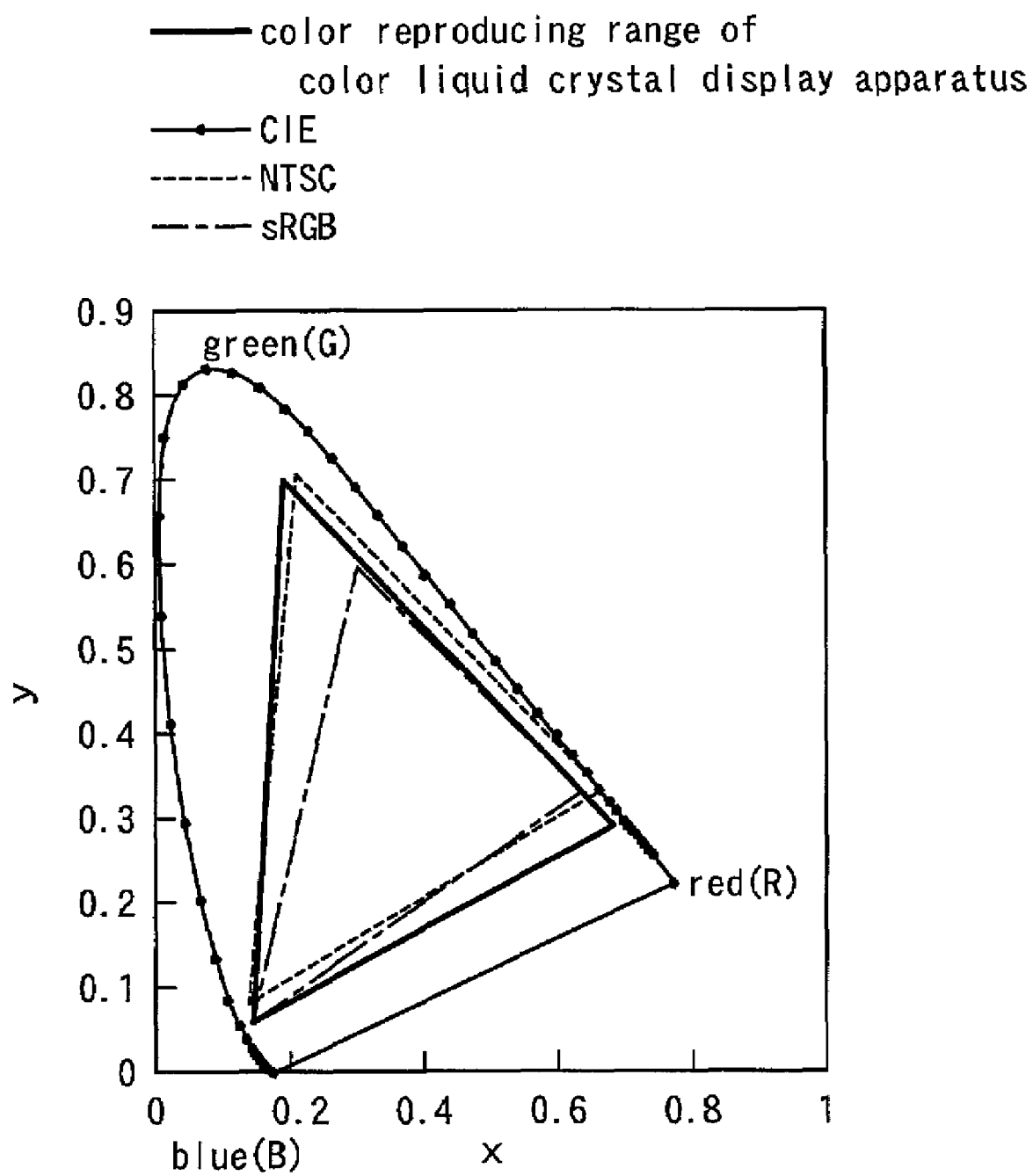
FIG. 11 is a graph representing an xy chromaticity diagram of the XYZ color system in which there is indicated a color reproducing range of a color liquid crystal display apparatus employing the light emitting diodes of measurement 1 as the light source of the backlight device.

If the half-value width hwr of red color light, the half-value width hwg of the green color light and the half-value width hwb of the blue color light are 22 nm, 37 nm and 25 nm, respectively, the spectral characteristics of the color filter 19 and the light emitting diodes 21 are as shown in FIG. 10. The chromaticity points in case the light emitting diodes 21 having the characteristics as shown emit light are measured and plotted on the xy chromaticity diagram of the XYZ color system as prescribed by the Commission Internationale de l'Eclairage (CIE). The color reproducing ranges of the color liquid crystal display apparatus 100, thus found, are shown in FIG. 11. It may also be seen that the NTSC ratio after transmission through the color liquid crystal display panel 10 is 105.3%, exceeding the value of 100% NTSC ratio.

Meanwhile, there are also shown in FIG. 11, by way of reference, the color reproducing ranges of the sRGB standard, as prescribed by the IEC (International Electro-technical Commission), as a standard color space for computer display, in addition to the color reproducing ranges of the NTSC system.

In the measurements to follow, the red light emitting diode 21R, green light emitting diode 21G and the blue light emitting diode 21B, emitting the red color light, green color light and the blue color light, respectively, having spectral distributions shown in FIG. 10, are to be reference light emitting diodes 21. The following Table 1 shows the relationship between the peak wavelengths $\lambda p$ and the half-value widths hw of these reference light emitting diodes 21.

TABLE 1

|  | Peak wavelength ($\lambda p$) | Half-value width (hw) |
|---|---|---|
| Red LED 21R | 640 nm | 22 nm |
| Green LED 21G | 525 nm | 37 nm |
| Blue LED 21B | 450 nm | 25 nm |

[Measurement 2]

Three sorts of green light emitting diodes 21G, having different half-value widths of the green color light, were provided, for the case in which the separation between the peak wavelength values of the green color light and the peak wavelength value of the blue color light is narrowed down to provide for a stronger effect of color mixing. An optimum range of the half-value width of the green color light was then found.

As may be seen from FIG. 10, the separation between the peak wavelength of the green color light and that of the blue color light, which will accomplish the NTSC ratio (peak wavelength interval) of 100% or higher, is narrower than the peak wavelength interval between the red color light and the green color light.

This suggests that, in case the half-value width of the green color light is made broader in order to secure luminance, the proportion of the green light transmitted through the transmission wavelength range of the blue filter CFB is increased, with the consequence that color mixing occurs to lower color purity and to narrow the color gamut. It follows from this that the upper limit of the half-width value of the green color light may be found by finding the half-value width of the green color light which will give an NTSC ratio of 100% or higher even in case the peak wavelength of the green color light is drawn close to that of the blue color light.

Specifically, the peak wavelengths of the green light emitting diode 21G and the blue light emitting diode 21B are shifted towards the short wavelength side and towards the long wavelength side, respectively, from the reference peak wavelengths shown in FIG. 10, each by 5 nm, so that the peak wavelength $\lambda pg$ of the green color light and the peak wavelength $\lambda pb$ of the blue color light will be 520 nm and 455 nm, respectively, such as to narrow down the separation between the peak wavelengths of the green color light and the blue color light. The red light emitting diode 21R is selected so that it will emit red color light having the peak wavelength $\lambda pr$ equal to that for the measurement 1, that is, 640 nm. The half-value width setting is the same as that for measurement 1, that is, the half-value width hwr of the red color light is set to and fixed at 22 nm and that hwb of the blue color light is set to and fixed at 25 nm. Three types of the green light emitting diodes 21G, that is, those with the half-value widths hwg of 37 nm, 43 nm and 74 nm, were provided. The conditions for the light emitting diodes 21, described above, may be summarized as shown in the following Table 2. The measurement 2 was carried out using the red light emitting diode 21R, green light emitting diode 21G and the blue light emitting diode 21B having the peak wavelengths $\lambda p$ and the half-value widths hw as tabulated.

Figure 12:
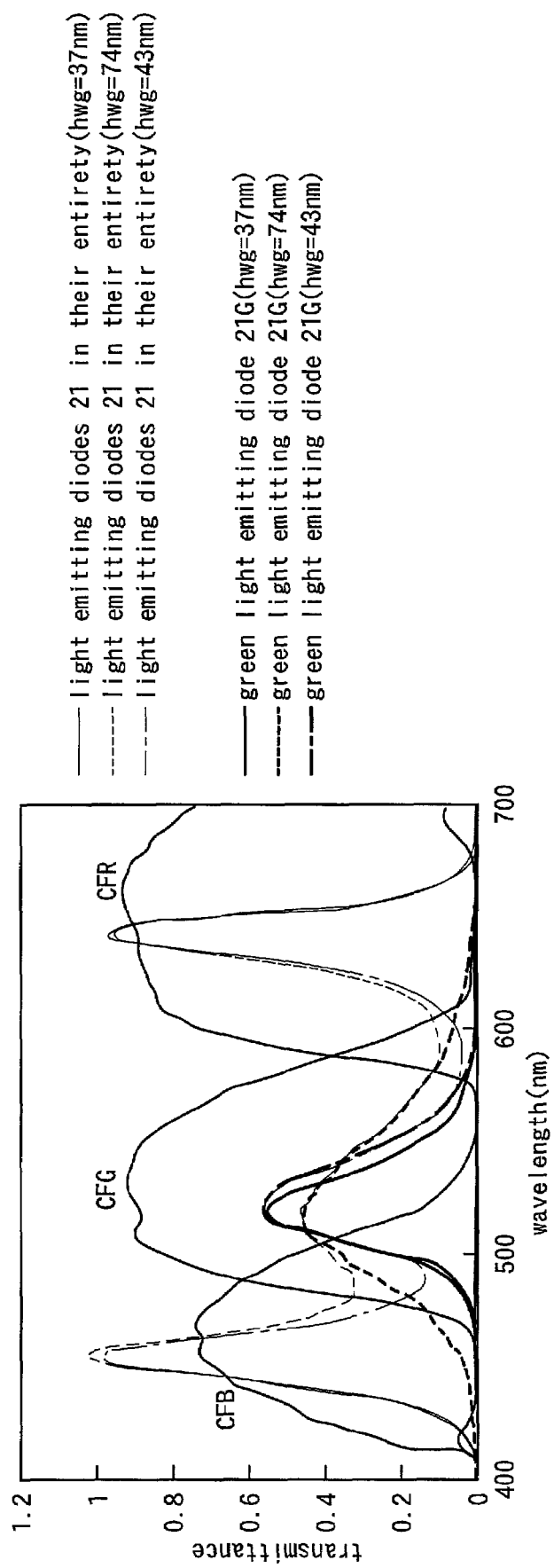
FIG. 12 is a graph for illustrating spectral characteristics of light emitting diodes and a color filter used in measurement 2.
Figure 13:
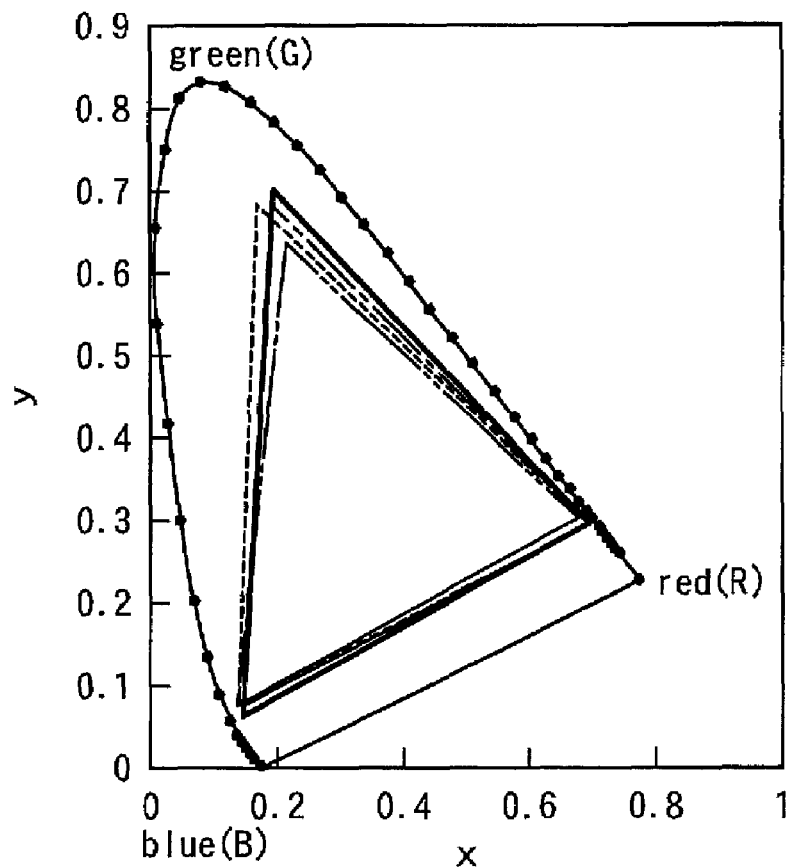
FIG. 13 is a graph representing a xy chromaticity diagram of the XYZ color system in which there is indicated a color reproducing range of a color liquid crystal display apparatus employing the light emitting diodes of measurement 2 as the light source of the backlight device.

The spectral characteristics of the color filter 19 and the light emitting diodes 21 for this case are shown in FIG. 12. Also, measurements were made of the chromaticity points in case the light emitting diodes 21 were caused to emit light as the half-value widths of the green color light were varied. The chromaticity points thus measured were plotted on the xy chromaticity diagram of the XYZ color system as prescribed by the Commission Internationale de l'Eclairage (CIE). FIG. 13 shows the color reproducing ranges of the color liquid crystal display apparatus 100 for this case. In FIG. 13, there are also shown, as reference, the color reproducing ranges by the red light emitting diode 21R, green light emitting diode 21G and the blue light emitting diode 21B shown in FIG. 11. FIG. 13 shows that the broader the half-value width of the green color light, the severer becomes the color mixing of the green color light and the blue color light, thus narrowing the color gamut.

TABLE 2

| | Peak wavelength ($\lambda$p) | (1) Half-value width (hw) | (2) Half-value width (hw) | (3) Half-value width (hw) |
| --- | --- | --- | --- | --- |
| LED 21R | 640 nm | 22 nm | 22 nm | 22 nm |
| LED 21G | 520 nm | 37 nm | 43 nm | 74 nm |
| LED 21B | 455 nm | 25 nm | 25 nm | 25 nm |

Figure 14:
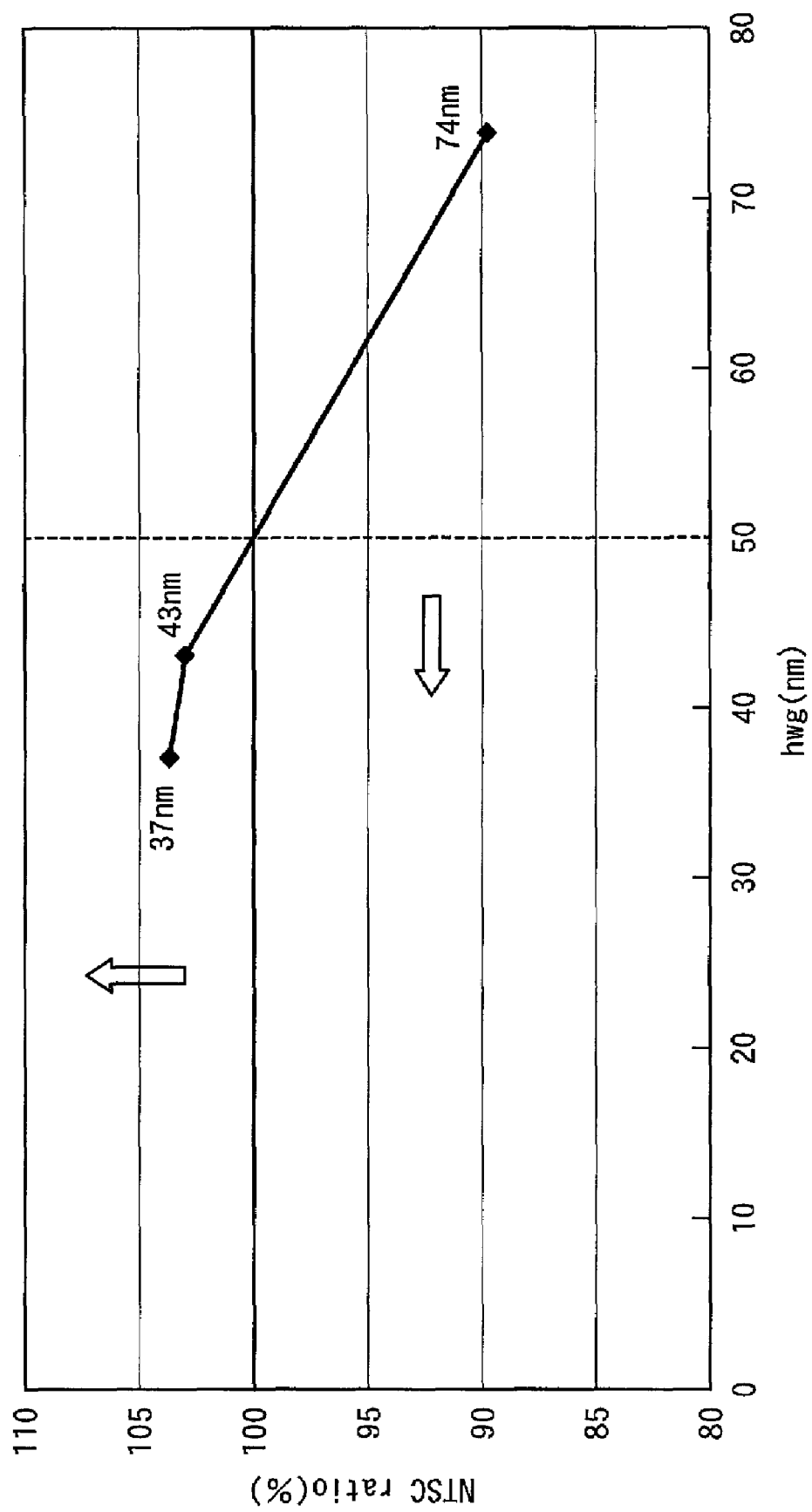
FIG. 14 is a graph showing the NTSC ratio of the color liquid crystal display apparatus for the measurement 2 in relation to dependency on the half-value width of the green light emitted by the green light emitting diode.

FIG. 14 shows dependency on the half-value width of the green color light of the NTSC ratio as measured for light transmitted through the color liquid crystal display panel 10. As may be seen from FIG. 14, the broader the half-value width of green color light, the lower becomes the NTSC ratio and the narrower becomes the color gamut. Specifically, the half-value width of green color light hwg needs to be 50 nm or less if it is desired to maintain the NTSC ratio equal to 100%. That is, if the half-value width of green color light hwg becomes broader than 50 nm, the NTSC ratio of 100% cannot be achieved.

In this manner, in measurement 2, the half-value width hwg of green color light was varied in the worst case where the separation between the peak wavelength $\lambda$pg of green color light and that $\lambda$pb of blue color light was narrowed. It may be seen that, for improving color purity and achieving a broad color gamut corresponding to the NTSC ratio of not lower than 100%, it is necessary to set the half-value width hwg of green color light to 50 nm or less.

{Measurement 3}

In the next measurement 3, three sorts of blue light emitting diodes 21B, with the peak wavelengths of 450 nm, 455 nm and 460 nm, were newly provided for verifying the effect brought about by the separation between the peak wavelength of blue color light and that of green color light. The green light emitting diodes, with the half-value widths of 37 nm, 43 nm and 74 nm, used in the measurement 2, were combined with each of these blue light emitting diodes 21B, to give light sources for the backlight device 20, and the NTSC ratio was found for each of these light sources. By so doing, it is possible to find an upper limit of an optimum half-value width of the green color light in dependence upon the difference in the separation between the peak wavelength of green color light and that of blue color light. The red light emitting diode 21R, emitting red light with the peak wavelength $\lambda$pr of 640 nm and the half-value width hwr of 22 nm, is used. The half-value width hwb of blue color light, emitted by the blue light emitting diode 21B, is fixed at 25 nm.

The conditions for the light emitting diode 21, described above, may be summarized as shown in Table 3 (for $\lambda$pb=450 n) and in Table 4 (for $\lambda$pb=460 n). In the following measurement 3, the red light emitting diode 21R, green light emitting diode 21G and the blue light emitting diode 21B, having the peak wavelengths $\lambda$p and the half-value widths hw, as shown in the Tables, are used for measurement. The conditions for $\lambda$pb=455 nm are the same as those of the measurement 2, described above and shown in Table 2, and hence the description or the tabulation is omitted for simplicity.

TABLE 3

| | Peak wavelength ($\lambda$p) | (1) Half-value width (hw) | (2) Half-value width (hw) | (3) Half-value width (hw) |
| --- | --- | --- | --- | --- |
| LED 21R | 640 nm | 22 nm | 22 nm | 22 nm |
| LED 21G | 520 nm | 37 nm | 43 nm | 74 nm |
| LED 21B | 450 nm | 25 nm | 25 nm | 25 nm |

TABLE 4

| | Peak wavelength ($\lambda$p) | (1) Half-value width (hw) | (2) Half-value width (hw) | (3) Half-value width (hw) |
| --- | --- | --- | --- | --- |
| LED 21R | 640 nm | 22 nm | 22 nm | 22 nm |
| LED 21G | 520 nm | 37 nm | 43 nm | 74 nm |
| LED 21B | 460 nm | 25 nm | 25 nm | 25 nm |

Figure 15:
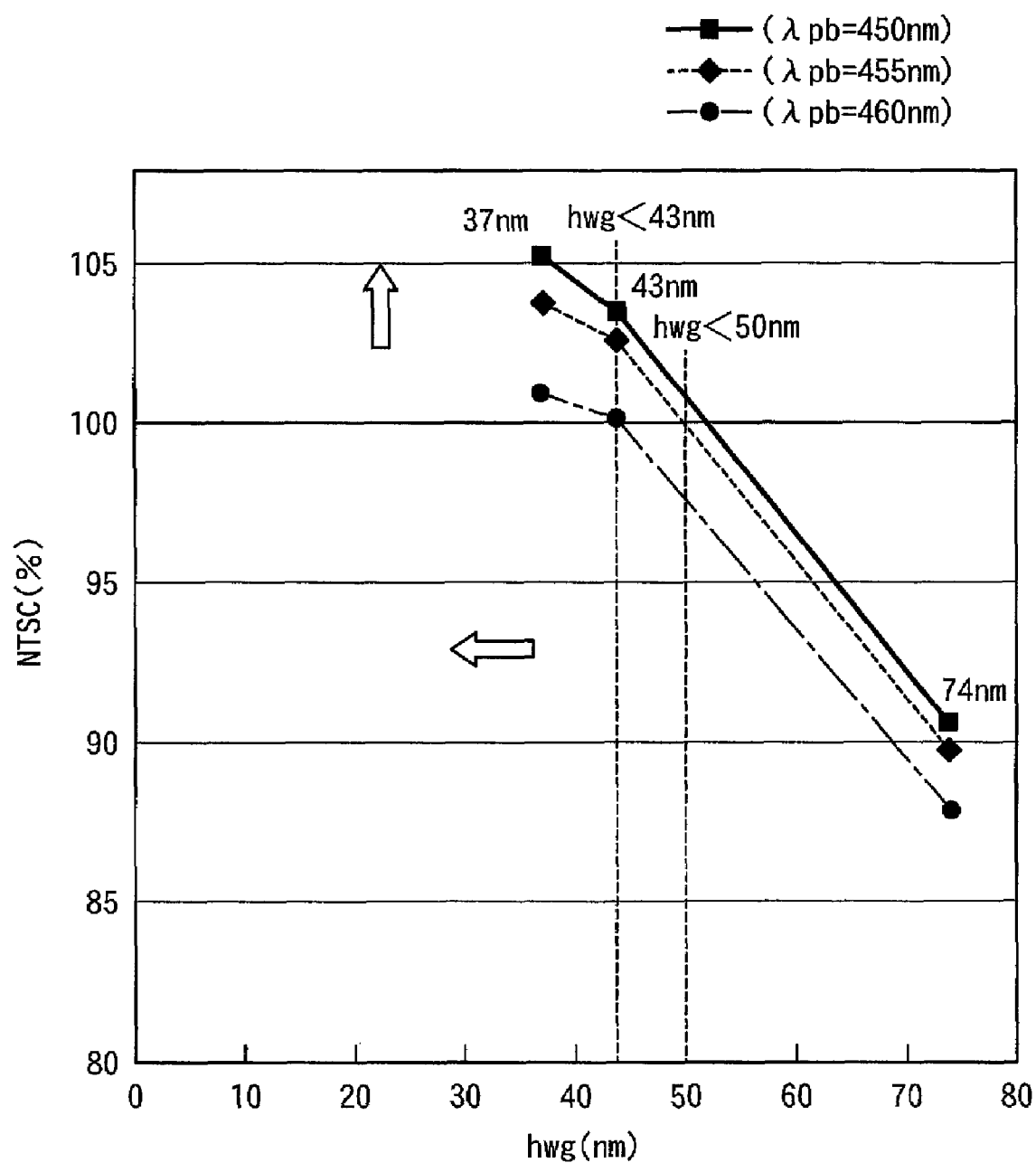
FIG. 15 is a graph showing the NTSC ratio of the color liquid crystal display apparatus for the measurement 3 in relation to dependency on the half-value width of the green light emitted by the green light emitting diode.

FIG. 15 shows how the NTSC ratio following light transmission through the color liquid crystal display panel 10 is changed in case the half-value width of green color light is changed (hwg: 37 nm, 43 nm, 74 nm) for each of the peak wavelengths of blue color light ($\lambda$pb: 450 nm, 455 nm, 460 nm). As may be seen from FIG. 16, if the peak wavelength $\lambda$pb of blue color light, emitted by the blue light emitting diode 21B, is 455 nm or less, the NTSC ratio of 100% or higher may be achieved for the half-value width hwg equal to 50 nm or less of green color light, emitted by the green light emitting diode 21G. It may also be seen that, if the peak wavelength $\lambda$pb of blue color light is 460 nm, the NTSC ratio of 100% cannot be achieved unless the half-value width hwg of green color light is set to 43 nm or less.

{Measurement 4}

As regards the half-value widths of the light emitting diodes 21, emitting the light of the respective colors, if the half-value width hwg of the green color light, that necessarily has to be set so as to be broader than that of red color light or blue color light, is prescribed as described above, color purity may be improved to such an extent that the NTSC ratio of 100% or higher may be achieved, thereby providing for a broad color gamut. However, since the separation between the peak wavelength of green color light and that of blue color light is narrow, the proportion of blue color light transmitted through the transmission wavelength range of the green filter CFG is increased, depending on the half-value width of blue color light, thus possibly giving rise to color mixing and to lowered color purity, as described above. Hence, in the measurement 4, the effect brought about by the half-value width of blue color light is verified.

Specifically, there was provided a blue light emitting diode 21B, in which the half-value width hwb of blue color light was increased by 5 nm to 30 nm from the fixed value of 25 nm in the measurements 1 to 3, and in which the peak wavelength $\lambda$pb was set to 455 nm. The green light emitting diodes 21G, with the half-value widths of 37 nm, 43 nm and 74 nm, also used in the measurement 2, were also used. For each of the combinations of the LEDs, the color reproducing range of the color liquid crystal display apparatus 100 was measured to find the NTSC ratio. As for the red light emitting diode 21R, the red light emitting diode with the peak wavelength $\lambda$pr of the red color light of 640 nm and with the half-value width hwr of 22 nm was used.

The conditions for the light emitting diodes 21, described above, may be summarized as shown in the following Table 5. The measurement 4 was carried out using the red light emitting diode 21R, green light emitting diode 21G and the blue light emitting diode 21B, having the peak wavelengths λp and the half-value widths hw as tabulated.

TABLE 5

| | Peak wavelength (λp) | (1) Half-value width (hw) | (2) Half-value width (hw) | (3) Half-value width (hw) |
|---|---|---|---|---|
| LED 21R | 640 nm | 22 nm | 22 nm | 22 nm |
| LED 21G | 520 nm | 37 nm | 43 nm | 74 nm |
| LED 21B | 455 nm | 30 nm | 30 nm | 30 nm |

Figure 16:
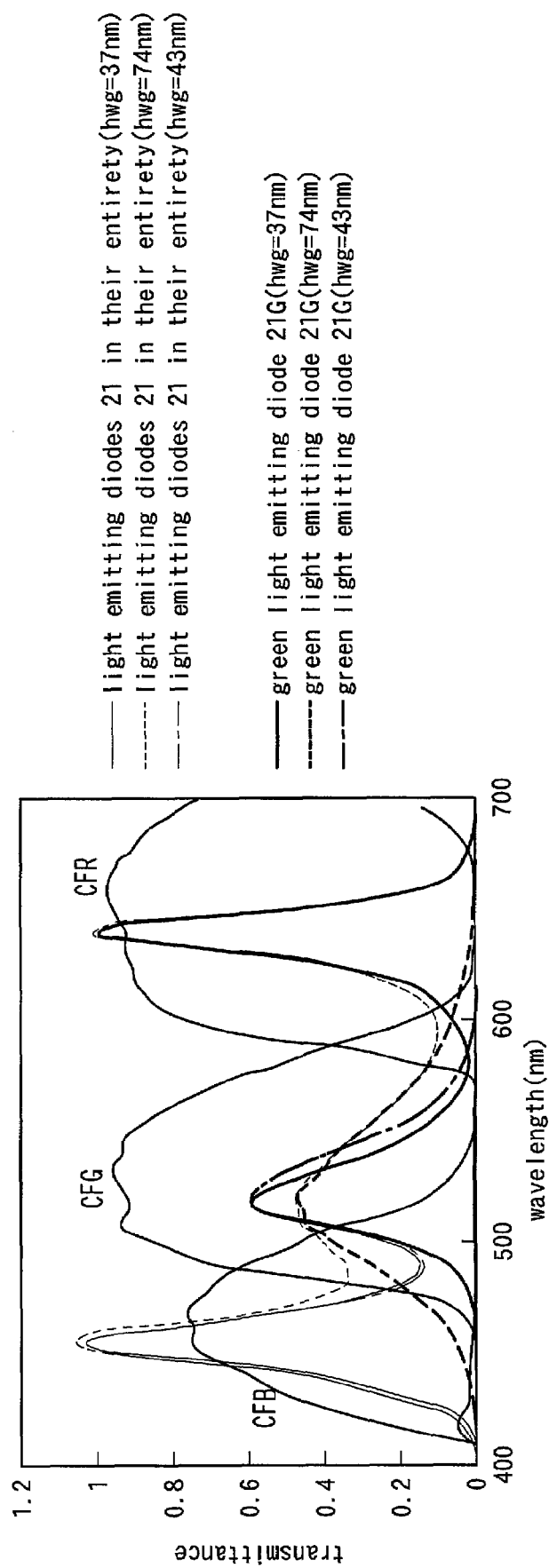
FIG. 16 is a graph for illustrating spectral characteristics of light emitting diodes and a color filter used in measurement 4.
Figure 17:
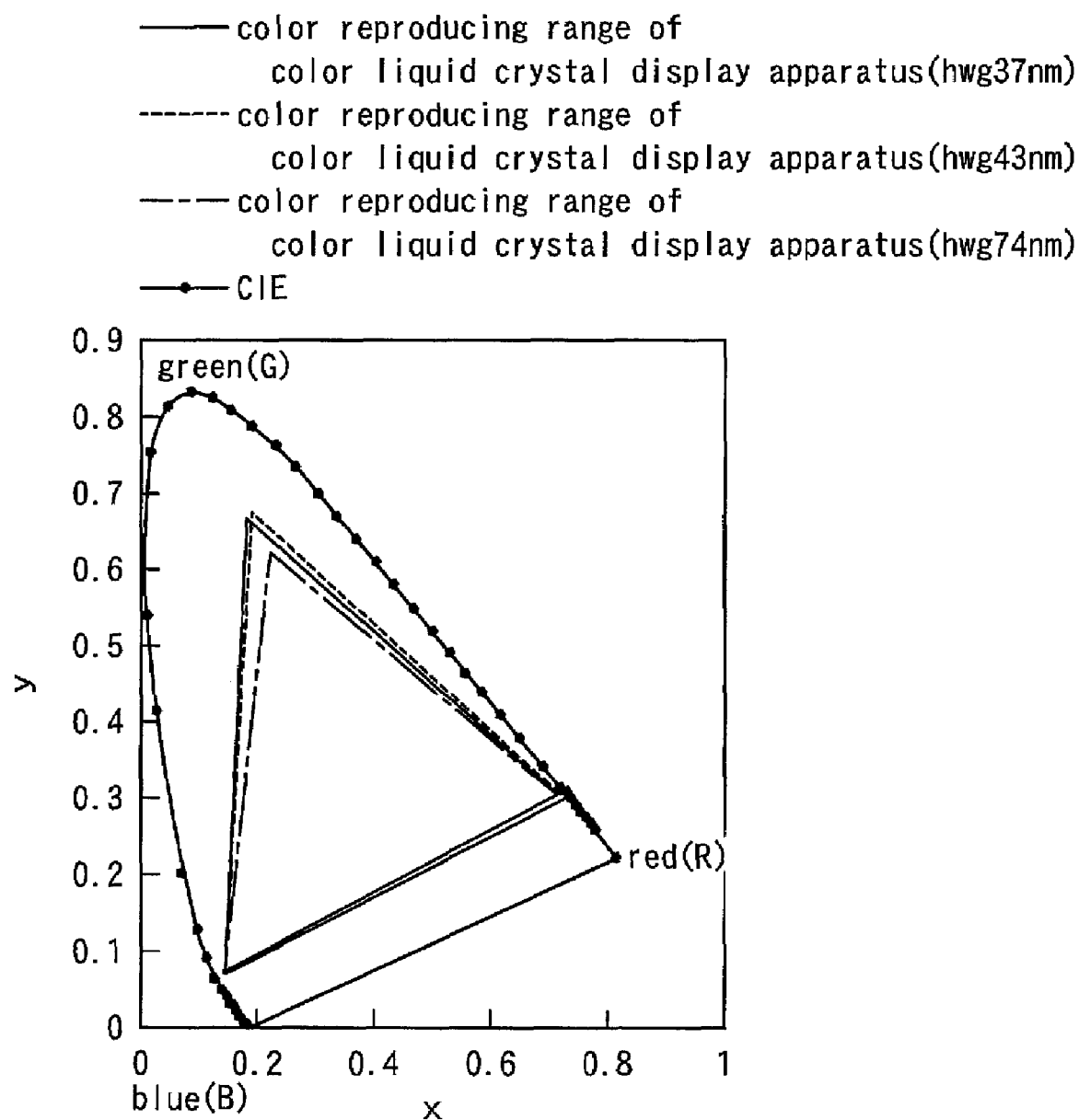
FIG. 17 is a graph representing a xy chromaticity diagram of the XYZ color system in which there is also shown a color reproducing range of a color liquid crystal display apparatus employing the light emitting diodes of measurement 4 as a light source of the backlight device.

The spectral characteristics of the color filter 19 and those of the light emitting diodes 21 are as shown in FIG. 16. On the other hand, the color reproducing ranges of the color liquid crystal display apparatus 100, obtained on plotting chromaticity points, as measured, in an xy chromaticity diagram, are as shown in FIG. 17.

Figure 18:
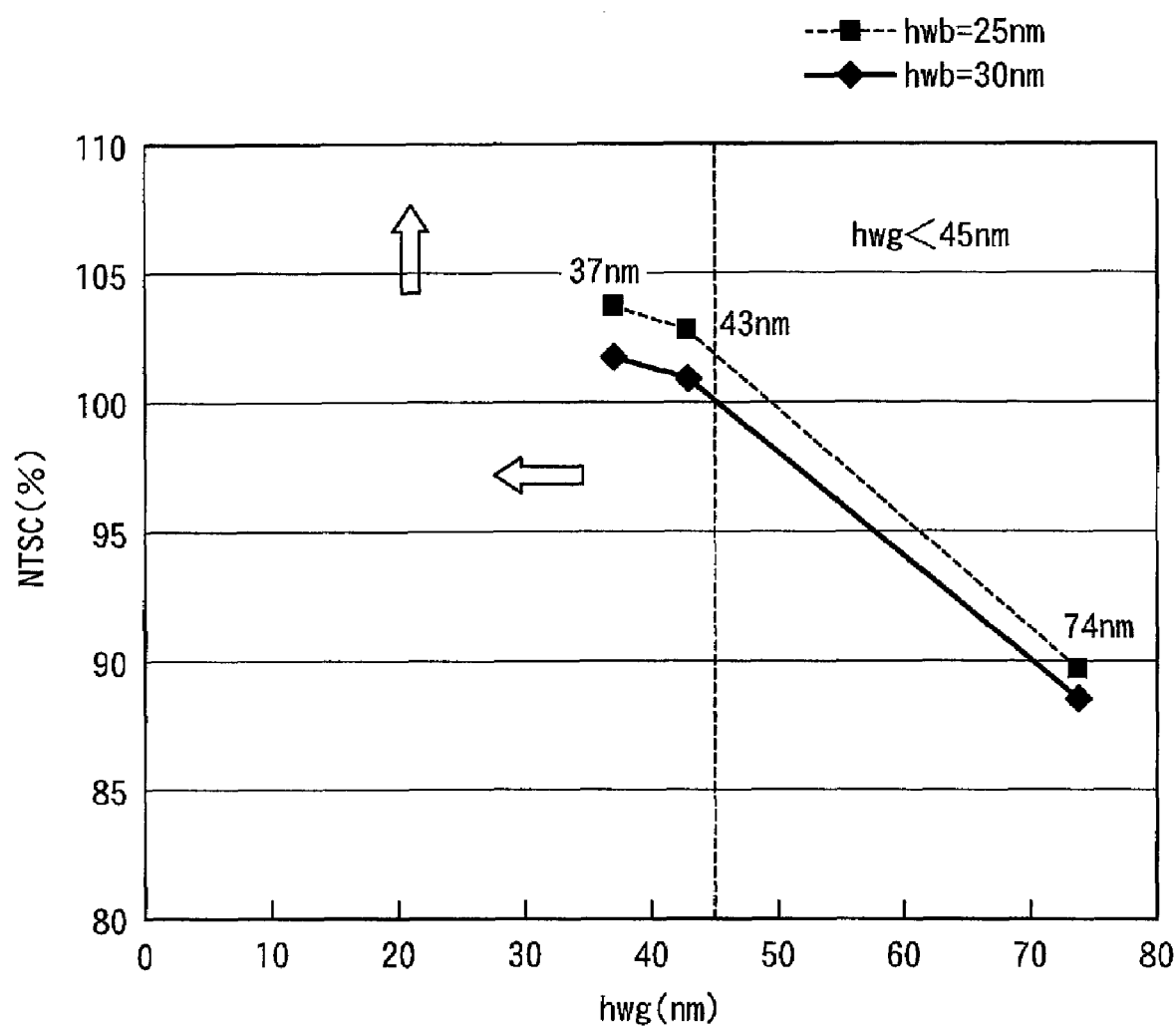
FIG. 18 is a graph showing the NTSC ratio of the color liquid crystal display apparatus for the measurement 4 in relation to the half-value width dependency of the green light emitted by the green light emitting diode.

The dependency of the NTSC ratio on the half-value width of green color light, obtained for the light transmitted through the color liquid crystal display panel 10, is shown in FIG. 18. In this figure, there is also shown the dependency of the NTSC ratio on the half-value width of green color light, in case the half-value width hwb of blue color light, shown in Table 2, is set to 25 nm. As may also be seen from FIG. 18, the color gamut corresponding to the NTSC ratio of 100% or higher may be achieved, if the half-value width hwb of the blue color light is increased to a value as high as 30 nm but the half-value width hwg of the green color light is 45 nm or less. Hence, it may be seen that the range of the half-value width hwb of blue color light up to 30 nm is allowed for accomplishing the color gamut corresponding to the NTSC ratio of 100% or higher.

Meanwhile, the separation between the peak wavelength of the red color light and that of the green color light is broader than the separation between the peak wavelength of the green color light and that of the blue color light, the range of the half-value width of red color light, emitted by the red light emitting diode 21R, up to approximately 30 nm, is allowable. The smaller half-value width of each color light is more effective for coping with color mixing, as described above. The smallest half-value width is set to one-half the maximum value, as a limit from the perspective of fabrication.

Thus, the half-value widths of the red color light, green color light and the blue color light, emitted by the red light emitting diode 21R, green light emitting diode 21G and the blue light emitting diode 21B, respectively, may be set so that 15 nm≦hwr≦30 nm, 25 nm≦hwg≦50 nm and 15 nm≦hwb≦30 nm, respectively.

In this case, not only the peak wavelength range of each color light, but also the difference in the spectral distribution of each color light, may be taken into account, and hence the color reproducing range of the color liquid crystal display apparatus 100 may be such that it is possible to achieve a value equal to or higher than 100% of the NTSC ratio highly accurately.

In illuminating the color liquid crystal display panel 10, provided with the color filter 19, with the backlight device 20, it is essential to select properly the wavelength ranges of the red light emitting diode 21R, green light emitting diode 21G and the blue light emitting diode 21B, as light sources, and the transmission wavelength ranges of color filter segments of the color filter 19, otherwise the color purity would be lowered to narrow the color gamut as in the case of the CCFL already explained in connection with the related art.

Such an example will now be described in which, as the peak wavelengths of the red light emitting diode 21R, green light emitting diode 21G and the blue light emitting diode 21B, as light source of the backlight device 20, are shifted, that is, as the wavelength ranges are varied, the optimum peak wavelength ranges which will give white light with high color purity and broad color gamut without lowering the power efficiency, are determined.

Specifically, the peak wavelengths of two of the three light emitting diodes are fixed and several samples of the remaining light emitting diodes with differing peak wavelengths are provided and used in an exchanging fashion. The NTSC (National Television System Committee) ratio for each of the resulting sets of the three light emitting diodes then is found. The wavelength ranges of the three light emitting diodes when the NTSC ratio exceeds 100% are taken to be the optimum peak wavelength range of light emission by the red light emitting diode 21R, green light emitting diode 21G and the blue light emitting diode 21B. It is noted that the peak wavelengths of the red color light and the blue color light are set so as not to allow the lowering of the power efficiency determined by visibility as mentioned above.

[Red Light Emitting Diode 21R]

Initially, the peak wavelengths of a blue light emitting diode 21B and a green light emitting diode 21G were fixed and, using samples of red light emitting diodes 21R with differing peak wavelengths, along with the blue and green light emitting diodes, the NTSC ratio was measured, in order to find an optimum peak wavelength range of the red light emitting diode 21R.

Figure 19A:
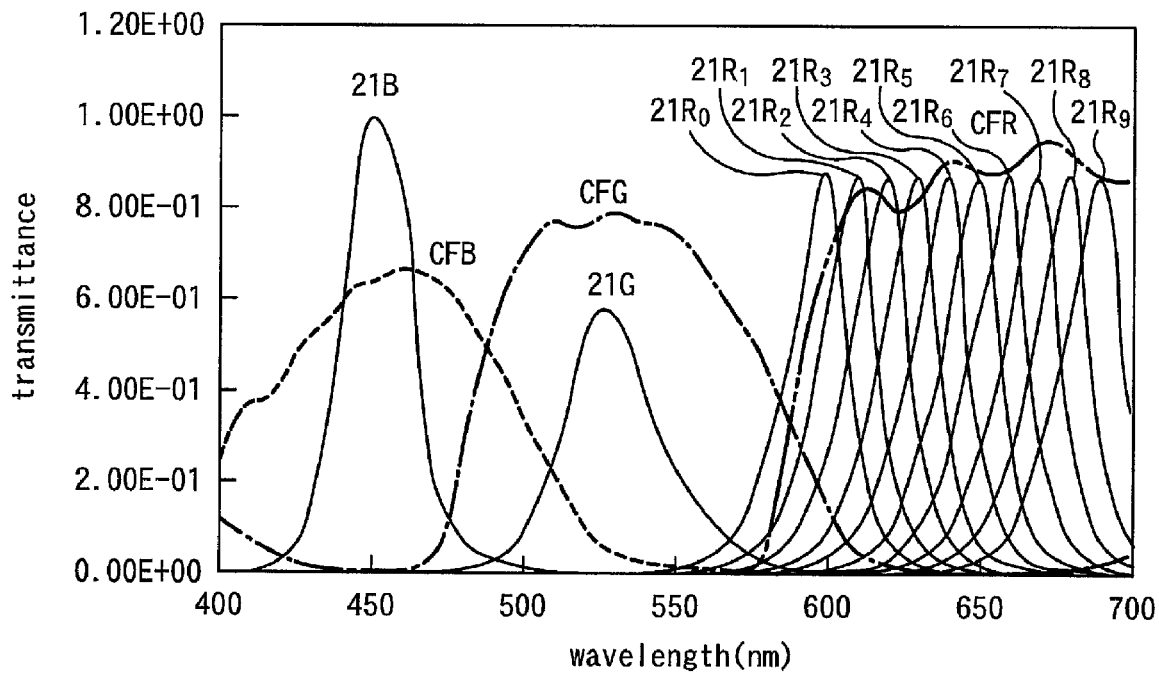
FIG. 19A is a graph showing the spectra of light emitted by the light emitting diodes and spectral characteristics of the color filter in case of varying the peak wavelength range of the red light emitting diode.

FIG. 19A depicts a graph showing spectral characteristics of the color filter 19, also shown in FIG. 8, and wavelength spectra of red color light, green color light and blue color light, emitted by the red light emitting diode 21R, green light emitting diode 21G and the blue light emitting diode 21B, respectively. Ten (10) samples of red light emitting diodes 21R$_N$, with peak wavelengths of (600+10N) nm, where N is a natural number from 0 to 9, were provided. The green light emitting diode 21G used was of a peak wavelength of 525 nm and the blue light emitting diode 21B used was of a peak wavelength of 450 nm.

Figure 19B:
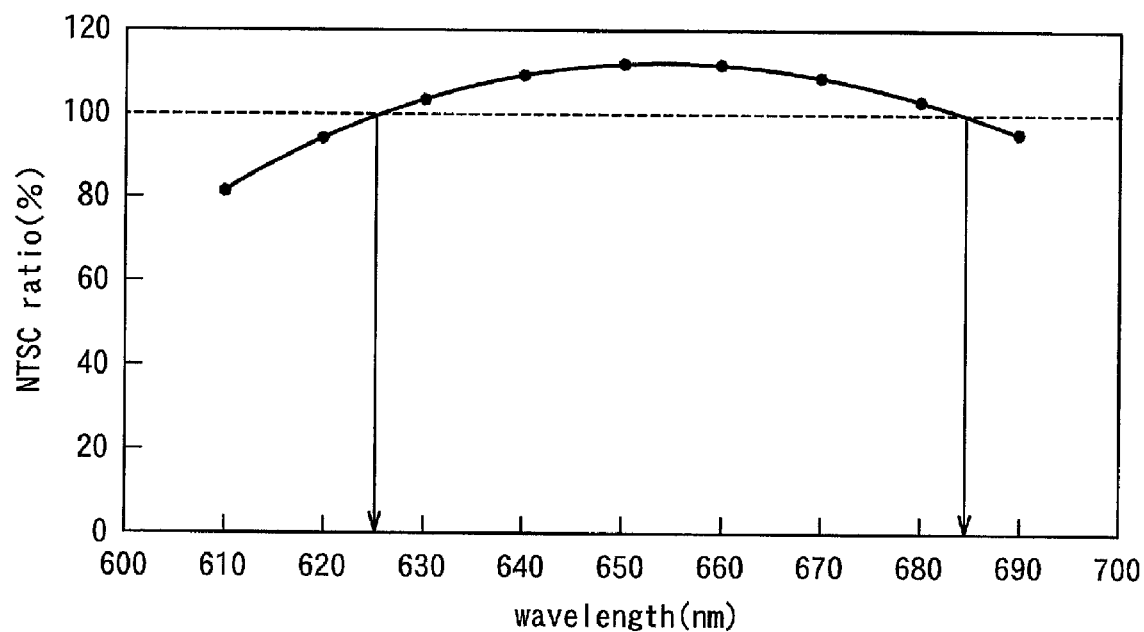
FIG. 19B is a graph showing the wavelength dependency of the NTSC ratio.

The graph of FIG. 19B shows measured results of the NTSC ratio for the case of using the red light emitting diodes 21R$_N$ with peak wavelengths of (600+10N) nm. It is seen from FIG. 19B that the NTSC ratio becomes equal to or higher than 100% in case the peak wavelength λpr of the red light emitting diode 21R$_N$ is such that 625 nm≦λpr≦685 nm.

Hence, the optimum peak wavelength range of the red light emitting diode 21R is such that 625 nm≦λpr≦685 nm.

The half-value widths hwr, hwg and hwb of the spectra of the red color light, green color light and the blue color light, emitted by the red light emitting diode 21R, green light emitting diode 21G and the blue light emitting diode 21B, respectively, were set so that hwr=22 nm, hwg=40 nm and hwb=25 nm.

[Green Light Emitting Diode 21G]

Next, the peak wavelengths of a red light emitting diode 21R and a blue light emitting diode 21B were fixed and, using several samples of green light emitting diodes 21G with differing peak wavelengths, along with the red and blue light emitting diodes, the NTSC ratio was measured, in order to find an optimum peak wavelength range of the green light emitting diode 21G.

Figure 20A:
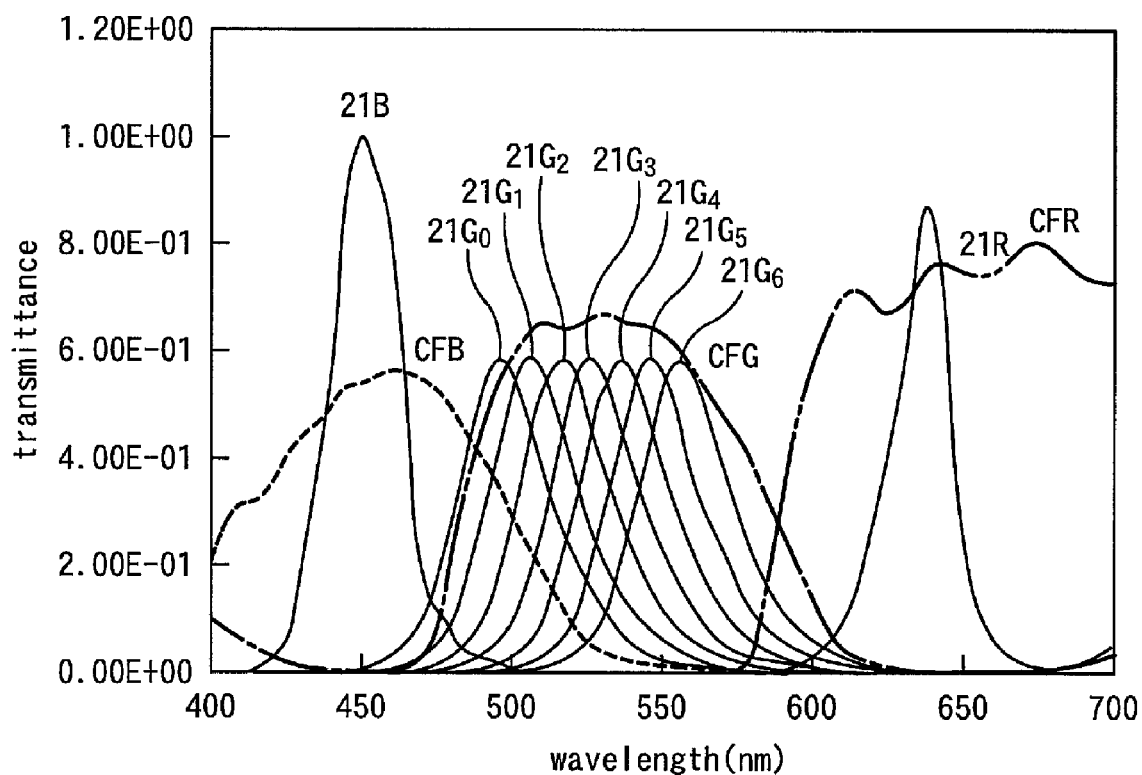
FIG. 20A is a graph showing spectral characteristics of the color filter and spectra of light emitted by the color filter and by the light emitting diodes in case of varying the peak wavelength range of the green light emitting diode.

FIG. 20A depicts a graph showing spectral characteristics of the color filter 19, also shown in FIG. 8, and wavelength spectra of red color light, green color light and blue color light, emitted by the red light emitting diode 21R, green light emitting diode 21G and the blue light emitting diode 21B, respectively. Seven (7) samples of green light emitting diodes 21GN, with peak wavelengths of (495+10N) nm, where N is a natural number from 0 to 6, were provided. The red light emitting diode 21R used was of a peak wavelength of 640 nm and the blue light emitting diode 21B used was of a peak wavelength of 450 nm.

Figure 20B:
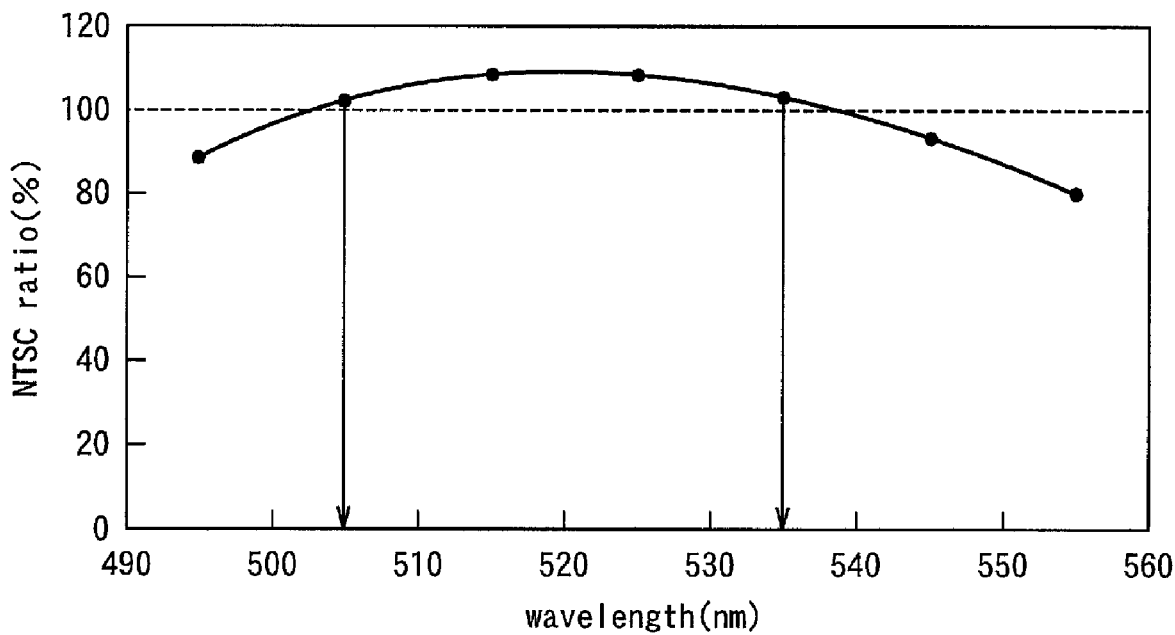
FIG. 20B is a graph showing the wavelength dependency of the NTSC ratio.

The graph of FIG. 20B shows measured results of the NTSC ratio for the case of using the green light emitting diodes $21G_N$ with peak wavelengths of (495+10N) nm. It is seen from FIG. 20B that the NTSC ratio becomes equal to or higher than 100% in case the peak wavelength λpg of the green light emitting diode $21G_N$ is such that 505 nm≦λpg≦535 nm.

Hence, the optimum peak wavelength range of the green light emitting diode 21G is such that 505 nm≦λpg≦535 nm.

The half-value widths hwr, hwg and hwb of the spectra of the red color light, green color light and the blue color light, emitted by the red light emitting diode 21R, green light emitting diode 21G and the blue light emitting diode 21B, respectively, were set so that hwr=22 nm, hwg=40 nm and hwb=25 nm.

[Blue Light Emitting Diode 21B]

Next, the peak wavelengths of a red light emitting diode 21R and a green light emitting diode 21G were fixed and, using several blue light emitting diodes 21B with differing peak wavelengths, along with the red and green light emitting diodes, the NTSC ratio was measured, in order to find an optimum peak wavelength range of the blue light emitting diode 21B.

Figure 21A:
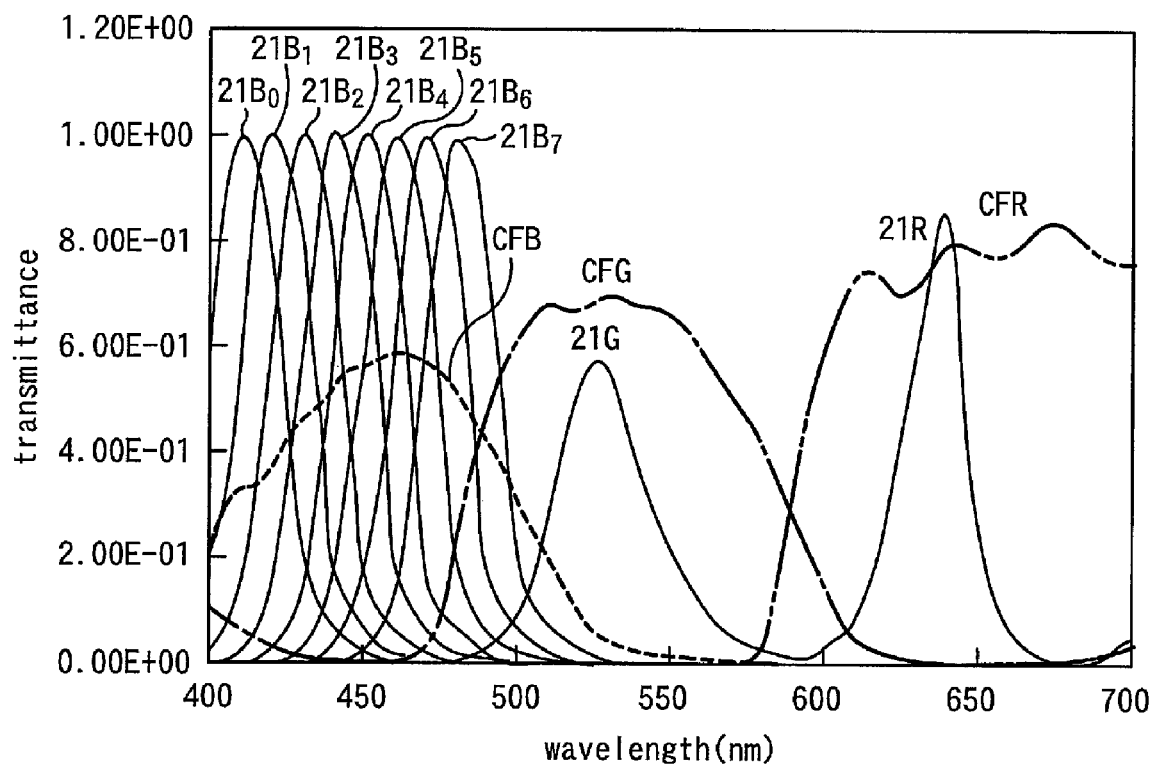
FIG. 21A is a graph showing spectral characteristics of the color filter and spectra of light emitted by the light emitting diodes in case of varying the peak wavelength range of the blue light emitting diode.

FIG. 21A depicts a graph showing spectral characteristics of the color filter 19, also shown in FIG. 8, and wavelength spectra of red color light, green color light and blue color light, emitted by the red light emitting diode 21R, green light emitting diode 21G and the blue light emitting diode 21B, respectively. Eight (8) samples of blue light emitting diodes $21B_N$, with peak wavelengths of (410+10N) nm, where N is a natural number from 0 to 7, were provided. The red light emitting diode 21R used was of a peak wavelength of 640 nm and the green light emitting diode 21G used was of a peak wavelength of 525 nm.

Figure 21B:
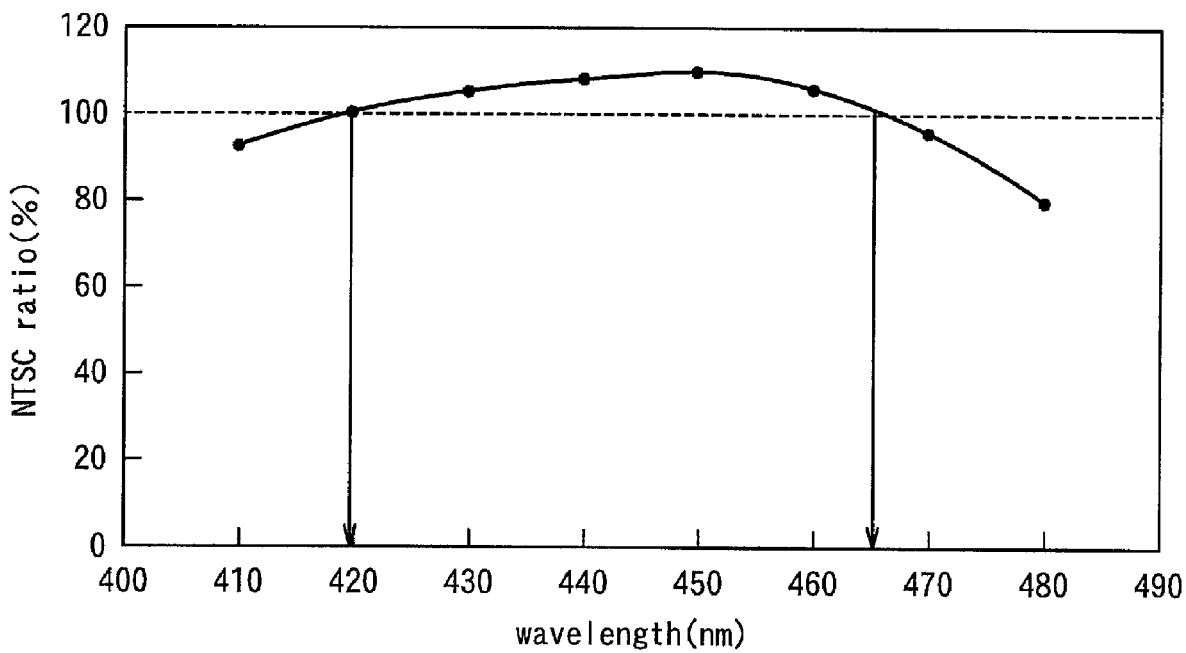
FIG. 21B is a graph showing the wavelength dependency of the NTSC ratio.

The graph of FIG. 21B shows the results of measurement of the NTSC ratio for the case of using the blue light emitting diodes $21B_N$ with peak wavelengths of (410+10N) nm. It is seen from FIG. 21B that the NTSC ratio becomes equal to or higher than 100% in case the peak wavelength λpb of the blue light emitting diode $21B_N$ is such that 420 nm≦λpb≦465 nm.

Hence, the optimum peak wavelength range of the blue light emitting diode 21B is such that 420 nm≦λpb≦465 nm.

The half-value widths hwr, hwg and hwb of the spectra of the red color light, green color light and the blue color light, emitted by the red light emitting diode 21R, green light emitting diode 21G and the blue light emitting diode 21B, respectively, were set so that hwr=22 nm, hwg=40 nm and hwb=25 nm.

Thus, by setting the peak wavelengths of the red color light, green color light and blue color light, emitted by the red light emitting diode 21R, green light emitting diode 21G and the blue light emitting diode 21B, respectively, to the above defined ranges, it is possible to raise color purity of white light radiated from the backlight device 20 and to provide for a color gamut broader than in the case of using the CCFL as light source indicated as the related art. Hence, it is possible to provide for an extremely broad color reproducing range of the color liquid crystal display apparatus 100.

(Re Chromaticity Points)

The optimum peak wavelength ranges of the light emitting diodes 21, which will give the NTSC ratio equal to or higher than 100%, may be found as described above. It is noted however that not only the peak wavelengths but also the spectral distributions of the light emitting diodes represent crucial factors in raising color purity and in enlarging the color gamut. Although the spectral distribution of the light emitting diode 21 basically follows the Gaussian distribution, the light emitting diode shows variegated shapes of spectral distribution, depending on manufacturing processes or other factors. Thus, if only the peak wavelength of the light emitting diode 21 is defined, the spectral distribution is not known. In this case, the effect of the difference in the spectral distribution on the chromaticity points is disregarded, with the consequence that the correct color reproducing range cannot be prescribed.

Heretofore, the peak wavelength of the light emitting diode 21 is specified to provide for the optimum color gamut. According to the present invention, the chromaticity points of the light emitting diodes 21, when the color reproducing range of the NTSC ratio equal to or higher than 100% is achieved, are measured, and light emitting diodes 21, prescribed by the measured range of chromaticity points, are used, in order to provide for the optimum color gamut.

Thus, the chromaticity points of the red light emitting diode 21R, green light emitting diode 21G and the blue light emitting diode 21B having peak wavelength ranges which will give not less than 100% of the NTSC ratio, as described above, are measured. Specifically, the backlight device 20, freed of the color liquid crystal display panel 10, is used, and the chromaticity when the light emitting diode 21 emits each color light is measured with a colorimeter.

The chromaticity points of the red light emitting diode 21R, green light emitting diode 21G and the blue light emitting diode 21B, having the peak wavelength ranges which will give not less than 100% of the NTSC ratio, were plotted in an xy chromaticy diagram of the XYZ color system as prescribed by the Commission Internationale de l'Eclairage (CIE). The results are shown in FIGS. 22A, 22B, 23A, 23B, 24A and 24B. For plotting the chromaticity points, three samples each of the red light emitting diode 21R, green light emitting diode 21G and the blue light emitting diode 21B, which will give the peak wavelength ranges, found as described above, are selected and arrayed in the backlight device 20. Measurements were then made of the color light, emitted by these light emitting diodes, without the intermediary of the color liquid crystal display panel 10.

{Chromaticity Points of Red Light Emitting Diodes 21R}

Figure 22B:
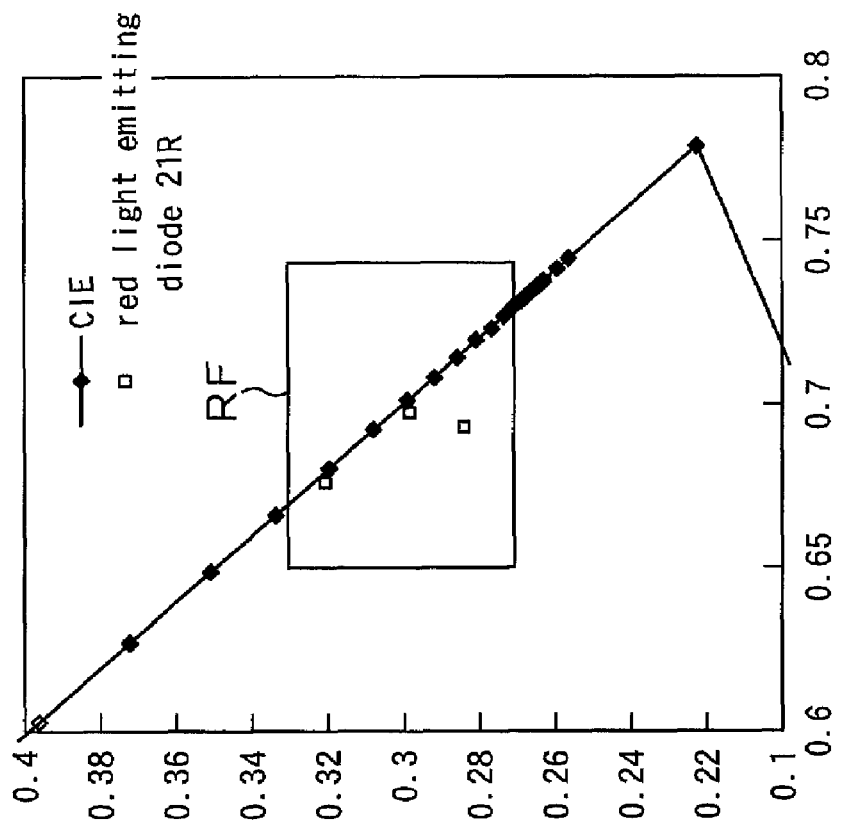
FIG. 22B is a graph showing the vicinity of the plots to an enlarged scale.
Figure 22A:
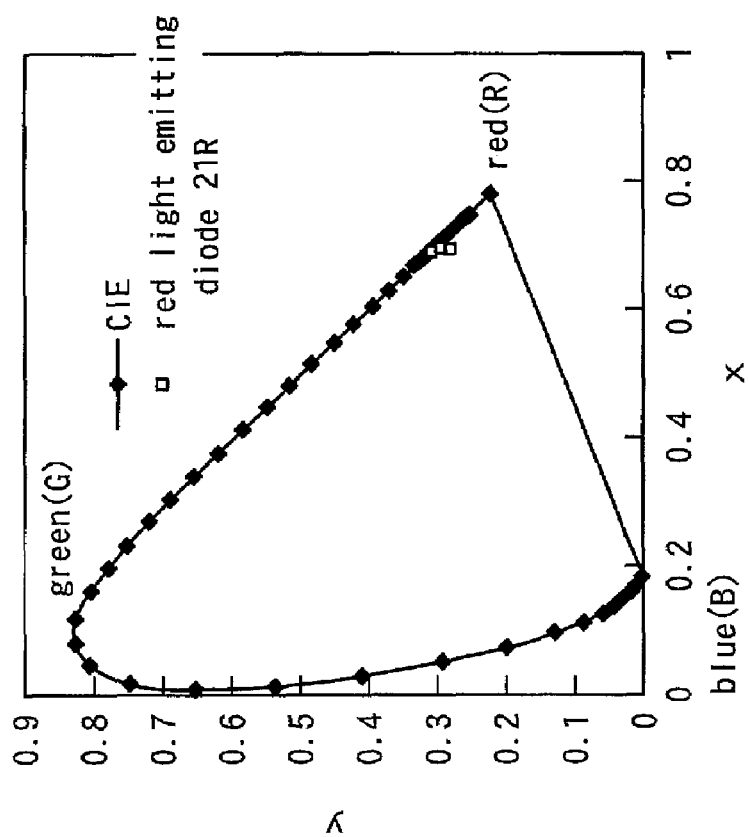
FIG. 22A is a graph showing chromaticity points of the red light emitting diode plotted in an xy chromaticity diagram of the XYZ color system.

In FIG. 22A, the chromaticity points of the three red light emitting diodes 21R, having the peak wavelengths of 630 nm, 640 nm and 670 nm, are plotted in the xy chromaticity diagram, and FIG. 22B shows the plotted chromaticity points to an enlarged scale. Thus, taking into account the fact that, for the optimum peak wavelength range for the red light emitting diode 21R of 625 nm≦λpr≦685 nm, found as described above, the peak wavelengths of the red light emitting diodes 21R, as plotted on the xy chromaticity diagram, are 630 nm, 640 nm and 670 nm, the range of the optimum chromaticity points for the red light emitting diode 21R is a range RF defined within a rectangle in FIG. 22B, and may be prescribed as 0.65≦x≦0.75 and 0.27≦y≦0.33.

{Chromaticity Points of Green Light Emitting Diodes 21G}

Figure 23B:
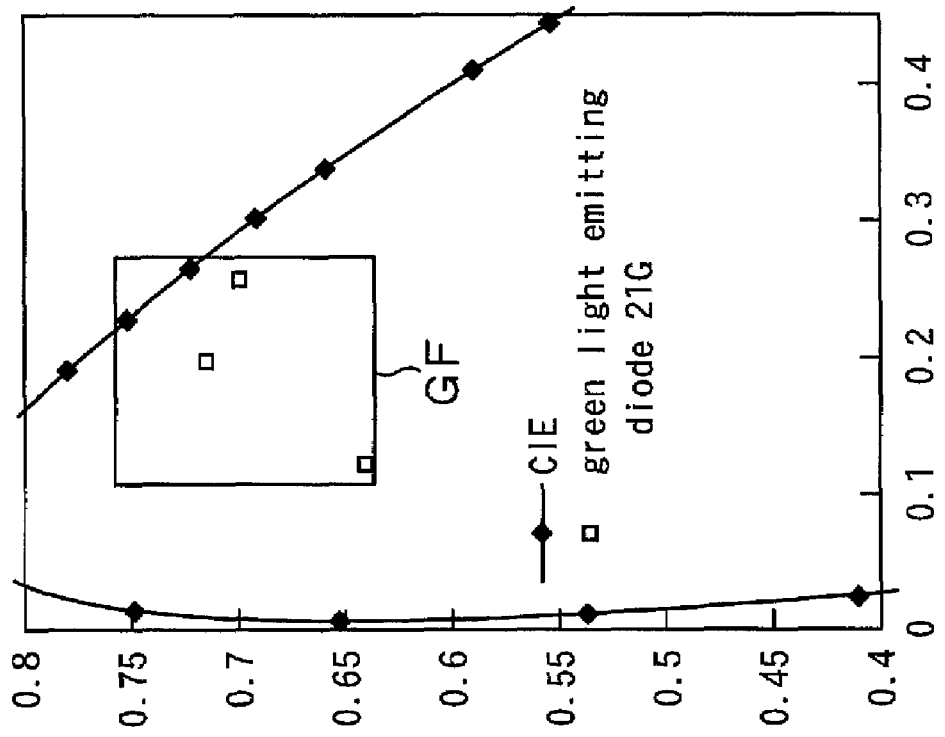
FIG. 23B is a graph showing the vicinity of the plots to an enlarged scale.
Figure 23A:
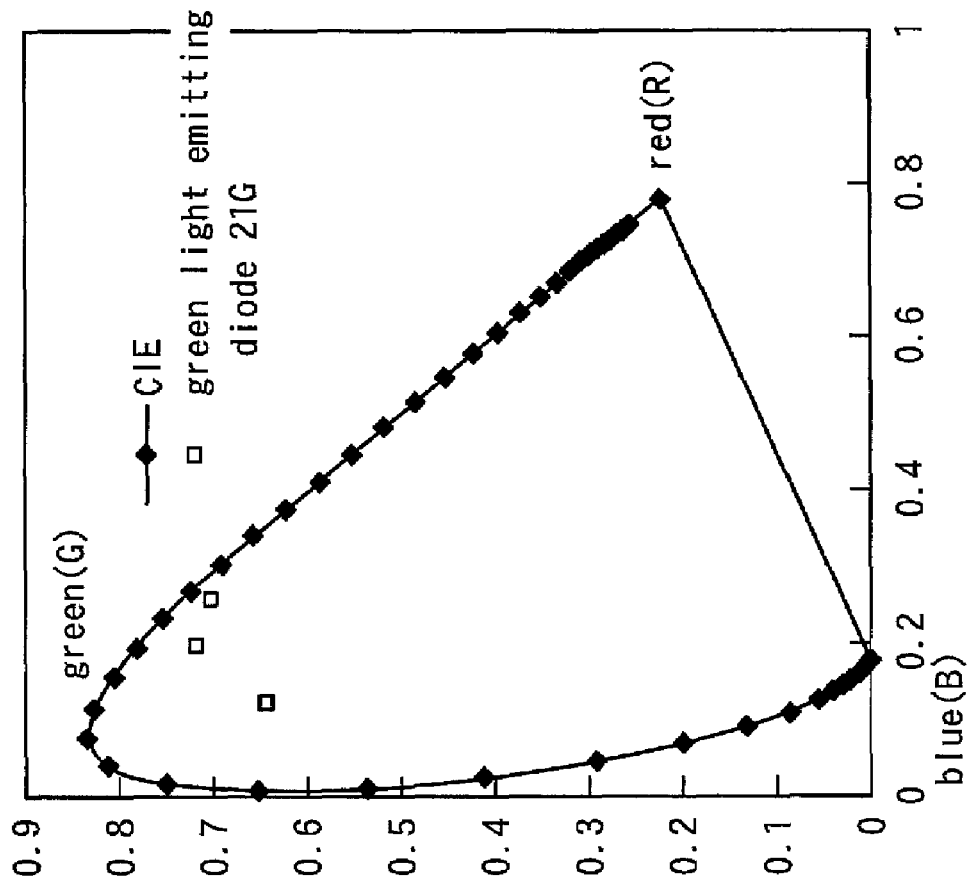
FIG. 23A is a graph showing chromaticity points of the green light emitting diode plotted in an xy chromaticity diagram of the XYZ color system.

In FIG. 23A, the chromaticity points of the three green light emitting diodes 21G, having the peak wavelengths of 510 nm, 525 nm and 535 nm, are plotted in the xy chromaticity diagram, and FIG. 23B shows the plotted chromaticity points to an enlarged scale. Thus, taking into account the fact that, for the optimum peak wavelength range for the green light emitting diode 21G of 505 nm≦λpg≦535 nm, found as described above, the peak wavelengths of the green light emitting diodes 21G, as plotted on the xy chromaticity diagram, are 510 nm, 525 nm and 535 nm, the range of the optimum chromaticity points for the green light emitting diode 21G is a range GF defined within a rectangle in FIG. 23B, and may be prescribed as 0.12≦x≦0.28 and 0.64≦y≦0.76.

{Chromaticity Points of Blue Light Emitting Diodes 21B}

Figure 24B:
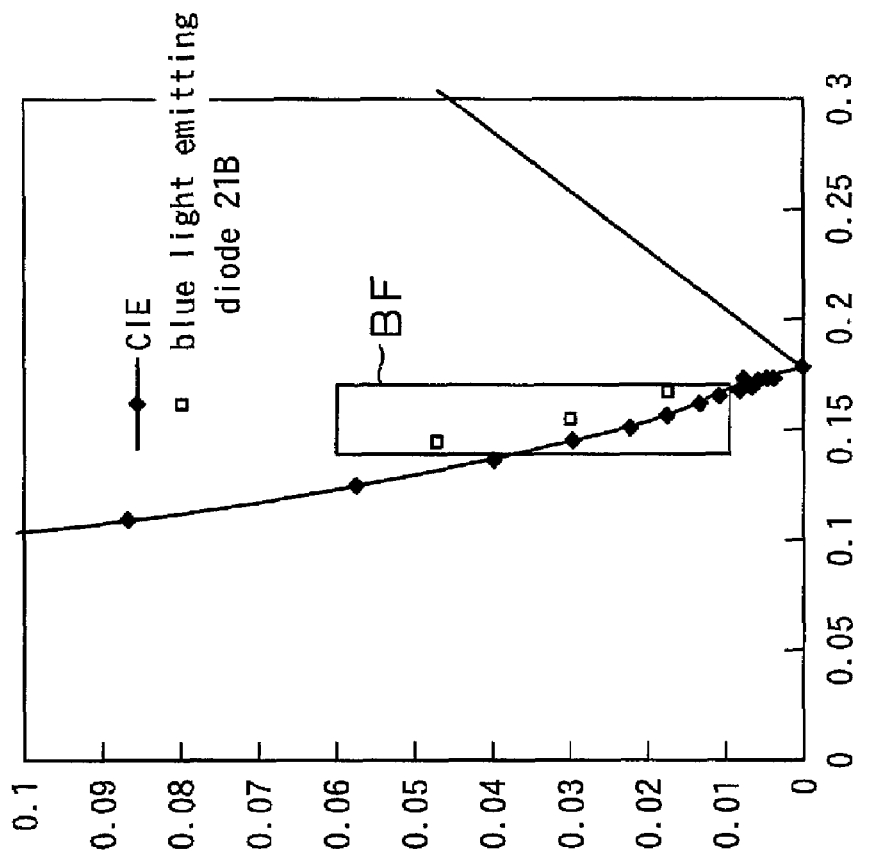
FIG. 24B is a graph showing the vicinity of the plots to an enlarged scale.
Figure 24A:
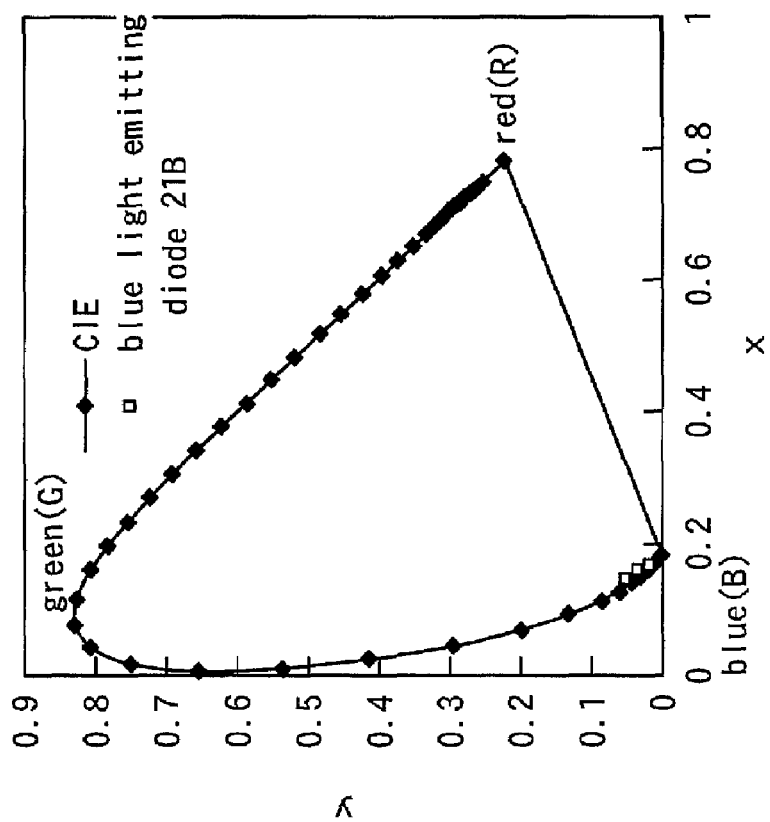
FIG. 24A is a graph showing chromaticity points of the blue light emitting diode plotted in a xy chromaticity diagram of the XYX color system.

In FIG. 24A, the chromaticity points of the three blue light emitting diodes 21B, having the peak wavelengths of 420 nm, 450 nm and 460 nm, are plotted in the xy chromaticity diagram, and FIG. 24B shows the plotted chromaticity points to an enlarged scale. Thus, taking into account the fact that, for the optimum peak wavelength range for the blue light emitting diode 21B of 420 nm≦λpb≦465 nm, found as described above, the peak wavelengths of the blue light emitting diodes 21B, as plotted on the xy chromaticity diagram, are 420 nm, 450 nm and 460 nm, the range of the optimum chromaticity points for the blue light emitting diode 21B is a range BF defined within a rectangle in FIG. 24B, and may be prescribed as 0.14≦x≦0.17 and 0.01≦y≦0.06.

The above may be summarized as shown in the following Table 6.

TABLE 6

| LED types | Peak wavelength range which gives NTSC ratio 100% or higher | Region of optimum chromaticity points (ranges of chromaticity points) | |
|---|---|---|---|
| LED 21R | 625~685 nm | 0.65 ≦ x ≦ 0.75 | 0.27 ≦ y ≦ 0.33 |
| LED 21G | 505~535 nm | 0.12 ≦ x ≦ 0.28 | 0.64 ≦ y ≦ 0.76 |
| LED 21B | 420~465 nm | 0.14 ≦ x ≦ 0.17 | 0.01 ≦ y ≦ 0.06 |

{Verification of Difference in Chromaticity Points Due to Difference in Spectral Distribution}

It is now verified that the chromaticity point is varied in case the chromaticity distribution differs, even if the peak wavelength is the same, as described above. For example, in case the spectral distribution of a light emitting diode, emitting color light of a given peak wavelength, has become broader, the proportion of light transmitted through a filter segment of a neighboring wavelength band of the color filter 19, provided on the color liquid crystal display panel 10, to total light transmitted through the color liquid crystal display panel 10, is increased, thus generating color mixing to narrow down the color gamut.

Figure 25:
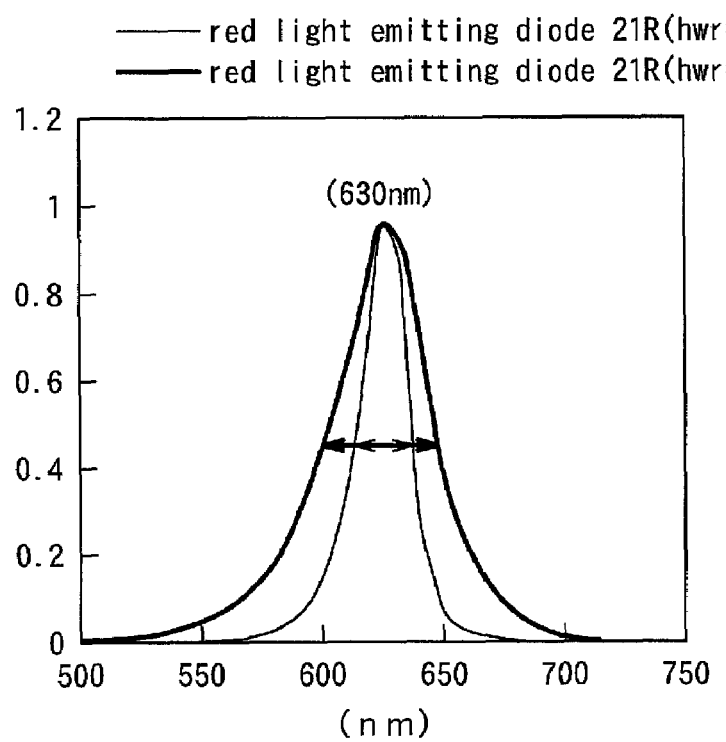
FIG. 25 is a graph showing spectral distributions of red light emitting diodes having the same peak wavelength and different half-width values.
Figure 26:
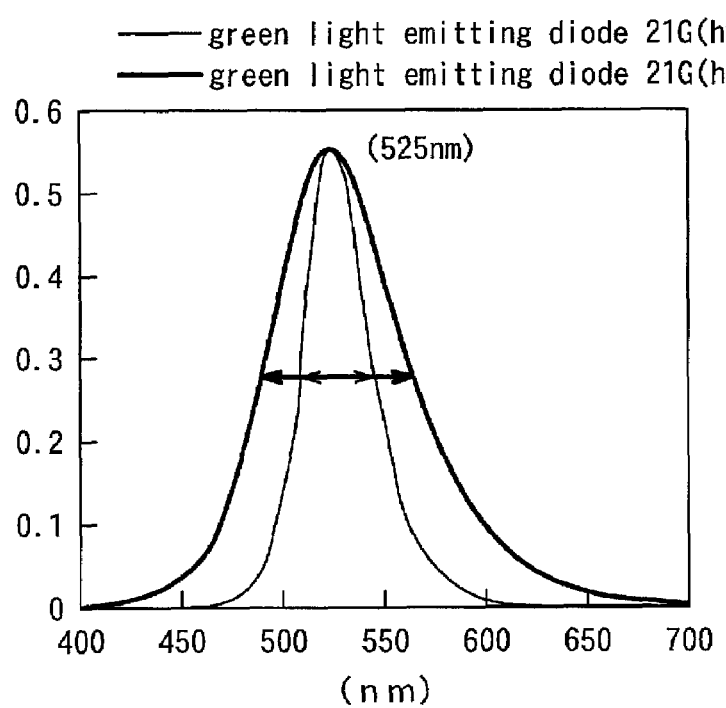
FIG. 26 is a graph showing spectral distributions of green light emitting diodes having the same peak wavelength and different half-width values.
Figure 27:
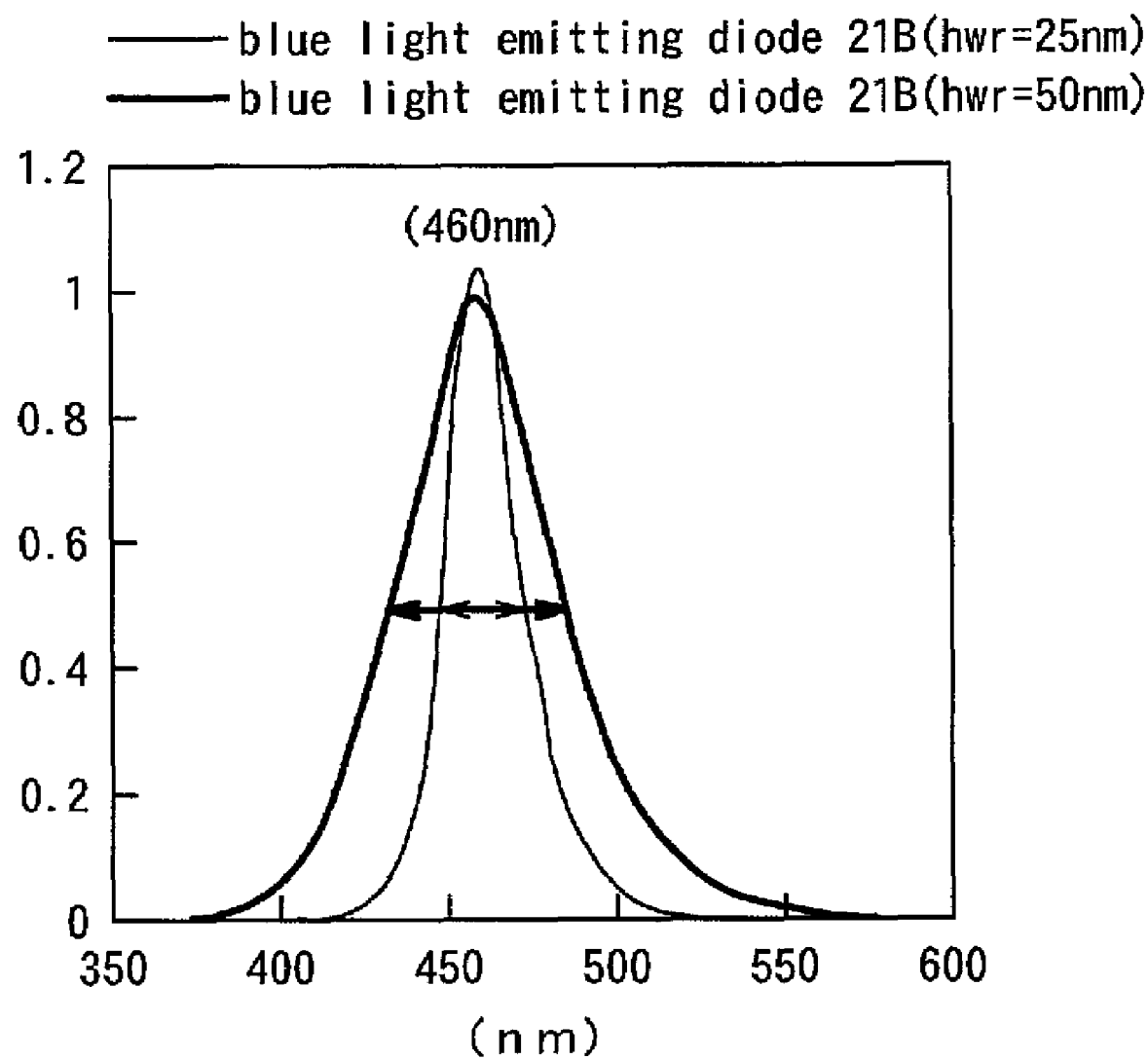
FIG. 27 is a graph showing spectral distributions of blue light emitting diodes having the same peak wavelength and different half-width values.

FIGS. 25 to 27 show, for each color light, the spectral characteristics of two types of the light emitting diodes 21 having the same peak wavelength but different spectral distribution. Specifically, FIG. 25 shows spectral characteristics of two different red light emitting diodes 21R having the same peak wavelength λpr of 630 nm but having respective different half-value widths hwr=22 nm and 44 nm. FIG. 26 shows spectral characteristics of two different green light emitting diodes 21G having the peak wavelength λpg of 525 nm and respective different half-value widths hwg=40 nm and 80 nm, and FIG. 27 shows spectral characteristics of two different light emitting diodes 21B having the same peak wavelength λpb of 460 nm but having respective different half-value widths hwb=25 nm and 50 nm.

Figure 28:
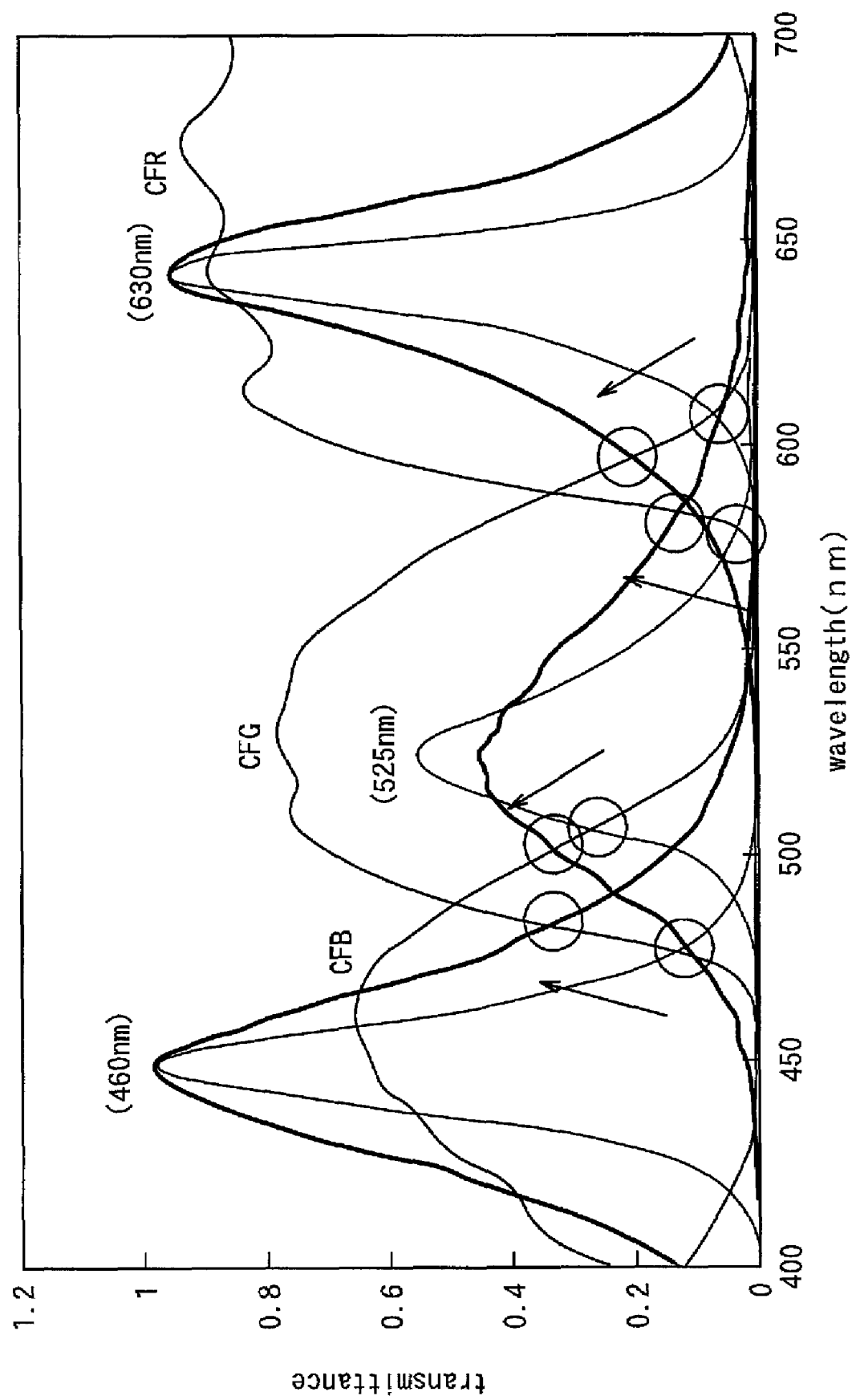
FIG. 28 is a graph illustrating spectral characteristics of light emitting diodes and the color filter.

FIG. 28 shows the spectral characteristics shown in FIGS. 25 to 27 and those of the color filter 19 shown in FIG. 8, overlaid together. It is seen from FIG. 28 that the color light having a spectral distribution with a redoubled half-value width is transmitted through the neighboring color filter segment in an increased volume thus giving rise to higher possibility of color mixing. The locations defined in circle marks in FIG. 28 represent the crossing points at which the spectral distribution of each color light intersects the transmission wavelength band of the neighboring color filter segment. It is noted that, if the spectral distribution is changed in a direction of increasing the half-value width, the crossing point is elevated, as indicated by arrow, thus increasing the rate of color mixing.

Since the color gamut is affected by different spectral distributions, it may be presupposed that, for providing high color purity and broad color gamut of the white light, illuminating the color liquid crystal display panel 10, it would be insufficient if only the peak wavelength ranges as found from FIGS. 19B, 20B and 21B, as described above, are defined. For verifying this, measurement is made of the NTSC ratio of the color liquid crystal display apparatus 10 for such case where the peak wavelength ranges which will afford the NTSC ratio not less than 100%, shown in FIGS. 19B, 20B and 21B, are met and, at the same time, the half-value widths are set so as to be twice those of the spectral distributions shown in FIGS. 19A, 20A and 21A, that is, the half-value width hwr of red color light, the half-value width hwg of green color light and the half-value width hwb of blue color light are 44 nm, 80 nm and 50 nm, respectively. If, in such case, the NTSC ratio does not exceed 100%, the effect of changes in the spectral distribution, that is, the effect different than the peak wavelength, is acting on the color gamut.

The measured results of the NTSC ratio, under the above conditions for the light emitting diodes 21, are shown in the following Tables 7 to 9, for each color light. For comparison of the measured results, the values of the NTSC ratio prior to setting the redoubled half-value width of each color light are extracted from FIGS. 19B, 20B and 21B and shown in the Tables 7 to 9.

TABLE 7

| Red LED 21R | hwr = 22 nm | hwr = 44 nm |
|---|---|---|
| 630 nm | 102.6% | 89.6% (NG) |
| 640 nm | 106.8% | 95.5% (NG) |
| 670 nm | 105.0% | 104.6% |

TABLE 8

| Green LED 21G | hwg = 40 nm | hwg = 80 nm |
|---|---|---|
| 510 nm | 101.4% | 91.2% (NG) |
| 525 nm | 106.8% | 92.1% (NG) |
| 535 nm | 102.5% | 90.3% (NG) |

TABLE 9

| Blue LED 21B | hwb = 25 nm | hwb = 50 nm |
|---|---|---|
| 420 nm | 101.7% | 102.0% |
| 450 nm | 106.8% | 100.0% |
| 460 nm | 103.6% | 96.5% (NG) |

Table 7 shows the NTSC ratio of the red light emitting diodes 21R having the half-value width hwr of 44 nm and the peak wavelengths λpr of 630 nm, 640 nm and 670 nm. Referring to Table 7, with this half-value width, the NTSC ratio for the peak wavelength λpr of 630 nm and that for the peak wavelength λpr of 640 nm are 89.6% and 95.5%, which are both lower than 100%, respectively. As a matter of course, the NTSC ratio not less than 100% is achieved with the one-half half-value width of 22 nm.

Table 8 shows the values of the NTSC ratio of green light emitting diodes 21G with the peak wavelengths λpg of 510 nm, 525 nm and 535 nm, with the half-value width all being 80 nm. Referring to Table 8, with this half-value width, the NTSC ratio is lower than 100% for all peak wavelengths. As a matter of course, the NTSC ratio not less than 100% is achieved with the one-half half-value width hwg of 40 nm.

Table 9 shows the NTSC ratio of the blue light emitting diodes 21B having the half-value width hwb of 50 nm and the peak wavelengths λpb of 420 nm, 450 nm and 460 nm. Referring to FIG. 20, with this half-value width, the NTSC ratio for the peak wavelength λpb of 460nm is 96.5%, which is lower than 100%. As a matter of course, the NTSC ratio not less than 100% is achieved with the one-half half-value width hwb of 25 nm.

The chromaticity points on the backlight device 20, freed of the color liquid crystal display panel 10, of the red light emitting diode 21R, green light emitting diode 21G and the blue light emitting diode 21B, having the same peak wavelength but having the redoubled half-value widths, as shown in the Tables 7 to 9, were measured with a colorimeter, as the light emitting diodes 21 were caused to emit light for each color light.

The chromaticity points of the red light emitting diode 21R, green light emitting diode 21G and the blue light emitting diode 21B, thus measured, were plotted on an xy chromaticity diagram of the XYZ color system, as prescribed by the Commission Internationale de l'Eclairage (CIE). The results are shown in FIGS. 29A, 29B, 30A, 30B, 31A and 31B.

{Chromaticity Points of the Red Light Emitting Diodes 21R Having Redoubled Half-value Width}

Figures 29A, 29B:
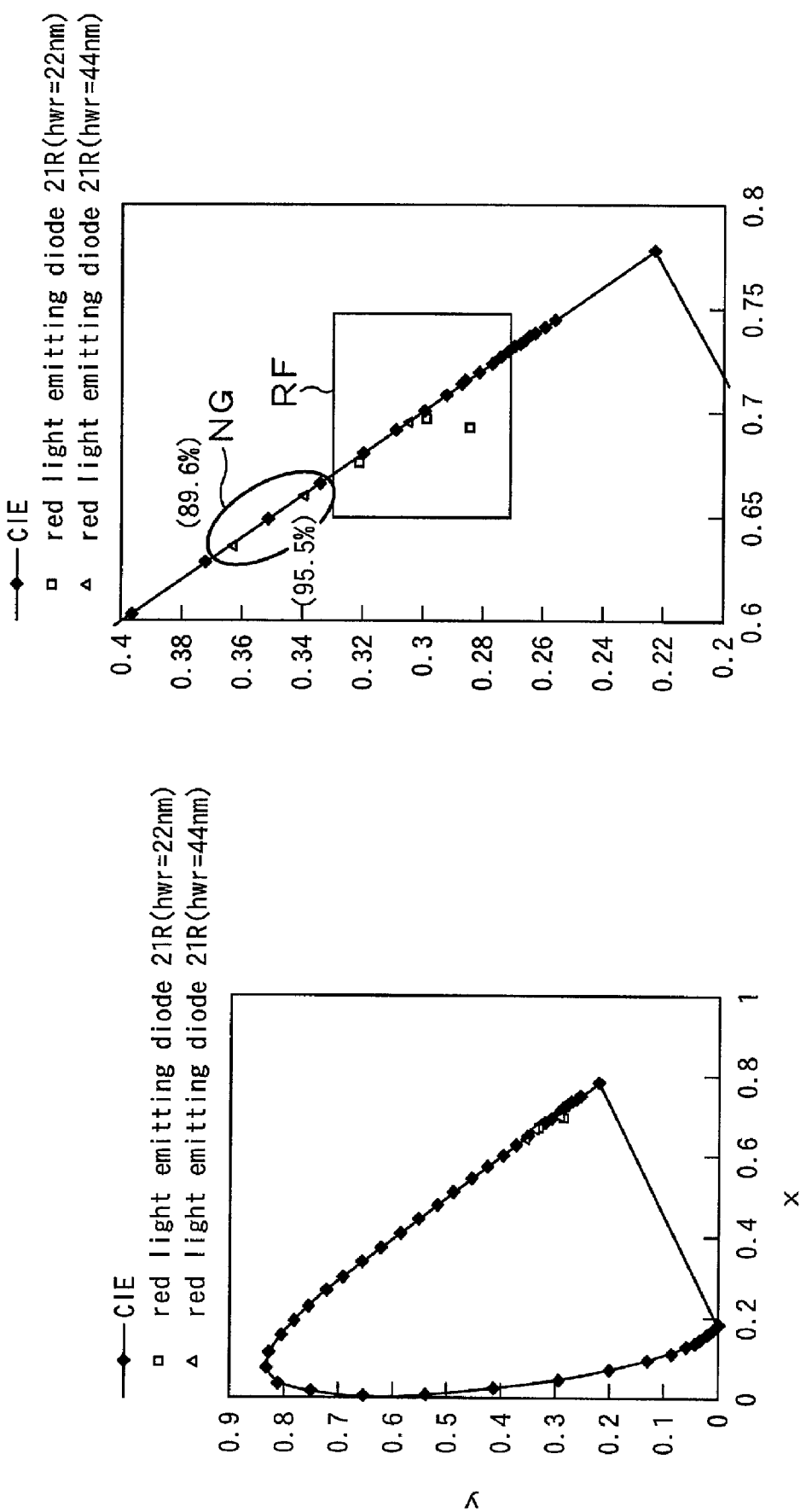
FIG. 29A is a graph showing chromaticity points of a red light emitting diode with a redoubled half-value width, plotted in a xy chromaticity diagram of an XYZ color system.
FIG. 29B is a graph showing the vicinity of the plots to an enlarged scale.

FIG. 29A shows three chromaticity points, plotted on the xy chromaticity diagram, of the red light emitting diodes 21R, having the half-value width hwr of 44 nm and the peak wavelengths λpr of 630 nm, 640 nm and 670 nm. FIG. 29B shows the so plotted chromaticity points to an enlarged scale. It may be seen from these figures that the chromaticity points of the red light emitting diodes 21R, having the peak wavelengths λpr of 630 nm and 640 nm, and for which the NTSC ratio equal to or higher than 100% is not achieved, are off the region RF which is the optimum chromaticity point region for the red light emitting diodes 21R, as determined with reference to FIG. 22B.

{Chromaticity Points of the Green Light Emitting Diodes 21G Having Redoubled Half-value Width}

FIG. 30A shows three chromaticity points, plotted on the xy chromaticity diagram, of the green light emitting diodes 21G, having the half-value width hwg of 80 nm and the peak wavelengths of 510 nm, 525 nm and 535 nm. FIG. 30B shows the so plotted chromaticity points to an enlarged scale. It may be seen from these figures that the chromaticity points of the green light emitting diodes 21G, having the peak wavelengths λpg of 510 nm, 525 nm and 535 nm, and for which the NTSC ratio equal to or higher than 100% is not achieved, are off the region GF which is the optimum chromaticity point region for the green light emitting diodes 21G, as determined with reference to FIG. 23B.

{Chromaticity Points of the Blue Light Emitting Diodes 21B Having Redoubled Half-value Width}

Figures 31A, 31B:
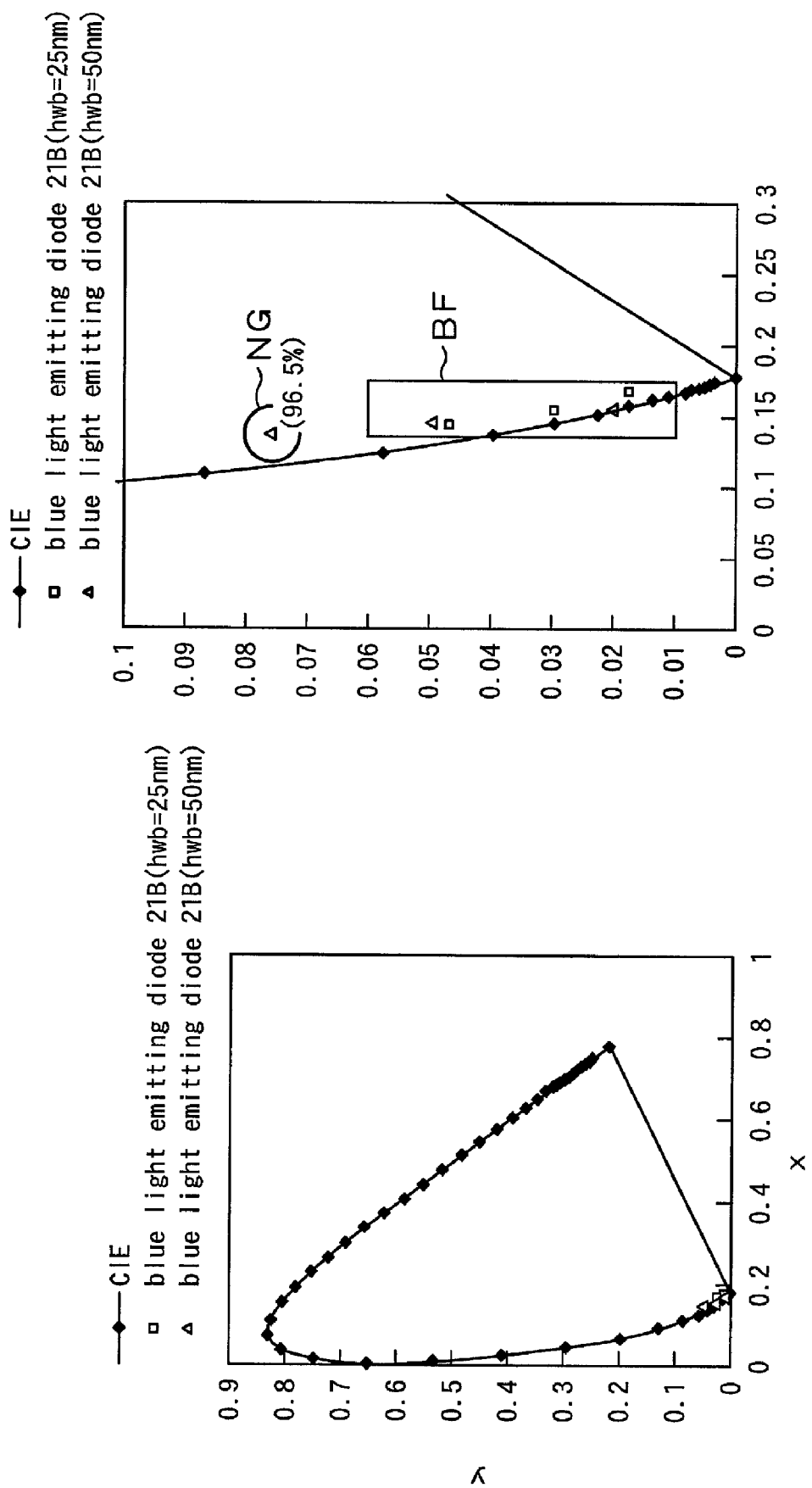
FIG. 31A is a graph showing chromaticity points of a blue light emitting diode with a redoubled half-value width, plotted in a xy chromaticity diagram of an XYZ color system.
FIG. 31B is a graph showing the vicinity of the plots to an enlarged scale.

FIG. 31A shows three chromaticity points, plotted on the xy chromaticity diagram, of the blue light emitting diodes 21B, having the half-value width hwb of 50 nm and the peak wavelengths λpb of 420 nm, 450 nm and 460 nm. FIG. 31B shows the so plotted chromaticity points to an enlarged scale. It may be seen from these figures that the chromaticity point of the blue light emitting diode 21B, having the peak wavelength λpb of 460 nm, and for which the NTSC ratio equal to or higher than 100% is not achieved, are off the region BF which is the optimum chromaticity point region for the blue light emitting diodes 21B, as determined with reference to FIG. 24B.

It is seen from above that, if simply the light emitting diode 21, only the peak wavelength range of which has been prescribed, is used for achieving the NTSC ratio equal to or higher than 100%, the effect of the spectral distribution is not taken into account, so that the light emitting diodes 21, which fail to give the NTSC ratio not less than 100%, as shown in the Tables 7 to 9, would be taken to be acceptable. These light emitting diodes 21 are determined based on the chromaticity ranges measured on causing them to emit light individually so that these light emitting diodes may be omitted as the light emitting diodes 21 which fail to give the NTSC ratio equal to or higher than 100%, as shown in FIGS. 29B, 30B and 31B.

Thus, in case the optimum chromaticity ranges of the red color light, green color light and the blue color light, emitted by the red light emitting diode 21R, green light emitting diode 21G and the blue light emitting diode 21B, are prescribed as shown in FIG. 13, the color reproducing range of the color liquid crystal display apparatus 100 may correctly be made the color reproducing range which will achieve the NTSC ratio equal to or higher than 100%.

In the foregoing description, the chromaticity of the light emitting diode 21, prescribed in order for the color liquid crystal display apparatus 100 to achieve the color reproducing range not lower than 100% in terms of the NTSC ratio, is prescribed on the xy chromaticity diagram of the XYZ color system as provided for by the Commission Internationale de l'Eclairage (CIE). However, the u'v' chromaticity diagram, as provided for by CIE, may also be used, provided that a mapping equation $u'=4x/(-2x+12y+3)$, $v'=9y/(-2x+12y+3)$ is used. That is, the present invention is not to be limited by the difference in the chromaticity diagrams and may be applied to any color system or to any chromaticity diagram that permits mapping.

With the color liquid crystal display apparatus of the backlight system, in which the light emitting diode is used as a backlight light source, the color purity may be much higher than with the use of the CCFL, so that it becomes possible to enlarge the color reproducing range appreciably.

However, in case of a broader half-value width of the spectrum of the light emitted by the light emitting diode, color purity is lowered due to color mixing, so that the color reproducing range cannot be enlarged sufficiently.

In particular, the spectral distribution of the green light emitting diode is broader than that of the blue light emitting diode or the red light emitting diode and has a half-value width close to twice that of the blue light emitting diode or the red light emitting diode. Hence, the spectrum of light emitted by the green light emitting diode is overlaid on the transmission wavelength range of the blue color filter to give rise to color mixing of the green light and the blue light due to color leakage, so that it is not possible to provide for a sufficiently broad green region of the color reproducing range.

The half-value width means the wavelength breadth on the spectrum corresponding to just one half intensity value of the peak height (intensity) of the spectrum.

With the color liquid crystal display apparatus 100 according to the present invention, the light sources, made up by the red light emitting diode, green light emitting diode and the blue light emitting diode 21B, are used as light source for the backlight device. Moreover, the half-value widths of the light emitting diodes are prescribed. By prescribing the half-value widths, it is possible to suppress the effect of color mixing from the neighboring color filter segments to secure a sufficiently broad color gamut.

In the present embodiment, the half-value width of the green light emitting diode, the spectral distribution of which is broader than that of the other light emitting diodes, is prescribed. By so doing, the effect of the green color on other colors, especially the blue color, such as color mixing due to color leakage, may be suppressed to the smallest value possible to provide for a broader region of the green color of the color reproducing range.

For narrowing down the half-value width of the spectrum of light emitted by the green light emitting diode, the green light emitting diode may, for example be constructed as follows:

As a crystal for use as a green light emitting diode, semiconductors of the compounds of the group II to IV elements, such as ZnSe, or semiconductors of the compounds of the group III to V elements, such as GaN, are used. It has become possible to obtain crystals of high quality through use as the crystal growth method of an epitaxial growth technique represented by the molecular beam epitaxy (MBE) method or the organometallic chemical vapor deposition (MOCVD) method.

If a crystal higher in purity than was hitherto possible may be obtained, that is, if the crystal constituting the green light emitting diode may be improved in purity, it is possible to narrow down the half-value width of the light emission spectrum. This may be brought about by the fact that, as the purity is raised, the difference between the band gap energy and the light emission peak energy may be decreased.

Hence, if a crystal of high purity can be grown by a proper method, it is possible to construct a green light emitting diode with a narrow half-value width of the light emission spectrum.

Figure 34:
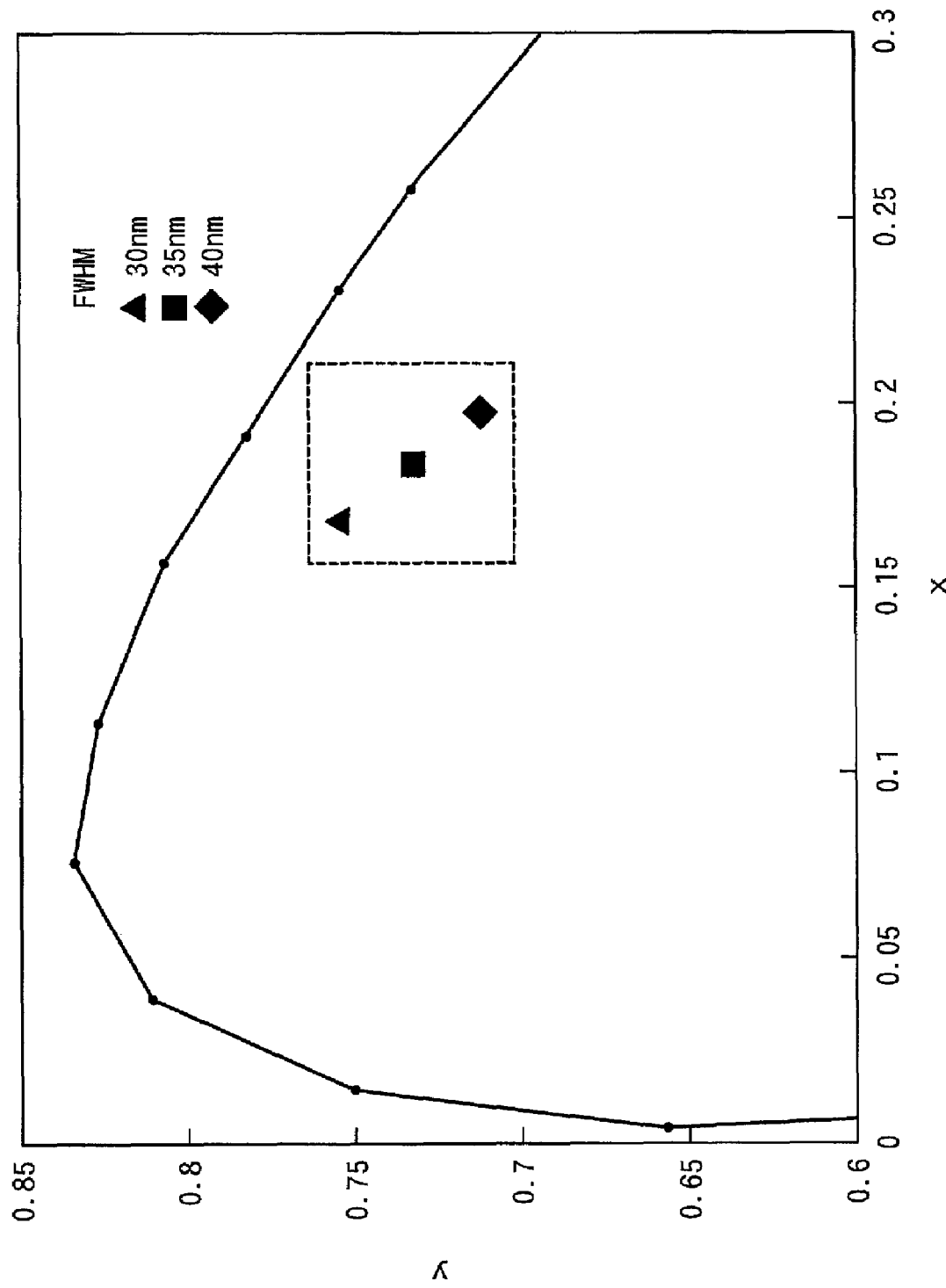
FIG. 34 is a graph showing a green region of the xy chromaticity diagram to an enlarged scale.

Preferably, the green light emitting diode is constructed so that chromaticity points (color points) of the green color will be within a predetermined range in the xy chromaticity diagram of the XYZ color system. Specifically, in FIG. 34, showing the green color region in the xy chromaticity diagram to an enlarged scale, the green light emitting diode is constructed so that green color points will be in a range defined by a broken line rectangle. That is, the chromaticity points (color points) of the green color are to be in a range of $0.16 \leq x \leq 0.21$ and $0.70 \leq y \leq 0.76$.

With the chromaticity points in the above range, it becomes possible to enlarge the color reproducing range of the color liquid crystal display apparatus in the green region to completely cover the region of the sRGB standard and to set the NTSC ratio to a larger value exceeding 100%. Moreover, it becomes possible to match to the region of the aforementioned sYCC standard.

The half-value width FWHM of the light emission spectrum of the green light emitting diode is preferably as narrow as possible, however, it is currently difficult to provide the half-value width less than 30 nm from the perspective of manufacture. There is also fear that, if the half-value width of the light emission spectrum is excessively narrow, the spectral energy is decreased, thus leading to deterioration in luminance.

If it becomes possible to provide the half-value width of the light emission spectrum less than 30 nm, through improvement in the fabrication technique, the half-value width should not be limited to 30 nm or greater from the perspective of broadening the color gamut.

In the present embodiment, the color filter so far used extensively, that is, filters of prime colors (red color, green color and blue color), or complementary colors, such as cyan, magenta or yellow, may be used as the color filter.

Although color combinations of the light emitting diodes used may be optional, basically the white color or other various colors may be reproduced using the light emitting diodes of three prime colors, namely the red light emitting diode, green color emitting diode and the blue light emitting diode.

The light sources of the backlight device may also be constituted using diodes other than the light emitting diodes for three prime colors.

The light beams from the respective light emitting diodes are mixed in the backlight device to generate white color.

Meanwhile, in the color liquid crystal display apparatus 100 of the instant embodiment, the green light emitting diode 21G of the backlight device 20 is designed so that the half-value width FWHM of the light emission spectrum will be of a relatively narrow range of from 30 nm to 40 nm.

By setting the half-value width FWHM of the green light emitting diode 21G to 30 to 40 nm, the skirt part of the light emission spectrum of the green light emitting diode 21G may become shorter to decrease the overlap with the transmission wavelength bands of other color filter segments, such as that of the blue filter CFB. This enables suppression of color mixing of green color with other colors, such as blue color.

A color liquid crystal display apparatus was actually fabricated to check into its characteristics. As shown schematically in FIG. 32, a color luminance meter 300 was placed on top of a color filter 19 of the color liquid crystal display apparatus 100 to measure spectral characteristics. The spectral characteristics were also plotted on the chromaticity diagram of the XYZ color system and the NTSC ratio was found from this chromaticity diagram of the XYZ color system.

The light sources of the backlight device used were light emitting diodes of the three prime colors, of which the green light emitting diodes were of different half-value widths (FWHM). The color filters used were those routinely used. With the use of the backlight light source, plural color liquid crystal display apparatus were fabricated and measurement was made of the spectral characteristics by the above-described measurement methods.

Specifically, the light source of the backlight device was constructed using light emitting diodes of three prime colors, specifically, a blue light emitting diode (LED-B), having a light emission peak wavelength of 450 nm and a half-value width FWHM of 25 nm, a green light emitting diode (LED-G), and a red light emitting diode (LED-R), having a light emission peak wavelength of 640 nm and a half-value width FWHM of 22 nm. This backlight light source was combined with a routinely used tristimulus color filter (CFR, CFG and CFB) to constitute a color liquid crystal display apparatus.

As regards the green light emitting diode (LED-G), three different types of the green light emitting diodes, that is, a type having a light emission peak wavelength of 525 nm and a half-value width FWHM of 40 nm, a light emission peak wavelength of 525 nm and a half-value width FWHM of 35 nm, and a light emission peak wavelength of 525 nm and a half-value width FWHM of 30 nm, were provided to fabricate color liquid crystal display apparatus.

Meanwhile, the three types of the green light emitting diodes (LED-G) were adjusted as the spectral intensities thereof were varied, in keeping with changes in the half-value width FWHM, in order to effect matching as to white balance. Specifically, the spectral intensities of the green light emitting diodes were adjusted so that the chromaticity coordinates (x,y) of white light obtained on mixing the colors of the three color light emitting diodes will be (x,y)=(0.288, 0.274).

Figure 33:
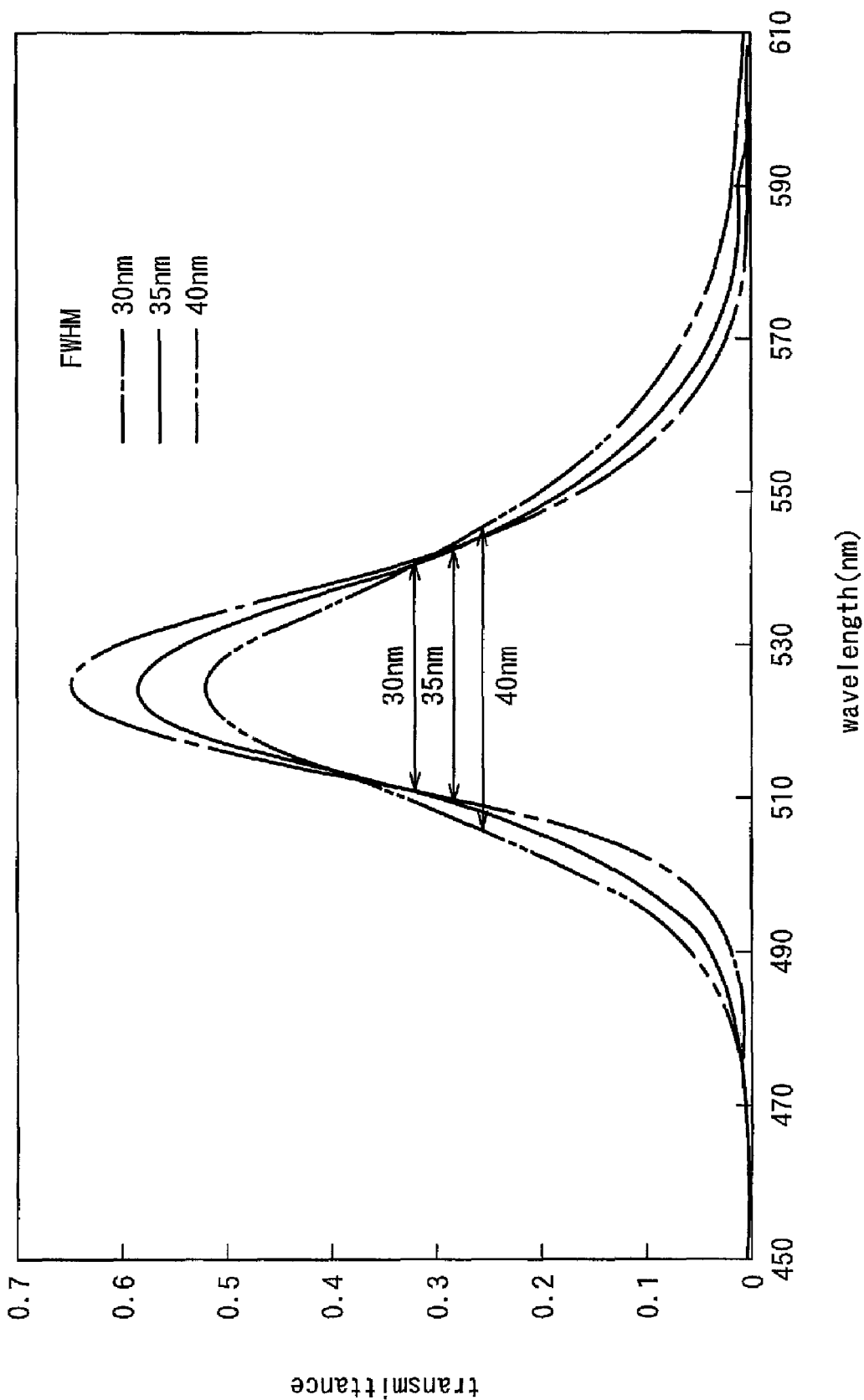
FIG. 33 is a graph showing emission spectra of three different types of green light emitting diodes overlaid one on others.

The light emission spectra of the three types of the green light emitting diodes FIG. 33 are shown overlaid one on others in FIG. 33. It is seen from FIG. 33 that the narrower the half-value width FWMM, the higher is the peak intensity and the shorter becomes the skirt of the peak.

The chromaticity points of the three sorts of the green light emitting diodes are shown plotted in FIG. 34 described above. It is seen from FIG. 34 that the chromaticity points of all of the green light emitting diodes are within the regions surrounded by a broken-line rectangle.

Figure 35:
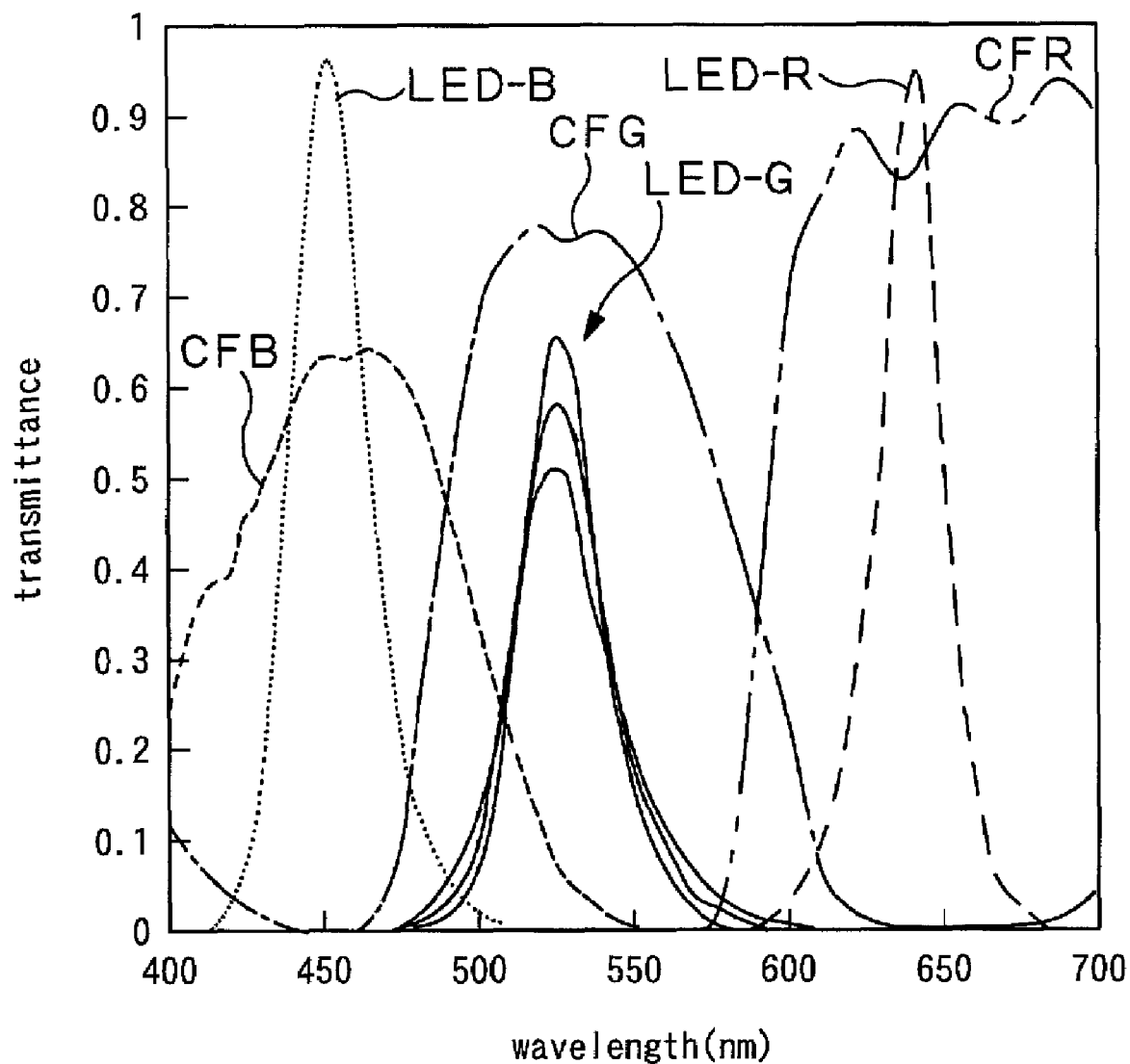
FIG. 35 is a graph showing light emission spectra of the three light emitting diodes and spectral characteristics of the color filter overlaid together.

The light emission spectra of the respective colors (red, blue and green) and the spectral characteristics of the color filter are shown overlaid together in FIG. 35. As regards the green light emitting diodes, the light emission spectra of the three types shown in FIG. 33 are shown overlaid together.

Figure 36:
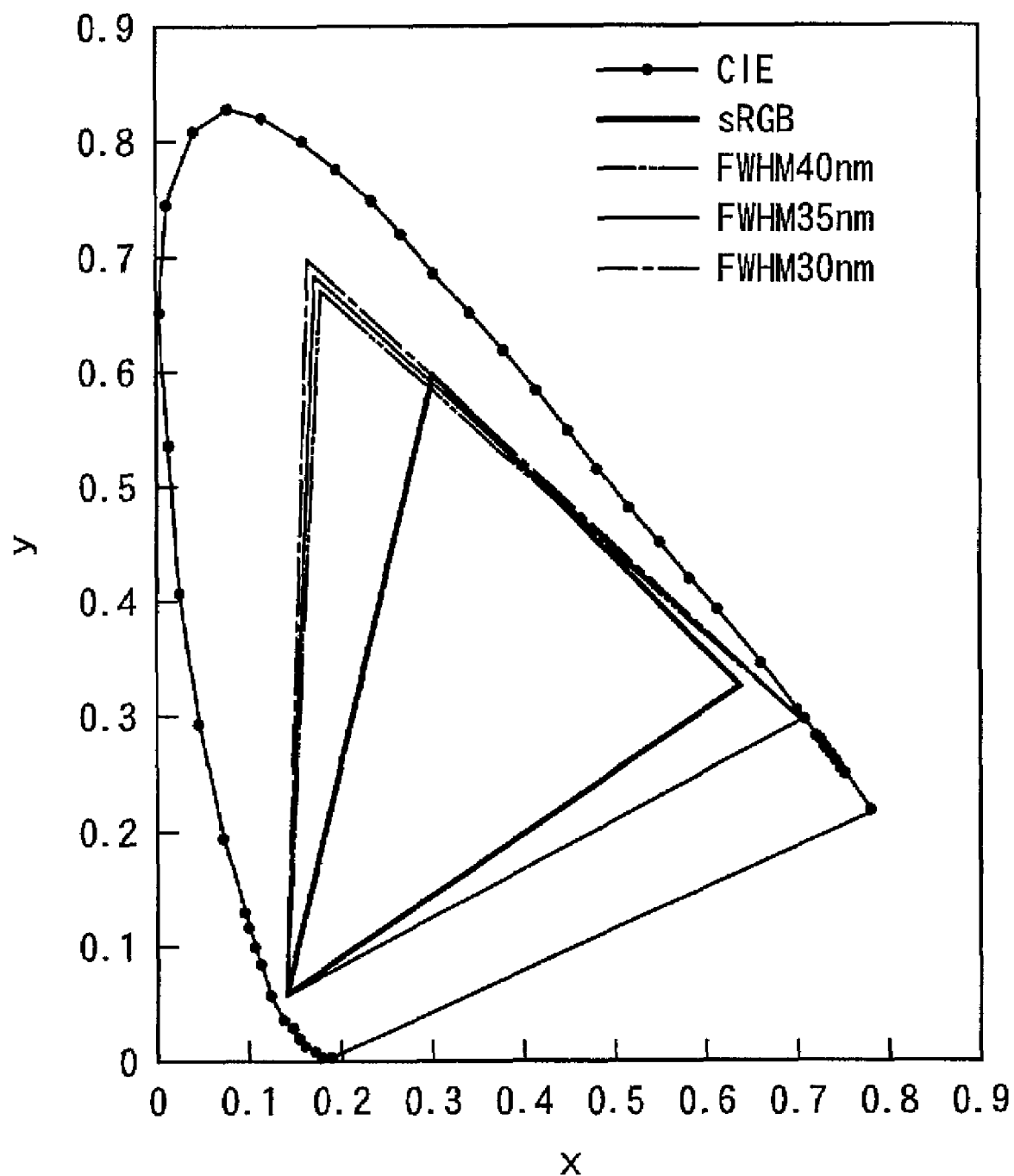
FIG. 36 is a graph showing color reproducing ranges of a color liquid crystal display apparatus employing three different types of green light emitting diodes.

By way of showing the measured results, the color reproducing ranges of the respective color liquid crystal display apparatus are shown overlaid in the chromaticity diagram of the XYZ color system in FIG. 36. It is seen from FIG. 36 that, as the half-value width FWHM of the green light emitting diode LED-G becomes narrower, the color reproducing range is spread upwards. This is possibly due to the fact that the narrower the half-value width FWHM of the green light emitting diode LED-G, the lesser becomes the degree of color mixing from the blue color filter CFB of the color filter.

From the measured results, shown in FIG. 36, the NTSC ratio of each of the color reproducing ranges of the respective color liquid crystal display apparatus was found. The NTSC value was 105%, 108% and 111% for the half-value widths FWHM of the green light emitting diodes LED-G of 40 nm, 35 nm and 30 nm, respectively.

Figure 37B:
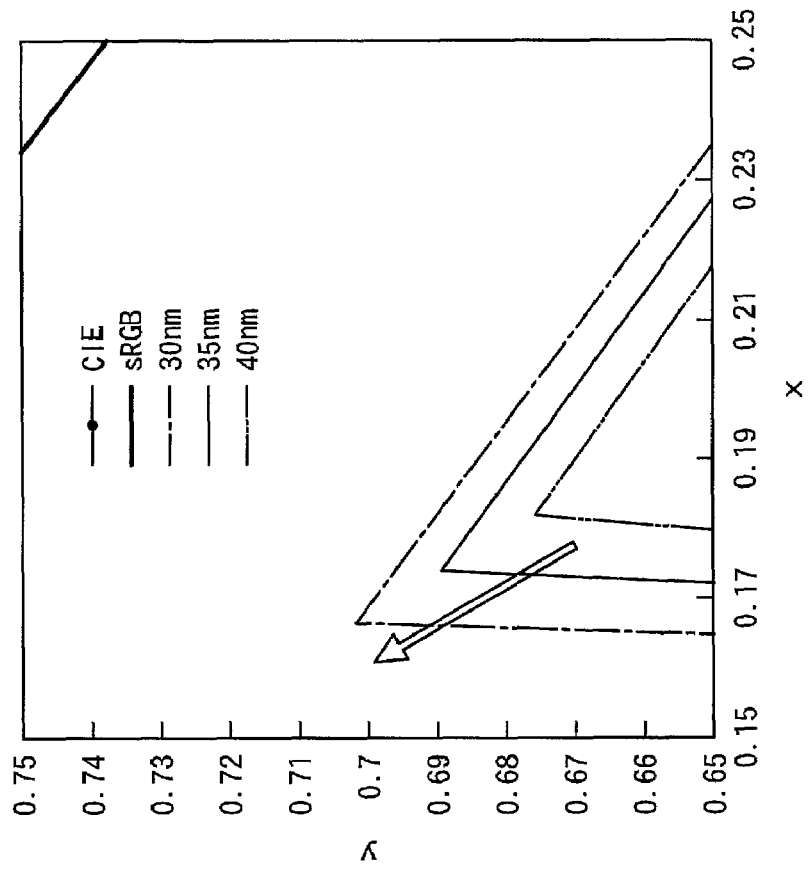
FIG. 37B is a graph showing the green region shown in FIG. 36 to an enlarged scale.
Figure 37A:
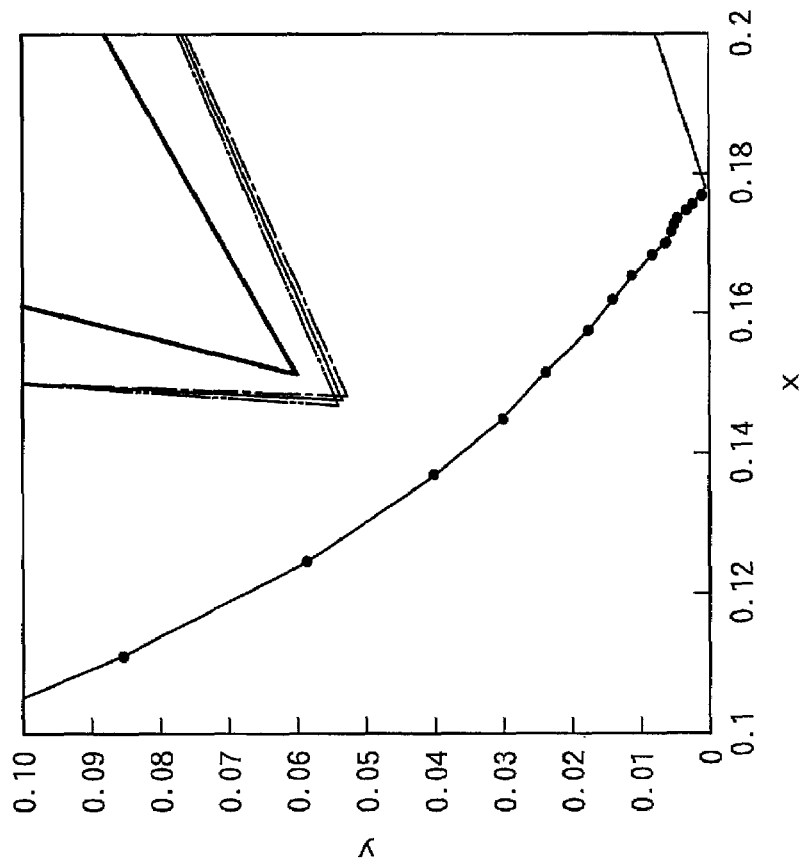
FIG. 37A is a graph showing the blue region shown in FIG. 36 to an enlarged scale.

The blue color region and the green color region of FIG. 36 are shown enlarged in FIGS. 37A and 37B, respectively.

It is seen from FIG. 37A that, in case the half-value width FWHM of the green light emitting diode LED-G is varied, changes in chromaticity points in the blue color region may scarcely be observed. On the other hand, it is seen from FIG. 37B that, in the green color region, the y-value is increased as the half-value width FWHM of the green light emitting diode LED-G is narrowed, with the color gamut of the green color region becoming broader.

Figure 38:
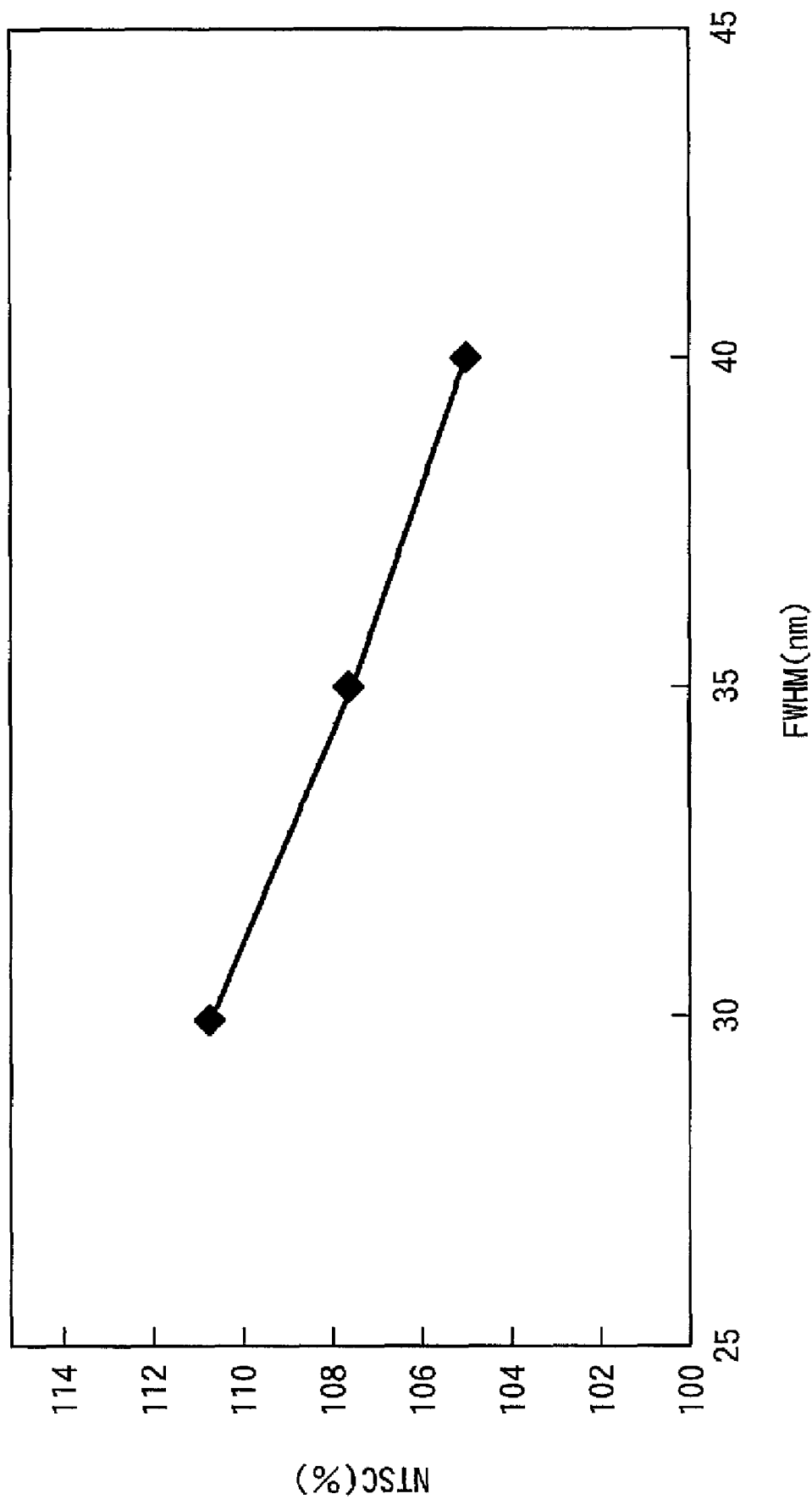
FIG. 38 is a graph showing the relationship between the half-value width of the green light emitting diode and the NTSC ratio.

FIG. 38 shows the relationship between the half-value width FWHM of the green light emitting diode LED-G and the NTSC ratio.

It is seen from FIG. 38 that there is correlation between the half-value width and the color gamut (NTSC ratio). It may be seen from this relationship that, if desired to maintain the NTSC ratio at higher than 105%, it is necessary for the half-value width FWHM to be not larger than 40 nm, and that, if this value is exceeded, the NTSC ratio of 105% cannot be achieved.

It may also be seen that, in order to provide for a broad color gamut of the display, it is crucial not only to optimize the light emission wavelength of the light emitting diode, but also to narrow down the half-value width of the light emission spectrum.

With the above-described color liquid crystal display apparatus 100 of the instant embodiment, in which the light sources of the backlight device 20 are constituted by the light emitting diodes 21R, 21G and 21B, and the green light emitting diode 21G with the half-value width FWHM of from 30 nm to 40 nm, it becomes possible to suppress color mixing of green color with the other colors and to provide for a broader color reproducing range of the green color region, It becomes possible in this manner to make the NTSC ratio as high as 100% or higher, or to effect matching with the region of the sYCC standard.

The present invention is not limited to the particular configurations of the embodiments described above with reference to the drawings. It will be appreciated that the present invention may encompass various changes or corrections such as may readily be arrived at by those skilled in the art within the scope and the principle of the invention.

The invention claimed is:

1. A backlight device for illuminating a transmissive color liquid crystal display panel, having a color filter, from a backside thereof with white light, said color filter being constituted by a tristimulus filter for wavelength-selecting and transmitting red light, green light and blue light, said backlight device comprising:

a light source, made up by a red light emitting diode emitting red light with a half-value width hwr such that 15 nm$\leq$hwr$\leq$30 nm, a green light emitting diode emitting green light with a half-value width hwg such that 15 nm$\leq$hwg$\leq$50 nm and a blue light emitting diode emitting blue light with a half-value width hwb such that 15 nm$\leq$hwb$\leq$30 nm; and color mixing means for mixing the red light, green light and blue light emitted by said light source to generate said white light.

2. The backlight device according to claim 1 wherein, in case a peak wavelength $\lambda pb$ of said blue light, emitted by said blue light emitting diode, is such that $\lambda pb \geq 460$ nm, the half-value width hwg of said green light emitted by said green light emitting diode is such that 25 nm$\leq$hwg$\leq$43 nm.

3. A color liquid crystal display apparatus comprising a transmissive color liquid crystal display panel, including a color filter constituted by a tristimulus filter for wavelength-selecting and transmitting red light, green light and blue light, and a backlight device for illuminating said color liquid crystal display panel with white light from a backside thereof, said backlight device including a light source, made up by a red light emitting diode emitting red light with a half-value width hwr such that 15 nm$\leq$hwr$\leq$30 nm, a green light emitting diode emitting green light with a half-value width hwg such that 31 nm$\leq$hwg$\leq$50 nm and a blue light emitting diode emitting blue light with a half-value width hwb such that 15 nm$\leq$hwb$\leq$30 nm; and color mixing means for mixing the red light, green light and blue light emitted by said light source to generate said white light.

4. The color liquid crystal display apparatus according to claim 3 wherein, in case a peak wavelength $\lambda pb$ of said blue light, emitted by said blue light emitting diode, as said light source of said backlight device, is such that $\lambda pb \geq 460$ nm, the half-value width hwg of said green light emitted by said green light emitting diode is such that 25nm$\leq$hwg$\leq$43nm.

5. A backlight device for illuminating a transmissive color liquid crystal display panel from a backside thereof with white light, said color liquid crystal display panel including a color filter constituted by a tristimulus filter for wavelength-selecting and transmitting red light, green light and blue light, said backlight device comprising:

a light source made up by a red light emitting diode, a green light emitting diode and a blue light emitting diode, said red light emitting diode emitting red light having a chromaticity point in an xy chromaticity diagram in the XYZ color system as prescribed by the Commission Internationale de l'Eclairage (CIE) such that $0.65 \leq x \leq 0.75$ and $0.27 \leq y \leq 0.33$, said green light emitting diode emitting green light having a chromaticity point in said xy chromaticity diagram such that $0.12 \leq x \leq 0.28$ and $0.64 \leq y \leq 0.76$ with a half-value width hwg wuch that $31$ nm $\leq$ hwg $\leq 50$ nm and said blue light emitting blue light having a chromaticity point in said xy chromaticity diagram such that $0.14 \leq x \leq 0.17$ and $0.01 \leq y \leq 0.06$; and color mixing means for mixing the red light, green light and blue light emitted by said light source to generate said white light.

6. A color liquid crystal display apparatus comprising a transmissive color liquid crystal display panel, and a backlight device for illuminating said color liquid crystal display panel with white light from a backside thereof, said transmissive color liquid crystal display panel including a color filter constituted by a tristimulus filter for wavelength-selecting and transmitting red light, green light and blue light, said backlight device including a light source made up by a red light emitting diode, a green light emitting diode and blue light emitting diode, said red light emitting diode emitting red light having a chromaticity point in an xy chromaticity diagram in the XYZ color system as prescribed by the Commission Internationale de l'Eclairage (CIE) such that $0.65 \leq x \leq 0.75$ and $0.27 \leq y \leq 0.33$, said green light emitting diode emitting green light having a chromaticity point in said xy chromaticity diagram such that $0.12 \leq x \leq 0.28$ and $0.64 \leq y \leq 0.76$ with a half-value width hwg such that $31$ nm $\leq$ hwg $\leq 50$ nm and said blue light emitting diode emitting blue light having a chromaticity point in said xy chromaticity diagram such that $0.14 \leq x \leq 0.17$ and $0.01 \leq y \leq 0.06$; and color mixing means for mixing the red light, green light and blue light emitted by said light source to generate said white light.

7. A color liquid crystal display apparatus comprising:
a transmissive color liquid crystal display panel, having a color filter;
a backlight light source for illuminating said color liquid crystal display panel from a backside thereof,
said backlight light source being made up by a red light emitting diode, a green ligh emitting diode and a blue light emitting diode; and
color mixing means for mixing the red light, green light and blue light emitted by said backlight light source;
a half-value width of light emission spectrum of said green light emitting diode ranging between 31 nm and 40 nm.

8. The color liquid crystal display apparatus according to claim 7 wherein a chromaticity point (color point) of said green light emitting diode in an xy chromaticity diagram in the XYZ color system is in a range such that $0.16 \leq x \leq 0.21$ and $0.70 \leq y \leq 0.76$.

9. The backlight device according to claim 1, wherein the red light emitting diode emitting red light has a half-value width hwr such that 15 nm $\leq$ hwr $\leq 19$ nm.

10. The backlight device according to claim 1, wherein the blue light emitting diode emitting blue light has a half-value width hwb such that 15 nm $\leq$ hwb $\leq 19$ nm.

11. The color liquid crystal display apparatus according to claim 3, wherein the red light emitting diode emitting red light has a half-value width hwr such that 15 nm $\leq$ hwr $\leq 19$ nm.

12. The color liquid crystal display apparatus according to claim 3, wherein the blue light emitting diode emitting blue light has a half-value width hwb such that 15 nm $\leq$ hwb $\leq 19$ nm.

13. The backlight device according to claim 5, wherein the red light emitting diode emitting red light has a half-value width hwr such that 15 nm $\leq$ hwr $\leq 19$ nm.

14. The backlight device according to claim 5, wherein the blue light emitting diode emitting blue light has a half-value width hwb such that 15 nm $\leq$ hwb $\leq 19$ nm.

15. The color liquid crystal display apparatus according to claim 6, wherein the red light emitting diode emitting red light has a half-value width hwr such that 15 nm $\leq$ hwr $\leq 19$ nm.

16. The color liquid crystal display apparatus according to claim 6, wherein the blue light emitting diode emitting blue light has a half-value width hwb such that 15 nm $\leq$ hwb $\leq 19$ nm.

17. The color liquid crystal display apparatus according to claim 7, wherein the red light emitting diode emitting red light has a half-value width hwr such that 15 nm $\leq$ hwr $\leq 19$ nm.

18. The color liquid crystal display apparatus according to claim 7, wherein the blue light emitting diode emitting blue light has a half-value width hwb such that 15 nm $\leq$ hwb $\leq 19$ nm.

* * * * *

UNITED STATES PATENT AND TRADEMARK OFFICE
CERTIFICATE OF CORRECTION

PATENT NO. : 7,663,714 B2
APPLICATION NO. : 11/573375
DATED : February 16, 2010
INVENTOR(S) : Shuichi Haga et al.

Page 1 of 1

It is certified that error appears in the above-identified patent and that said Letters Patent is hereby corrected as shown below:

In the Claims:

Column 26, lines 31-32

"$15 \text{ nm} \leq hwg \leq 50 \text{ nm}$"

should be

--$31 \text{ nm} \leq hwg \leq 50 \text{ nm}$--

Signed and Sealed this
Eighth Day of March, 2016

Michelle K. Lee
*Director of the United States Patent and Trademark Office*